US012455723B2

(12) United States Patent
Ware et al.

(10) Patent No.: US 12,455,723 B2
(45) Date of Patent: Oct. 28, 2025

(54) MAC PROCESSING PIPELINE HAVING ACTIVATION CIRCUITRY, AND METHODS OF OPERATING SAME

(71) Applicant: Analog Devices, Inc., Wilmington, MA (US)

(72) Inventors: Frederick A. Ware, Los Altos Hills, CA (US); Cheng C. Wang, San Jose, CA (US)

(73) Assignee: Analog Devices, Inc., Wilmington, MA (US)

( * ) Notice: Subject to any disclaimer, the term of this patent is extended or adjusted under 35 U.S.C. 154(b) by 956 days.

(21) Appl. No.: 17/577,454

(22) Filed: Jan. 18, 2022

(65) Prior Publication Data

US 2022/0244917 A1    Aug. 4, 2022

Related U.S. Application Data

(60) Provisional application No. 63/144,553, filed on Feb. 2, 2021.

(51) Int. Cl.
G06F 7/544 (2006.01)

(52) U.S. Cl.
CPC .................. *G06F 7/5443* (2013.01)

(58) Field of Classification Search
CPC ...................................................... G06F 7/5443
See application file for complete search history.

(56) References Cited

U.S. PATENT DOCUMENTS 4,958,312 A    9/1990 Ang et al.
5,764,095 A    6/1998 Carobolante
(Continued)

FOREIGN PATENT DOCUMENTS

EP        0405726      3/1999
EP        2280341      6/2013
WO    WO 2018/126073    7/2018

OTHER PUBLICATIONS

Liang Yun, et al., "Evaluating Fast Algorithms for Convolutional Neural Networks on FPGAs", IEEE Transactions on Computer-Aided Design of Integrated Circuits and Systems, vol. 39, No. 4, Feb. 5, 2019, 14 pages(Note: The date identified on the article attached is Mar./Apr. 2020).
(Continued)

*Primary Examiner* — Michael D. Yaary
(74) *Attorney, Agent, or Firm* — DLA Piper LLP (US)

(57) ABSTRACT

An integrated circuit comprising a plurality of multiplier-accumulator circuits connected in series to form a linear pipeline to process first data, via performing a plurality of concatenated multiply and accumulate operations, and generate MAC output data, wherein each multiplier-accumulator circuit of the plurality of multiplier-accumulator circuits includes (i) a multiplier to multiply first data by a multiplier weight data and generate a product data, and (ii) an accumulator, coupled to the multiplier of the associated multiplier-accumulator circuit, to add second data and the product data of the associated multiplier to generate sum data. The integrated circuit further includes an activation circuit, connected to the output of the linear pipeline of the plurality of multiplier-accumulator circuits, to receive the MAC output data and process the MAC output data, via a non-linear activation function, to generate MAC pipeline output data.

22 Claims, 31 Drawing Sheets

(56) References Cited

U.S. PATENT DOCUMENTS

| | | | |
|---|---|---|---|
| 6,115,729 | A | 9/2000 | Matheny et al. |
| 6,148,101 | A | 11/2000 | Tanaka et al. |
| 6,298,366 | B1 | 10/2001 | Gatherer et al. |
| 6,538,470 | B1 | 3/2003 | Langhammer et al. |
| 7,107,305 | B2 | 9/2006 | Deng et al. |
| 7,299,342 | B2 | 11/2007 | Nilsson et al. |
| 7,346,644 | B1 | 3/2008 | Langhammer et al. |
| 7,698,358 | B1 | 4/2010 | Langhammer et al. |
| 8,051,124 | B2 | 11/2011 | Salama et al. |
| 8,266,199 | B2 | 9/2012 | Langhammer et al. |
| 8,645,450 | B1 | 2/2014 | Choe et al. |
| 8,751,551 | B2 | 6/2014 | Streicher et al. |
| 8,788,562 | B2 | 7/2014 | Langhammer et al. |
| 9,600,278 | B1 | 3/2017 | Langhammer |
| 11,049,013 | B1* | 6/2021 | Duong .................... G06N 3/08 |
| 2002/0178133 | A1 | 11/2002 | Zhao et al. |
| 2003/0172101 | A1 | 9/2003 | Liao et al. |
| 2005/0144215 | A1 | 6/2005 | Simkins et al. |
| 2007/0239967 | A1 | 10/2007 | Dally et al. |
| 2008/0211827 | A1 | 9/2008 | Donovan et al. |
| 2009/0094303 | A1 | 4/2009 | Katayama |
| 2014/0019727 | A1 | 1/2014 | Zhu et al. |
| 2014/0281370 | A1 | 9/2014 | Kahn |
| 2017/0011288 | A1 | 1/2017 | Brothers et al. |
| 2017/0115958 | A1 | 4/2017 | Langhammer |
| 2017/0116693 | A1 | 4/2017 | Rae et al. |
| 2017/0214929 | A1 | 7/2017 | Susnow et al. |
| 2017/0315778 | A1 | 11/2017 | Sano |
| 2017/0322813 | A1 | 11/2017 | Langhammer |
| 2017/0344876 | A1 | 11/2017 | Brothers |
| 2018/0052661 | A1 | 2/2018 | Langhammer |
| 2018/0081632 | A1 | 3/2018 | Langhammer |
| 2018/0081633 | A1 | 3/2018 | Langhammer |
| 2018/0157961 | A1 | 6/2018 | Henry et al. |
| 2018/0189651 | A1 | 7/2018 | Henry et al. |
| 2018/0300105 | A1 | 10/2018 | Langhammer |
| 2018/0314492 | A1 | 11/2018 | Fais et al. |
| 2018/0321909 | A1 | 11/2018 | Langhammer |
| 2018/0321910 | A1 | 11/2018 | Langhammer et al. |
| 2018/0341460 | A1 | 11/2018 | Langhammer |
| 2018/0341461 | A1 | 11/2018 | Langhammer |
| 2019/0042191 | A1 | 2/2019 | Langhammer |
| 2019/0042244 | A1 | 2/2019 | Henry et al. |
| 2019/0042544 | A1 | 2/2019 | Kashyap et al. |
| 2019/0079728 | A1 | 3/2019 | Langhammer et al. |
| 2019/0196786 | A1 | 6/2019 | Langhammer |
| 2019/0243610 | A1 | 8/2019 | Lin et al. |
| 2019/0250886 | A1 | 8/2019 | Langhammer |
| 2019/0286417 | A1 | 9/2019 | Langhammer |
| 2019/0310828 | A1 | 10/2019 | Langhammer et al. |
| 2019/0324722 | A1 | 10/2019 | Langhammer |
| 2019/0340489 | A1 | 11/2019 | Mills |
| 2019/0392297 | A1 | 12/2019 | Lau et al. |
| 2020/0004506 | A1 | 1/2020 | Langhammer et al. |
| 2020/0026493 | A1 | 1/2020 | Streicher et al. |
| 2020/0076435 | A1 | 3/2020 | Wang |
| 2020/0097799 | A1 | 3/2020 | Divakar et al. |
| 2020/0174750 | A1 | 6/2020 | Langhammer |
| 2020/0202198 | A1 | 6/2020 | Lee et al. |
| 2020/0295762 | A1 | 9/2020 | Wang |
| 2020/0310818 | A1 | 10/2020 | Ware et al. |
| 2020/0326939 | A1 | 10/2020 | Ware et al. |
| 2020/0326948 | A1 | 10/2020 | Langhammer |
| 2020/0401414 | A1 | 12/2020 | Ware et al. |
| 2021/0004208 | A1* | 1/2021 | Lai .......................... G06N 3/08 |
| 2021/0064568 | A1 | 3/2021 | Wang et al. |
| 2021/0081211 | A1 | 3/2021 | Wang |
| 2021/0103630 | A1 | 4/2021 | Ware et al. |
| 2021/0132905 | A1 | 5/2021 | Ware et al. |
| 2021/0173617 | A1 | 6/2021 | Ware et al. |
| 2021/0326286 | A1 | 10/2021 | Ware et al. |
| 2022/0027152 | A1 | 1/2022 | Ware et al. |
| 2022/0057994 | A1 | 2/2022 | Ware et al. |
| 2022/0171604 | A1 | 6/2022 | Ware et al. |

OTHER PUBLICATIONS

Zhao et al., "A Fast Algorithm for Reducing the Computation Complexity of Convolutional Neural Networks", Algorithms 2018, 11, 159; doi:10.3390/a11100159; www. Mdpi.com/journal/algorithms, 11 pages, Oct. 2018.

Priyanka Nain, "Multiplier-Accumulator (MAC) Unit", IJDACR, vol. 5, Issue 3, Oct. 2016, 4 pages.

Jebashini et al., "A Survey and Comparative Analysis of Multiply-Accumulate (MAC) Block for Digital Signal Processing Application on ASIC and FPGA", Journal of Applied Science, vol. 15, Issue 7, pp. 934-946, Jul. 2015.

Agrawal et al., "A 7nm 4-Core AI Chip with 25.6TFLOPS Hybrid FP8 Training, 102.4TOPS INT4 Inference and Workload-Aware Throttling", ISSCC, pp. 144-145, 2021.

Linley Gwennap, "IBM Demonstrates New AI Data Types", Microprocessor Report, Apr. 2021.

Choi et al., "Accurate and Efficient 2-Bit Quantized Neural Networks", Proceedings of $2^{nd}$ SysML Conf, 2019, 12 pages.

Sun et al., "Hybrid 8-bit Floating Point (HFP8) Training and Inference for Deep Neural Networks", NeurIPS 2019, 10 pages.

"nVidia A100 Tensor Core GPU Architecture", v1.0, 2020, 82 pages.

Papadantonakis et al., "Pipelining Saturated Accumulation", IEEE, vol. 58, No. 2, pp. 208-219, Feb. 2009.

International Search Report and Written Opinion of International Searching Authority re: PCT/US22/12703, mailed Apr. 18, 2022, 10 pages.

* cited by examiner

In one embodiment, each m-MAC execution pipeline includes a dedicated L0 SRAM memory, and each n x m-MAC cluster includes a shared L1 SRAM memory. The shift-in and shift-out paths of each m-MAC execution pipeline are coupled to the L2 SRAM memory. The L2 memory also couples to the L1/L0 memories. In one embodiment m=64 and n=16, as illustrated.

A network-on-chip (NOC) couples the L2 memory to a PHY (physical interface) to communicate with L3 memory (e.g., external DRAM). The NOC also couples to a PCIe PHY which, in turn, couples to an external host. In one embodiment, the NOC also couples to GPIO input/output PHYs, which allow multiple X1 components to be operated concurrently.

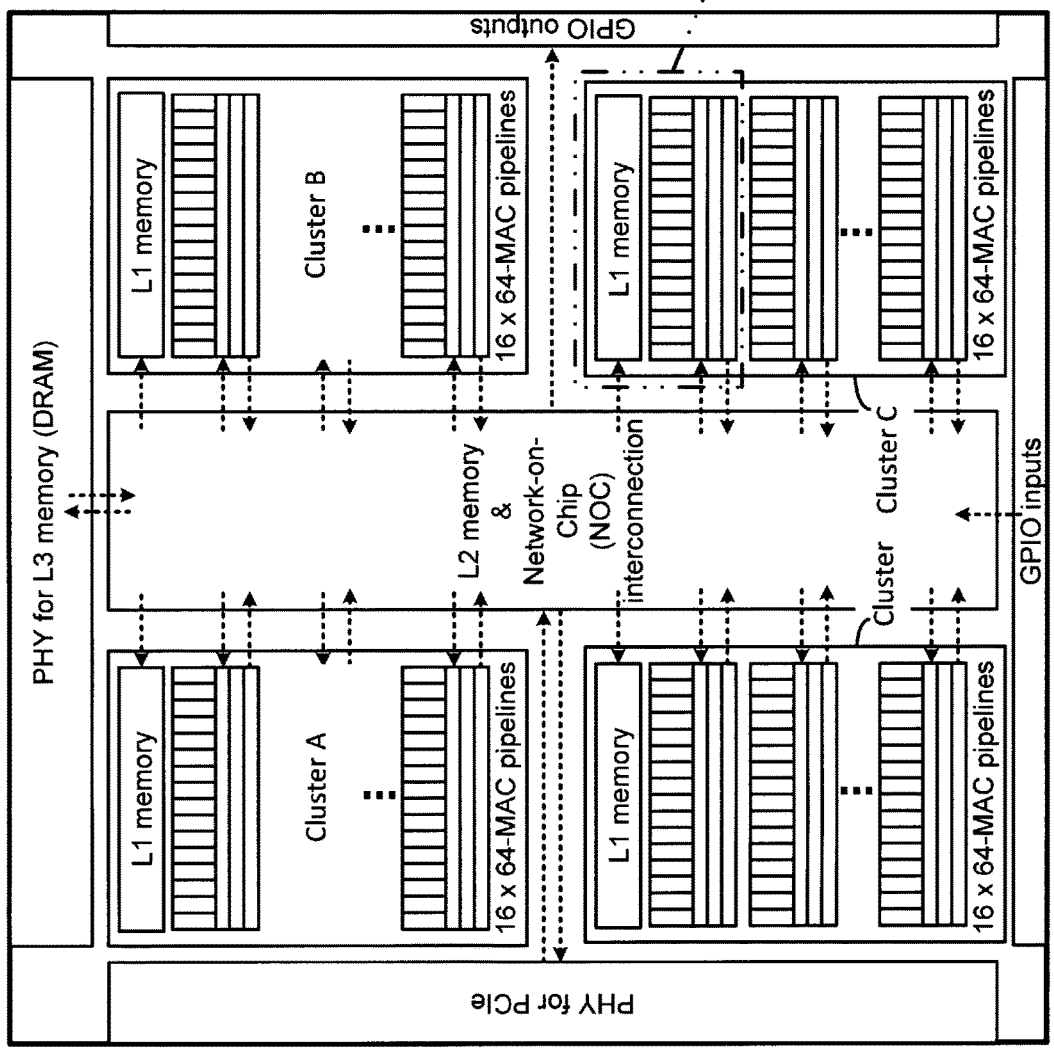

FIG. 6A

In one embodiment, each m-MAC execution pipeline includes a dedicated L0 SRAM memory, and each n x m-MAC cluster includes a shared L1 SRAM memory. The shift-in and shift-out paths of each m-MAC execution pipeline are coupled to the L2 SRAM memory. The L2 memory also couples to the L1/L0 memories. In one embodiment m=64 and n=16, as illustrated.

A network-on-chip (NOC) couples the L2 memory to a PHY (physical interface) to communicate with L3 memory (e.g., external DRAM). The NOC also couples to a PCIe PHY which, in turn, couples to an external host. In one embodiment, the NOC also couples to GPIO input/output PHYs, which allow multiple X1 components to be operated concurrently.

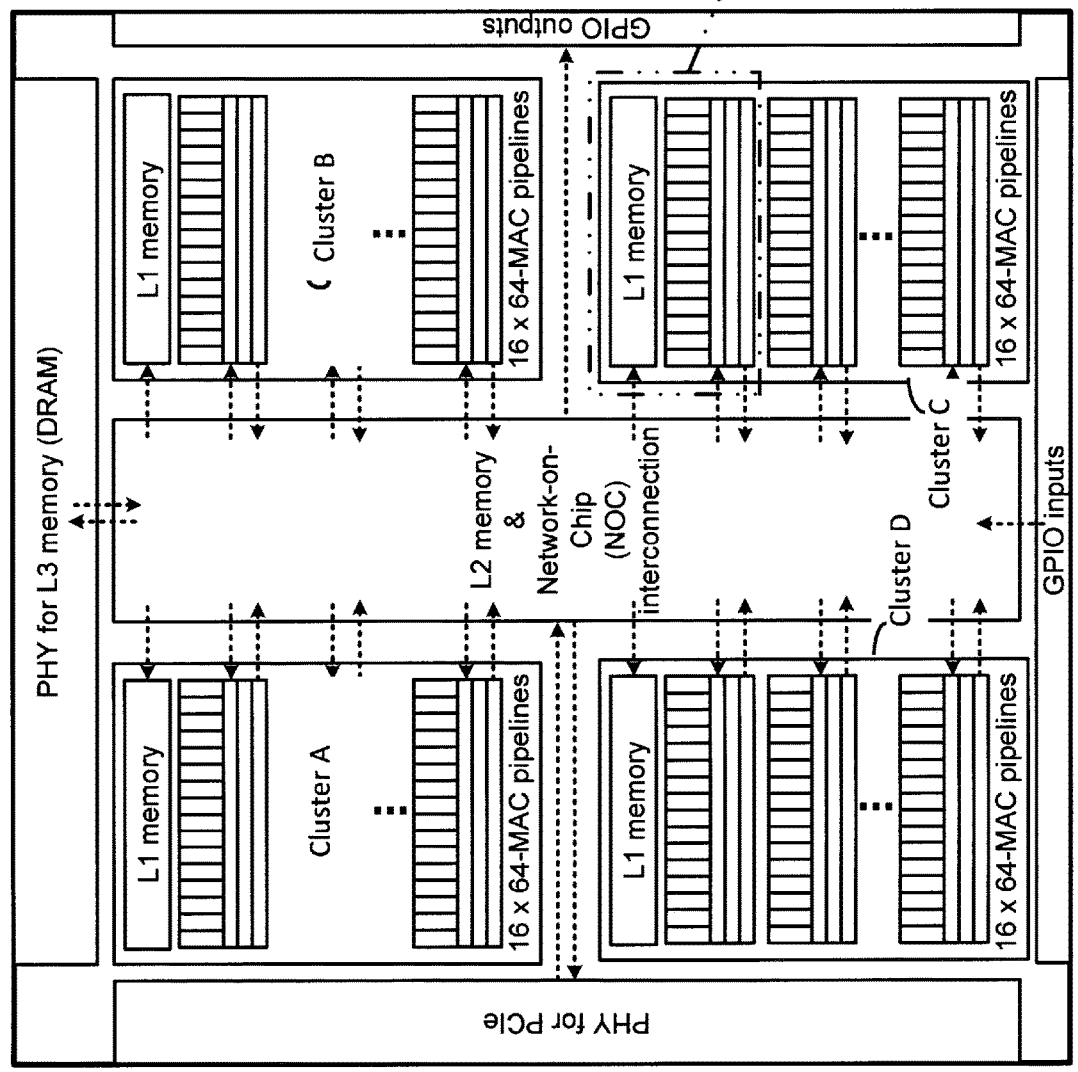

FIG. 6B

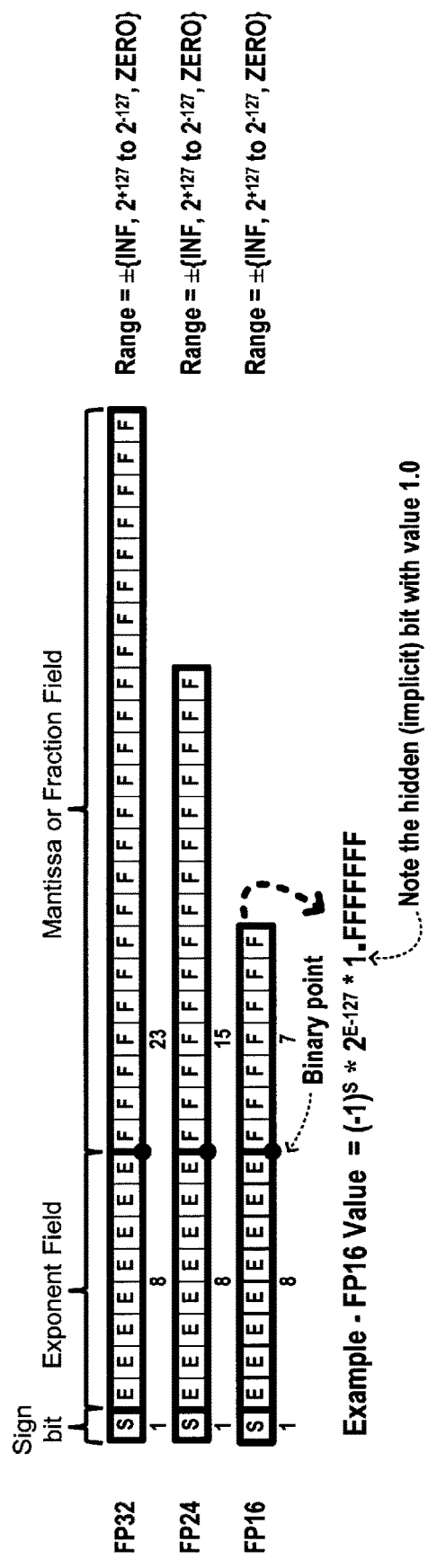
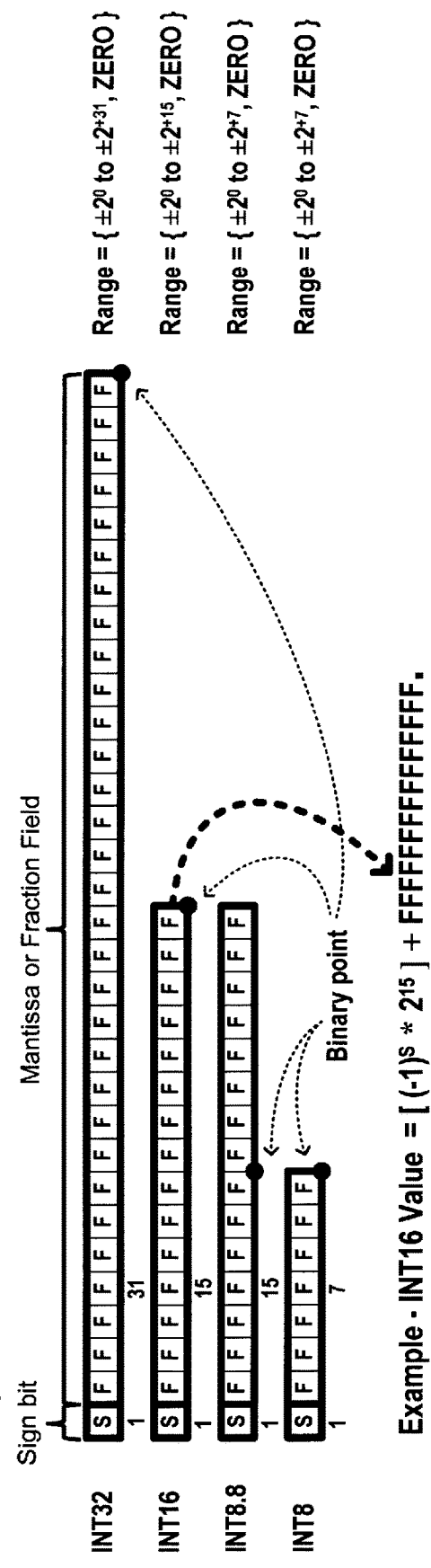
FIG. 10

Exemplary Floating point number space – Floating Point Data Format (FP16)

| Positive space | | | |
|---|---|---|---|
| S E[7:0] F0 F[1:7] | | | |
| 0 1111 1111 - not 0000000 | NAN (not-a-number) | | |
| 0 1111 1111 - 0000000 | INF (+ infinity) | | +(255/128) * $2^{254-127}$ |
| 0 1111 1110 1 1111111 | NRM (+ max) | | +(255/128) * $2^{254-127}$ |
| ... | ... | | ... |
| 0 1111 1110 1 1111110 | NRM | | +(129/128) * $2^{127-127}$ |
| 0 0111 1111 1 0000001 | NRM (+ 1.0) | | +(129/128) * $2^{127-127}$ |
| 0 0111 1111 1 0000000 | NRM | | +(128/128) * $2^{127-127}$ |
| 0 0111 1111 1 1111111 | NRM | | +(255/128) * $2^{126-127}$ |
| ... | ... | | ... |
| 0 0000 0001 1 1111110 | NRM | | +(129/128) * $2^{01-127}$ |
| 0 0000 0001 1 0000001 | NRM (+ min) | | +(128/128) * $2^{01-127}$ |
| 0 0000 0001 1 0000000 | DNRM | | +(127/128) * $2^{001-127}$ |
| 0 0000 0000 0 1111110 | DNRM | | +(126/128) * $2^{001-127}$ |
| ... | ... | | ... |
| 0 0000 0000 0 0000010 | DNRM | | +(002/128) * $2^{001-127}$ |
| 0 0000 0000 0 0000001 | DNRM (+ min) | | +(001/128) * $2^{001-127}$ |
| 0 0000 0000 - 0000000 | ZRO (+ 0.0) | | |

| Negative space | | | |
|---|---|---|---|
| S E[7:0] F0 F[1:7] | | | |
| 1 0000 0000 - 0000000 | ZRO (- 0.0) | | |
| 1 0000 0000 0 0000001 | DNRM (- min) | | -(001/128) * $2^{001-127}$ |
| 1 0000 0000 0 0000010 | DNRM | | -(002/128) * $2^{001-127}$ |
| ... | ... | | ... |
| 1 0000 0000 0 1111110 | DNRM | | -(126/128) * $2^{001-127}$ |
| 1 0000 0000 0 1111111 | DNRM (- max) | | -(127/128) * $2^{001-127}$ |
| 1 0000 0001 1 0000000 | NRM (- min) | | -(128/128) * $2^{01-127}$ |
| 1 0000 0001 1 0000001 | NRM | | -(129/128) * $2^{001-127}$ |
| ... | ... | | ... |
| 1 0111 1110 1 1111111 | NRM | | -(255/128) * $2^{126-127}$ |
| 1 0111 1110 1 0000000 | NRM (- 1.0) | | -(128/128) * $2^{127-127}$ |
| 1 1111 1110 1 0000001 | NRM | | -(129/128) * $2^{127-127}$ |
| ... | ... | | ... |
| 1 1111 1110 1 1111110 | NRM | | -(255/128) * $2^{254-127}$ |
| 1 1111 1111 - 0000000 | INF (- infinity) | | -(255/128) * $2^{254-127}$ |
| 1 1111 1111 - not 0000000 | NAN (not-a-number) | | |

FIG. 11

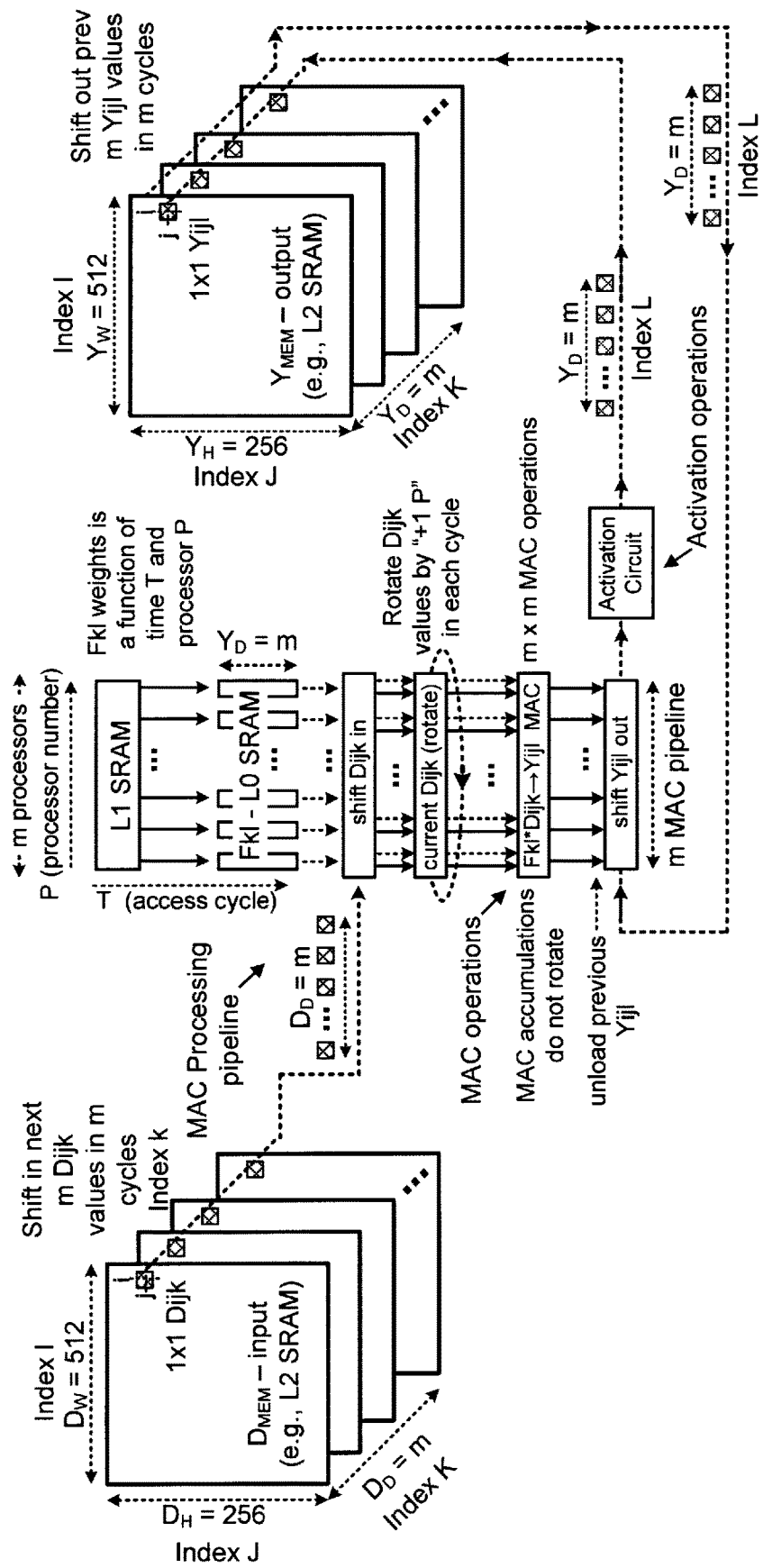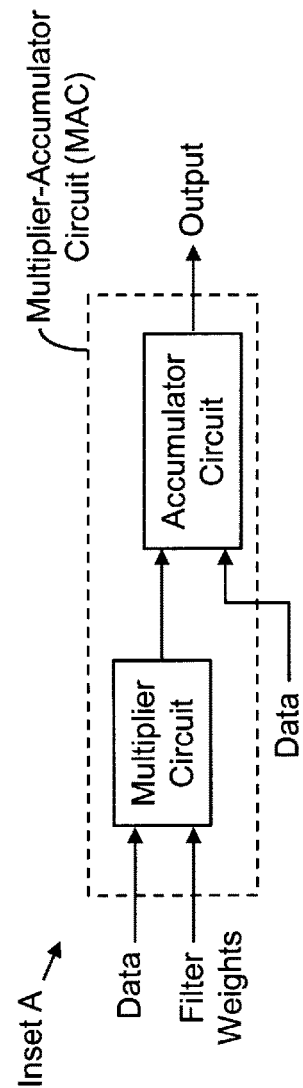
FIG. 13B

In one embodiment, each m-MAC execution pipeline includes a dedicated L0 SRAM memory, and each n x m-MAC cluster includes a shared L1 SRAM memory. The shift-in and shift-out paths of each m-MAC execution pipeline are coupled to the L2 SRAM memory. The L2 memory also couples to the L1/L0 memories. In one embodiment m=64 and n=16, as illustrated.

A network-on-chip (NOC) couples the L2 memory to a PHY (physical interface) to communicate with L3 memory (e.g., external DRAM). The NOC also couples to a PCIe PHY which, in turn, couples to an external host. In one embodiment, the NOC also couples to GPIO input/output PHYs, which allow multiple X1 components to be operated concurrently.

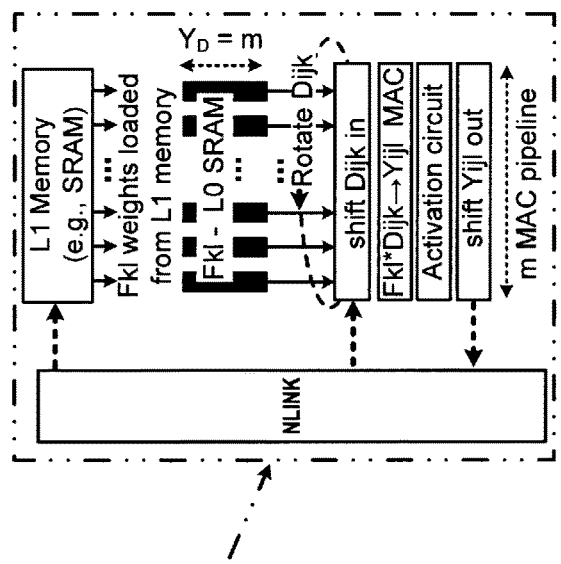

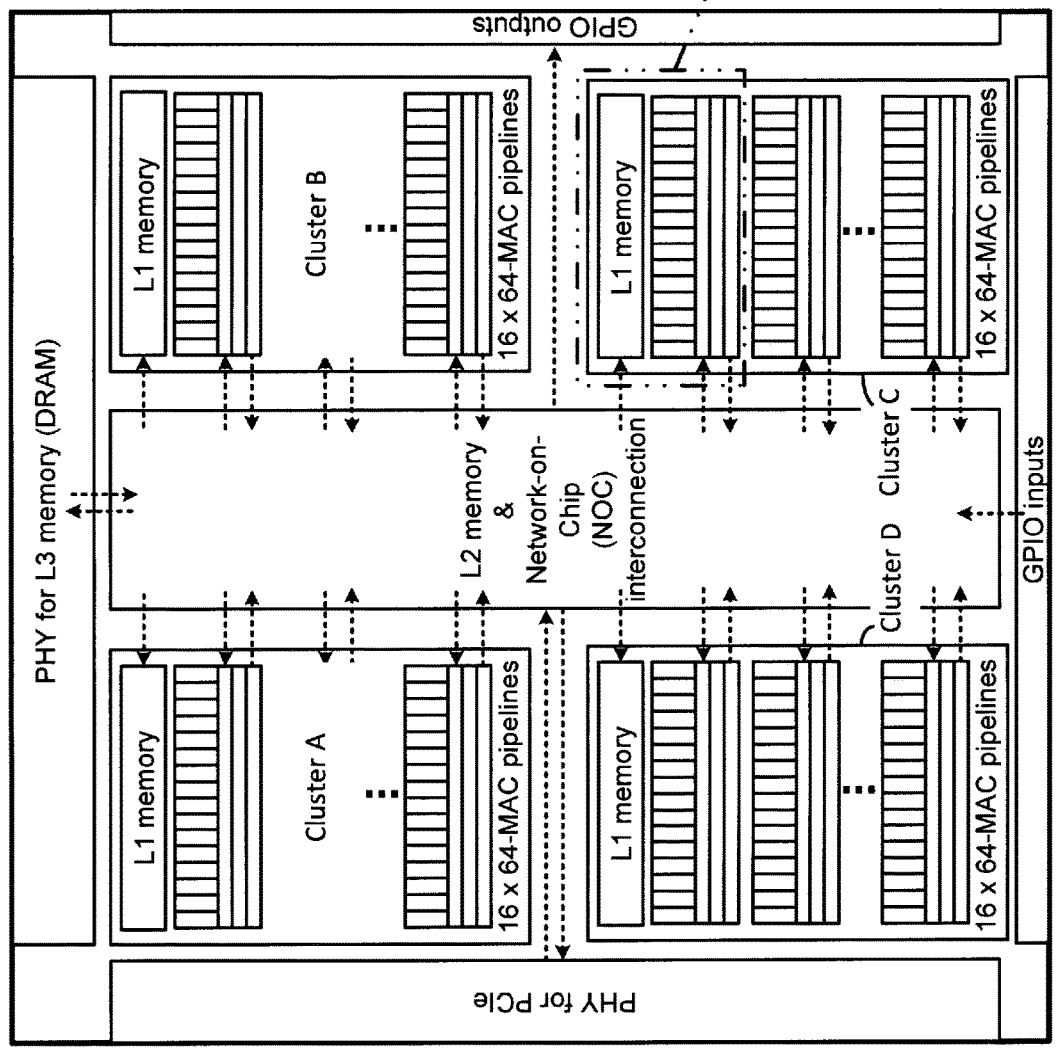

FIG. 14A

In one embodiment, each m-MAC execution pipeline includes a dedicated L0 SRAM memory, and each n x m-MAC cluster includes a shared L1 SRAM memory. The shift-in and shift-out paths of each m-MAC execution pipeline are coupled to the L2 SRAM memory. The L2 memory also couples to the L1/L0 memories. In one embodiment m=64 and n=16, as illustrated.

A network-on-chip (NOC) couples the L2 memory to a PHY (physical interface) to communicate with L3 memory (e.g., external DRAM). The NOC also couples to a PCIe PHY which, in turn, couples to an external host. In one embodiment, the NOC also couples to GPIO input/output PHYs, which allow multiple X1 components to be operated concurrently.

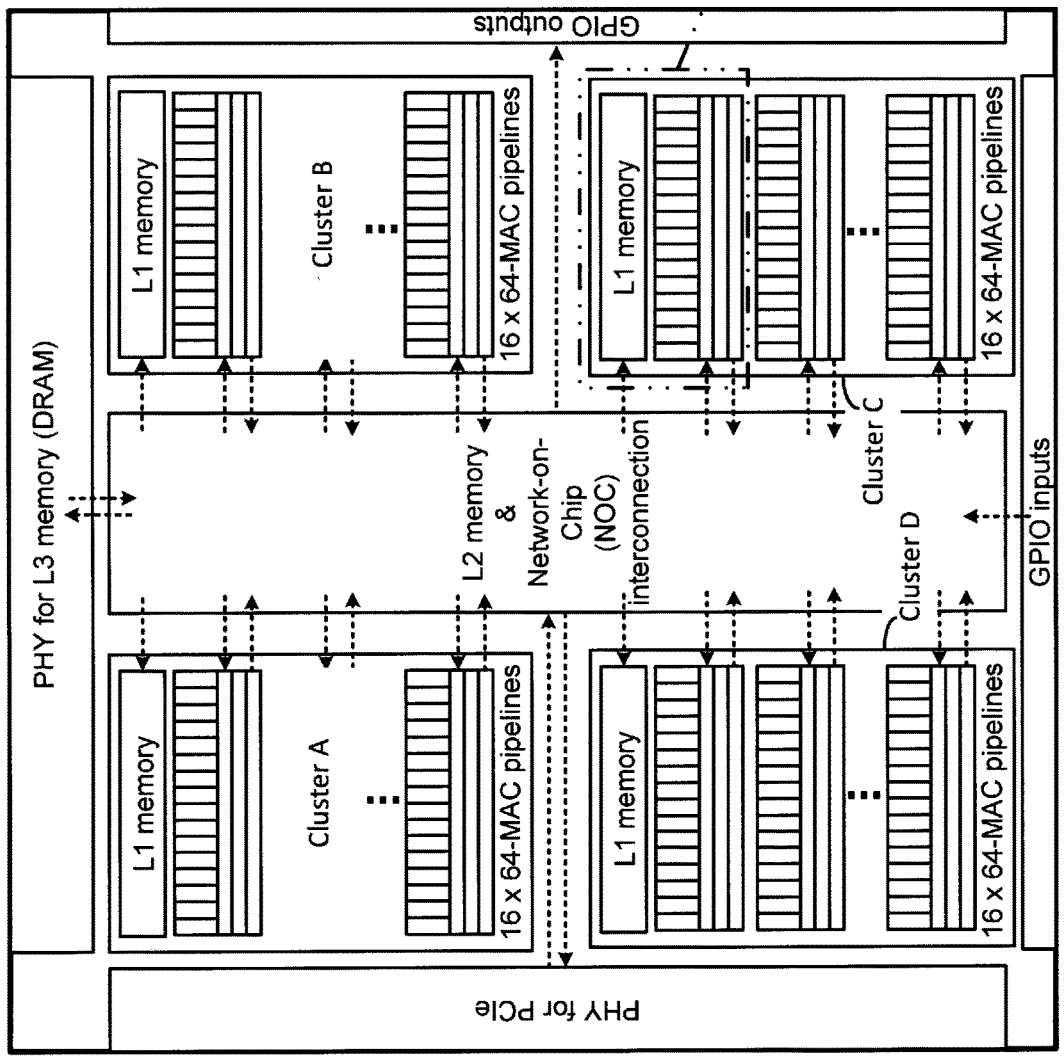

FIG. 14B

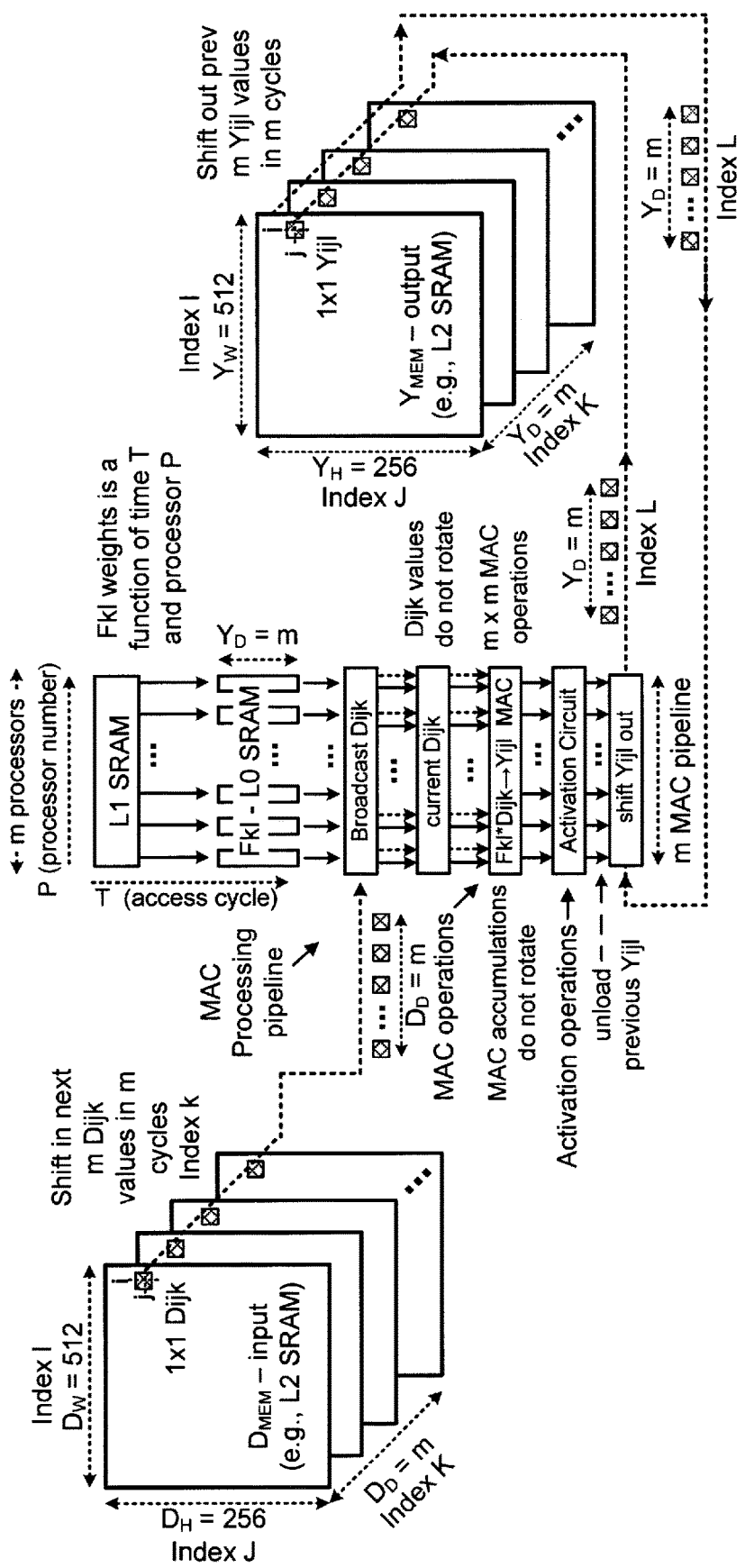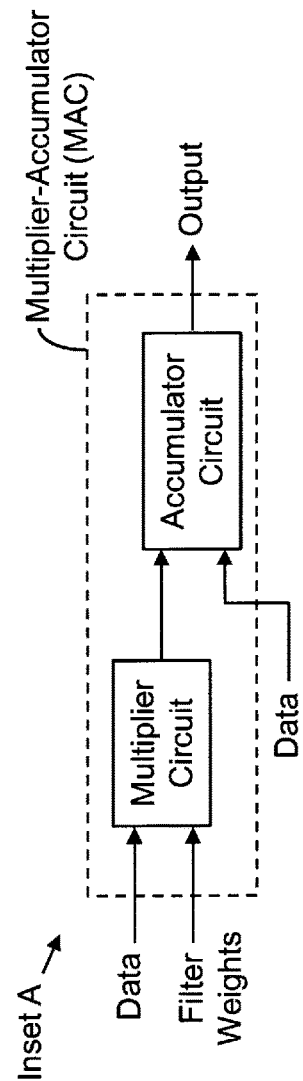
FIG. 16A

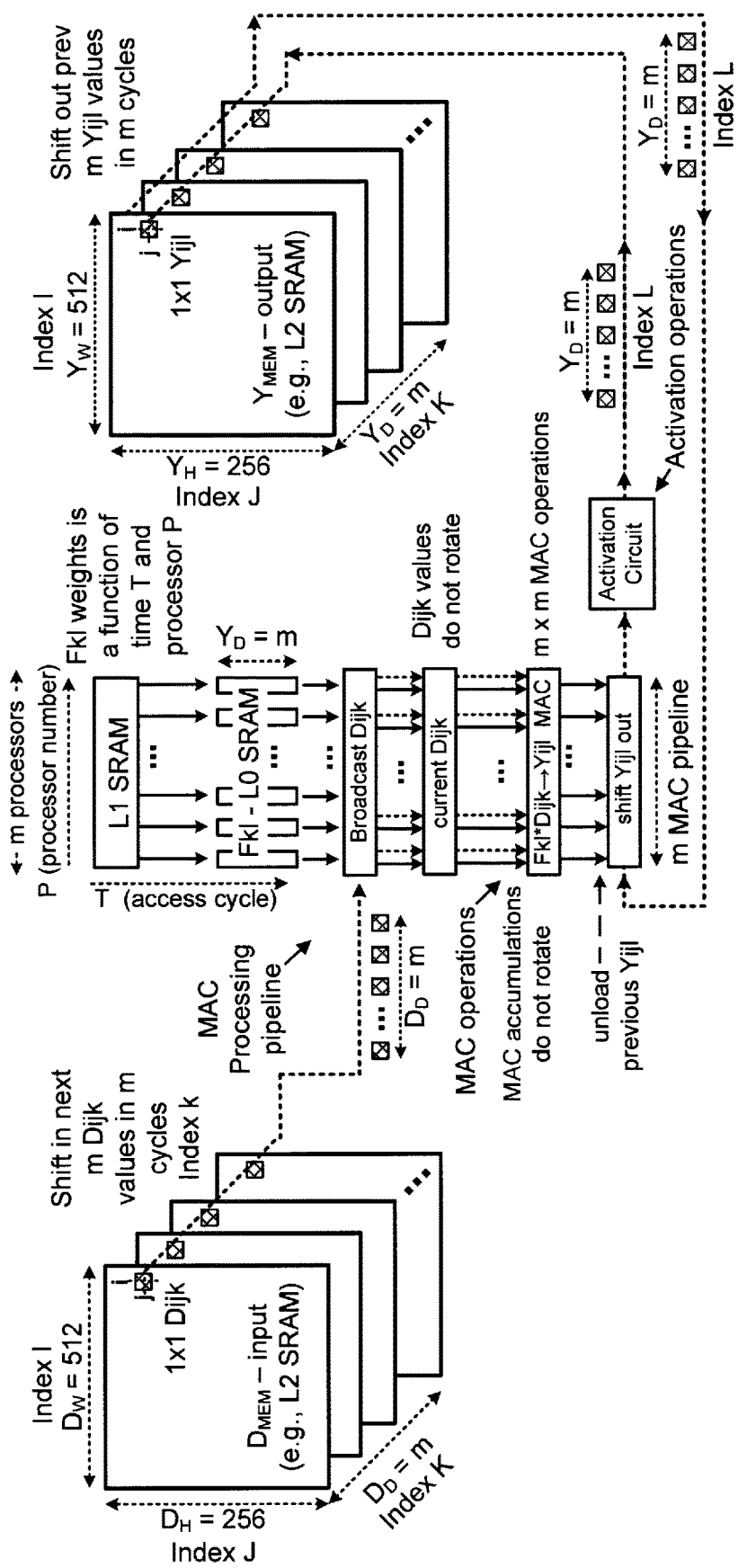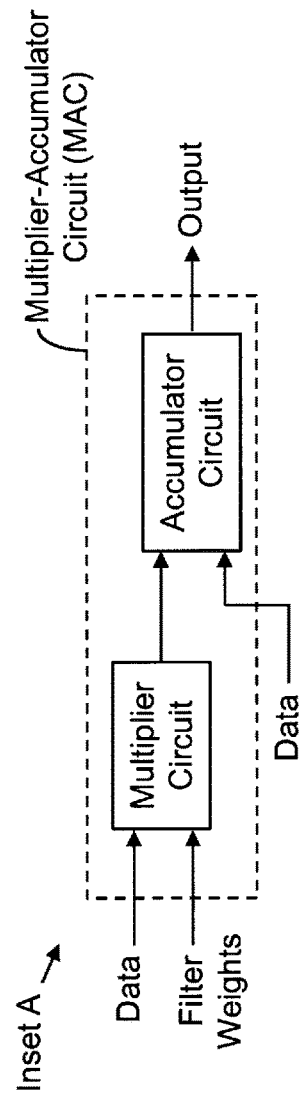
FIG. 16B

In one embodiment, each m-MAC execution pipeline includes a dedicated L0 SRAM memory, and each n x m-MAC cluster includes a shared L1 SRAM memory. The shift-in and shift-out paths of each m-MAC execution pipeline are coupled to the L2 SRAM memory. The L2 memory also couples to the L1/L0 memories. In one embodiment m=64 and n=16, as illustrated.

A network-on-chip (NOC) couples the L2 memory to a PHY (physical interface) to communicate with L3 memory (e.g., external DRAM). The NOC also couples to a PCIe PHY which, in turn, couples to an external host. In one embodiment, the NOC also couples to GPIO input/output PHYs, which allow multiple X1 components to be operated concurrently.

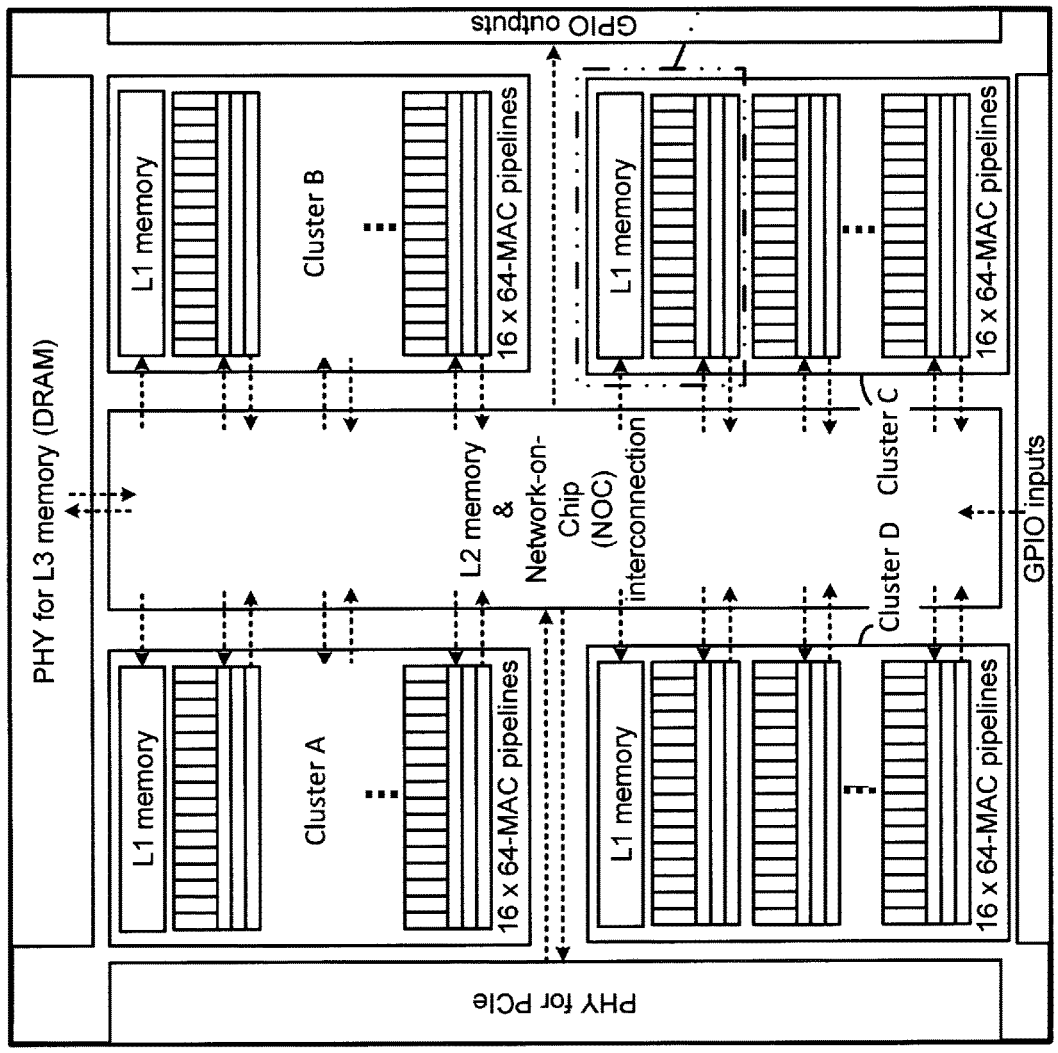

FIG. 17A

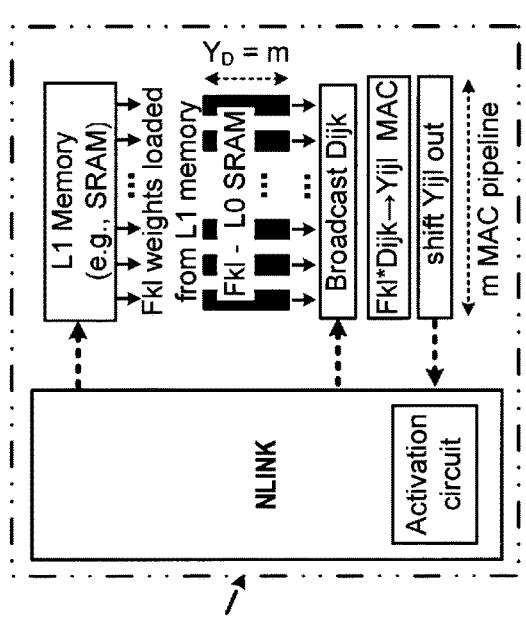
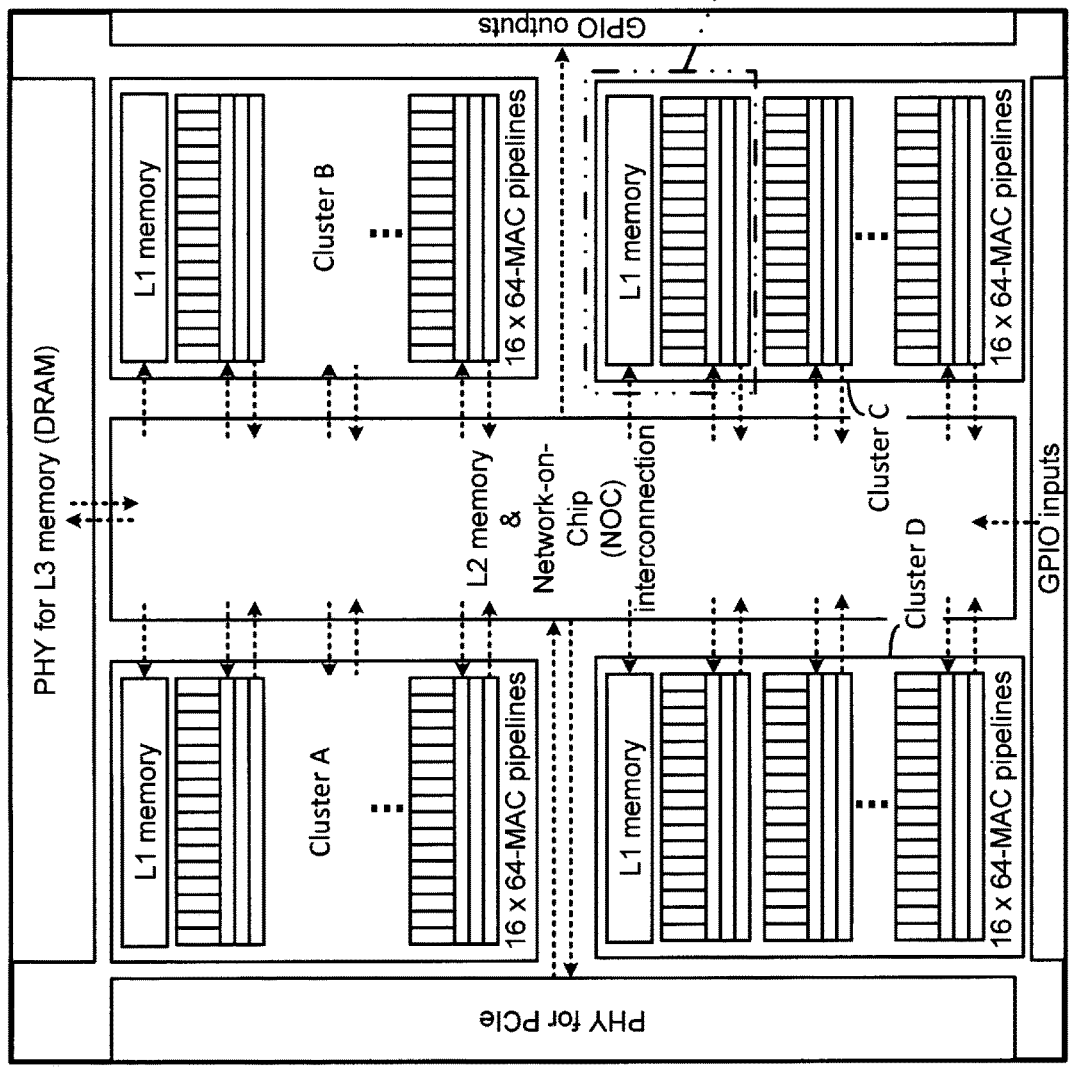

In one embodiment, each m-MAC execution pipeline includes a dedicated L0 SRAM memory, and each n x m-MAC cluster includes a shared L1 SRAM memory. The shift-in and shift-out paths of each m-MAC execution pipeline are coupled to the L2 SRAM memory. The L2 memory also couples to the L1/L0 memories. In one embodiment m=64 and n=16, as illustrated.

A network-on-chip (NOC) couples the L2 memory to a PHY (physical interface) to communicate with L3 memory (e.g., external DRAM). The NOC also couples to a PCIe PHY which, in turn, couples to an external host. In one embodiment, the NOC also couples to GPIO input/output PHYs, which allow multiple X1 components to be operated concurrently.

FIG. 17B

MAC PROCESSING PIPELINE HAVING ACTIVATION CIRCUITRY, AND METHODS OF OPERATING SAME

RELATED APPLICATION

This non-provisional application claims priority to and the benefit of U.S. Provisional Application No. 63/144,553, entitled "MAC Pipeline having Activation Circuitry, and Methods of Operating Same", filed Feb. 2, 2021. The '553 provisional application is hereby incorporated herein by reference in its entirety.

INTRODUCTION

There are many inventions described and illustrated herein. The present inventions are neither limited to any single aspect nor embodiment thereof, nor to any combinations and/or permutations of such aspects and/or embodiments. Importantly, each of the aspects of the present inventions, and/or embodiments thereof, may be employed alone or in combination with one or more of the other aspects of the present inventions and/or embodiments thereof. All combinations and permutations thereof are intended to fall within the scope of the present inventions.

In one aspect, the present inventions are directed to activation circuitry to implement one or more operations or processes, including, for example, linear and/or non-linear activation operations and/or threshold functions. In one embodiment, the activation circuitry is employed in connection with one or more multiplier-accumulator circuits (referred to herein, at times, as "MAC", MACs, "MAC circuit" and/or "MAC circuits") of, for example, one or more MAC execution or processing pipelines wherein activation circuitry processes data (e.g., image data) that are initially or first processed or filtered via one or more MAC circuits of the pipeline. In one embodiment, the MAC pipeline includes a plurality of MAC circuits that are serially interconnected into a linear pipeline.

The activation circuitry of the present inventions may be fixed (e.g., at manufacture) or programmable/configurable (e.g., one-time or more than one-time). For example, in one embodiment, the activation circuitry is more than one-time programmable/configurable such that the operation or process implemented thereby may be programmed, configured or selected (e.g., in situ) between a plurality of linear and/or non-linear activation operations or threshold functions. In one embodiment, where the activation circuitry is incorporated or connected in a MAC pipeline, the activation circuitry may be programmed or configured, for example, in situ (i.e., during normal operation of the integrated circuit) and/or at or during power-up, start-up, initialization, re-initialization, configuration, re-configuration or the like, to process the output of the MAC circuits of the pipeline via, a non-linear activation operation or threshold function. In this way, the activation circuitry applies a non-linear operation on or performs non-linear processing of linear data generated by the MAC circuit(s) of the MAC pipeline(s), via performance of multiply and accumulation operations, and thereafter output therefrom. Indeed, in one embodiment, the activation circuitry includes a plurality of activation circuits wherein each activation circuit is incorporated with or connected into an associated MAC processing pipeline to process the output of the MAC circuit(s) of the associated MAC pipeline (e.g., performing non-linear activation operation(s) or threshold function(s) on the data output from the MAC circuit(s) of the associated MAC pipeline). Each activation circuit of the circuitry may be connected to an associated output of the accumulator circuit of the MAC(s) of the associated MAC pipeline to implement or perform the selected operation or function (e.g., non-linear threshold function) in connection with the data output of the accumulator circuit from the last MAC of the plurality of MACs of the associated MAC pipeline. In one embodiment, the activation circuit may process (e.g., perform non-linear filtering operation) the data output from the last MAC of the plurality of serially interconnected MACs of the associated MAC pipeline at the same data processing rate as the data processing rate of the MACs of the processing pipeline.

In one embodiment, activation circuit control circuitry programs, configures and/or controls the activation circuit or activation circuitry (e.g., a plurality of physically separate and/or separately controllable activation circuits) of the MAC processing pipeline(s). The activation circuit control circuitry may program and/or re-program the activation circuitry to enable and/or select the data processing implemented thereby according to one or more non-linear threshold functions or operations. In one embodiment, the activation circuit control circuitry may enable and/or select a first data processing path of the activation circuitry to implement a first non-linear threshold function or operation and disable one or more other data processing paths of the activation circuitry that correspond to other non-linear threshold function(s) or operation(s). Indeed, in one embodiment, the activation circuit control circuitry may enable and/or select a data processing path in each activation circuit of the activation circuitry to implement a particular processing operation or function that processes the data output of the accumulator circuit from the last MAC of the plurality of MACs of the associated MAC processing pipeline. The activation circuit control circuitry may enable and/or select a data processing path, in one or more (or all) of the activation circuits, which performs the same processing operation or function in each of the activation circuits or different processing operations or functions in one or more (or all) of the activation circuits. As noted above, in one embodiment, each activation circuit of the activation circuitry is associated with a given MAC processing pipeline and/or a different or separate MAC processing pipeline.

The activation circuit control circuitry may program and/or re-program the activation circuitry to process the data according to one or more of a range of activation behaviors—which is may be implemented by scheduling extra (floating point) addition and/or multiplication operations to bias and/or scale the output of the MAC execution pipeline(s) before implementing a fixed activation operation or function. In one embodiment, however, the activation circuit control circuitry programs and/or re-programs the activation circuitry to process the data according to one of a range of non-linear threshold functions or operations whereby the selected or programmed function or operation implemented by the activation circuitry is performed without extra addition and/or multiplication operations. In this embodiment, the MAC processing pipeline, having the configurable/programmable activation circuitry, may not perform additional or extra addition and/or multiplication operations to bias and/or scale the output of the MAC execution pipeline.

The activation circuit control circuitry may program and/or re-program the activation circuit of each MAC processing pipeline, for example, in situ (i.e., during normal operation of the integrated circuit) and/or at or during power-up, start-up, initialization, re-initialization, configuration, re-configuration or the like. In one embodiment, memory (e.g., a configuration register) may store activation configuration data, including the linear and/or non-linear activation operations or threshold functions of the data processing performed by the activation circuits of the activation circuitry. Such memory may be programmed at or during power-up, start-up, initialization, re-initialization and/or in situ.

Thus, the data processing performed or implemented by the activation circuitry on the output of the MACs of the MAC pipeline may be user or system defined and/or may be one-time programmable (e.g., at manufacture) or more than one-time programmable (e.g., (i) at or via power-up, start-up or performance/completion of the initialization sequence/process sequence, and/or (ii) in situ or during normal operation). That is, the activation circuitry may be programmed and/or re-programmed in situ and/or prior to normal operation of the integrated circuit (e.g., the programmable MAC image processing pipeline) to perform a non-linear threshold function(s) or operation(s) on the output(s) of the MAC pipeline(s).

Notably, the present inventions may employ one or more the multiplier-accumulator circuits that are described and illustrated in the exemplary embodiments of FIGS. 1A-1C of U.S. patent application Ser. Nos. 16/545,345 and 17/019,212, and the text associated therewith. Here, the multiplier-accumulator circuitry described and/or illustrated in the '345 and '212 applications facilitate concatenating the multiply and accumulate operations, and reconfiguring the circuitry thereof and operations performed thereby. The plurality of multiplier-accumulator circuits may also include a plurality of registers (including a plurality of shadow registers) wherein the circuitry also controls such registers to implement or facilitate the pipelining of the multiply and accumulate operations performed by the multiplier-accumulator circuits to increase throughput of the multiplier-accumulator execution or processing pipelines in connection with processing the related data (e.g., image data). The '345 and '212 applications are incorporated by reference herein in their entirety.

The MAC processing or execution pipelines may be organized from or disposed on one or more integrated circuits. In one embodiment, the integrated circuit is a discrete field programmable gate array (FPGA) or embedded FPGA (herein after collectively "FPGA" unless expressly stated otherwise). Briefly, an FPGA is an integrated circuit that is configured and/or reconfigured (hereinafter, unless stated otherwise, collectively "configured" or the like (e.g., "configure" and "configurable")) by a user, operator, customer and/or designer before and/or after manufacture. The FPGA may include programmable logic components (often called "logic cells", "configurable logic blocks" (CLBs), "logic array blocks" (LABs), or "logic tiles"—hereinafter collectively "logic tiles")).

In one embodiment of the present inventions, one or more (or all) logic tiles of an FPGA include a plurality of multiplier-accumulator circuits that are interconnected (e.g., serially) to implement multiply and accumulate operations, for example, in a pipelining manner. The output of the pipeline(s) may be connected to the activation circuitry via a switch interconnect network. Here, the switch interconnect network may be configured as a hierarchical and/or mesh interconnect network. The logic tiles may include data storage elements associated with the switch interconnect network, input pins and/or look-up tables (LUTs) that, when programmed, determine the configuration and/or operation of the switches/multiplexers and, among other things, the communication between circuitry (e.g., logic components) within a logic tile (including the MAC circuits and/or MAC processing pipelines) and/or between circuitry of multiple logic tiles (e.g., between MAC circuits and/or MAC processing pipelines of a plurality of logic tiles).

The switch interconnect network may provide a connection to/from logic circuitry of the associated logic tile or a different logic tile to/from multiplier-accumulator circuits (individually) of the multiplier-accumulator circuits of the processing or execution pipelines. In this way, MAC circuits and/or MAC processing pipelines of a plurality of logic tiles may be employed, for example, concurrently, to processes related data (e.g., related image data). Indeed, such connections may be configurable and/or re-configurable—for example, in situ (i.e., during normal operation of the integrated circuit) and/or at or during power-up, start-up, initialization, re-initialization, configuration, re-configuration or the like. In one embodiment, the switch interconnect network may employ one or more embodiments, features and/or aspects of the interconnect network described and/or illustrated in the '345 and '212. Moreover, the switch interconnect network may interface with and/or include one or more embodiments, features and/or aspects of the interface connector described and/or illustrated in the '345 and '212 applications (See, e.g., FIGS. 7A-7C of the '345 application; notably, certain details of the NLINK circuits/structures described and illustrated herein correlate to circuitry/structures described and/or illustrated in the '345 and '212 applications which is referred to and/or identified as NLINX (e.g., NLINX conductors, NLINX interface, NLINX interface connector, NLINX circuits, etc.)). The activation circuit may be disposed in the NLINX or NLINK and connected to the output of the pipeline(s), via circuitry of the NLINX, wherein the activation circuitry may perform a non-linear threshold function(s) or operation(s) on the output(s) of the MAC pipeline(s).

For example, in one embodiment, control circuitry may configure or connect a predetermined number of MACs or rows/banks of MACs to, among other things, implement a predetermined multiplier-accumulator execution or processing pipeline or architecture thereof. (See U.S. patent application Ser. No. 17/212,411, filed Mar. 25, 2021, which is hereby incorporated by reference in its entirety). The activation circuit may be disposed in the NLINK and connected to the output of the pipeline(s), via circuitry of the NLINX, wherein the activation circuit may perform a non-linear threshold function(s) or operation(s) on the output(s) of the MAC pipeline(s). Here, the control circuitry may configure or determine the multiplier-accumulator circuits or rows/banks of interconnected multiplier-accumulator circuits that are connected in the linear pipeline and employed to perform the multiply and accumulate operations wherein the data processed thereby are subsequently output to the activation circuit, which performs, additional processing of the data (e.g., linear data output from the MAC pipeline). As noted above, the configuration control circuitry may be one-time programmable (e.g., at manufacture via, e.g., a programmable fuse array) or multiple-times programmable (including, e.g., at start-up/power-up, initialization, and/or in situ).

Notably, the integrated circuit(s) may be, for example, a processor, controller, state machine, gate array, system-on-chip (SOC), programmable gate array (PGA) and/or FPGA and/or a processor, controller, state machine and SoC including an embedded FPGA. A field programmable gate array or FPGA means both a discrete FPGA and an embedded FPGA unless expressly stated otherwise.

BRIEF DESCRIPTION OF THE DRAWINGS

The present inventions may be implemented in connection with embodiments illustrated in the drawings hereof.

These drawings show different aspects of the present inventions and, where appropriate, reference numerals, nomenclature, and/or names illustrating like circuits, architectures, structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended reflect or indicate the embodiment(s) is/are "example" embodiment(s).

Notably, the configurations, block/data width, data path width, bandwidths, data lengths, values, processes, pseudo-code, operations, and/or algorithms described herein and/or illustrated in the FIGURES, and text associated therewith, are exemplary. Indeed, the inventions are not limited to any particular or exemplary circuit, logical, block, functional and/or physical diagrams, number of multiplier-accumulator circuits employed in an execution pipeline, number of execution pipelines employed in a particular processing configuration, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams.

Moreover, although the exemplary embodiments include a plurality of memories (e.g., L3 memory, L2 memory, L1 memory, L0 memory) which are assigned, allocated and/or used to store certain data and/or in certain organizations, one or more of memories may be added, and/or one or more memories may be omitted and/or combined/consolidated—for example, the L3 memory or L2 memory, and/or the organizations may be changed, supplemented and/or modified. The inventions are not limited to the exemplary embodiments of the memory organization and/or allocation set forth in the application. Again, the inventions are not limited to the exemplary embodiments, including the different memory embodiments, set forth herein.

Figure 1:
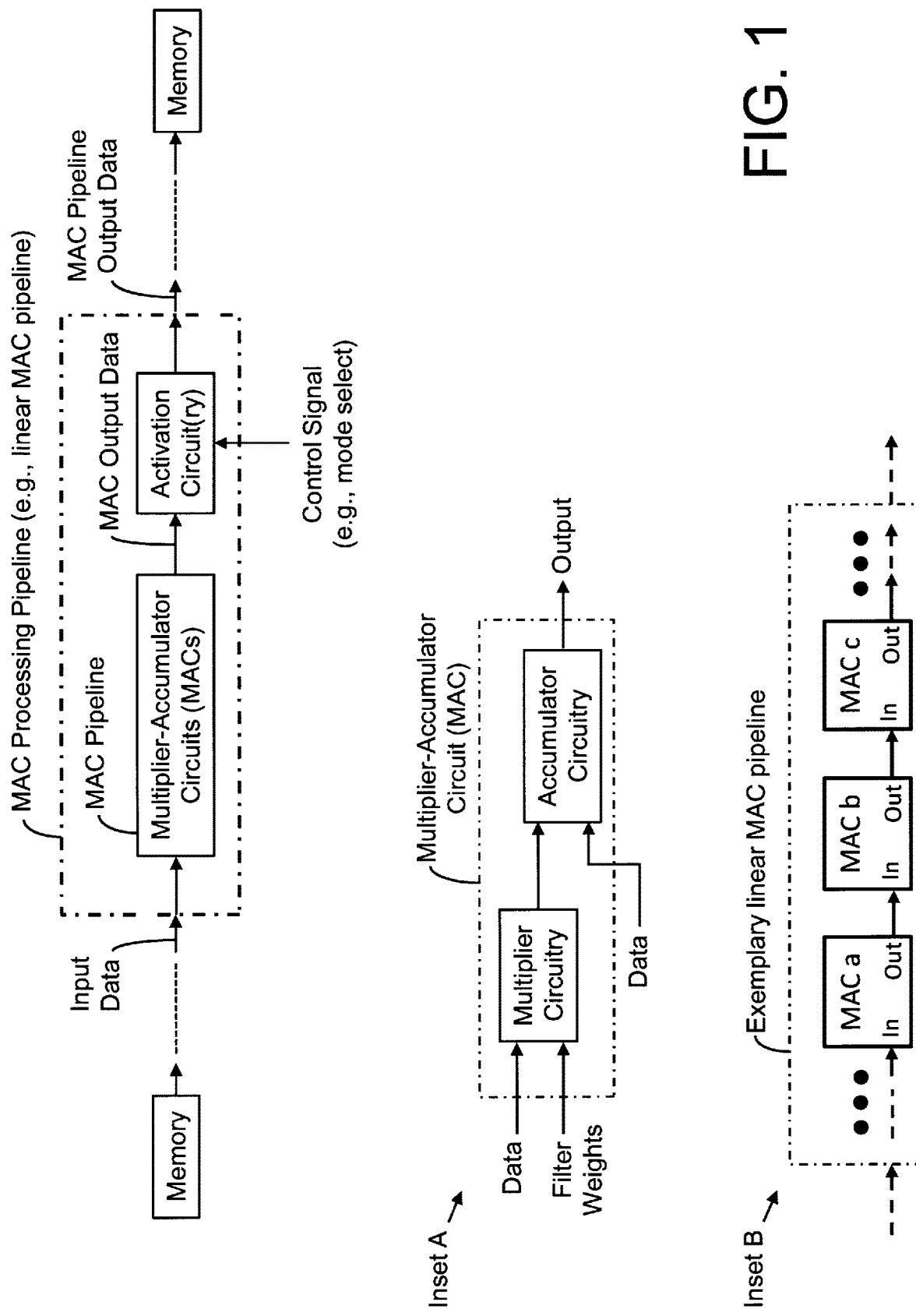
Figure 2A:
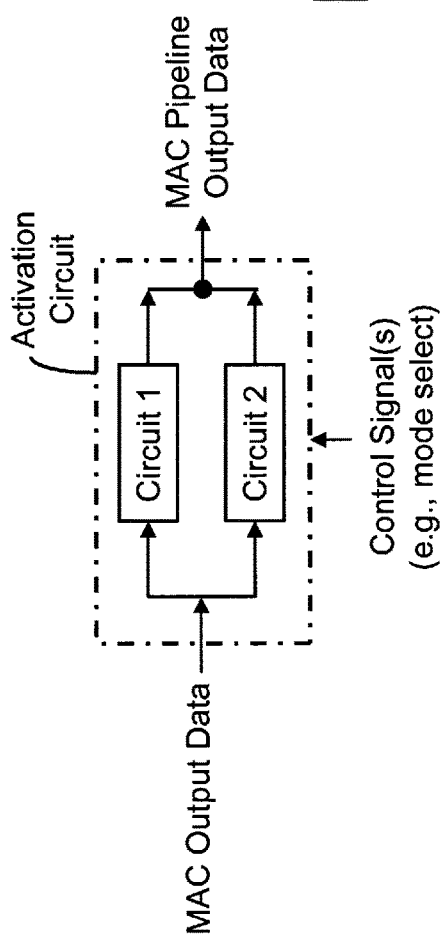
Figure 2B:
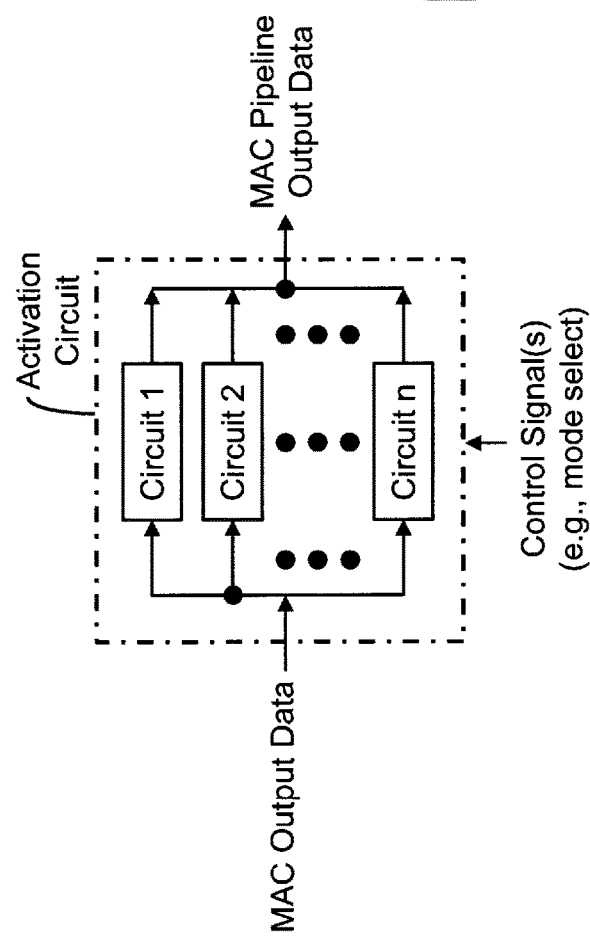
Figure 2C:
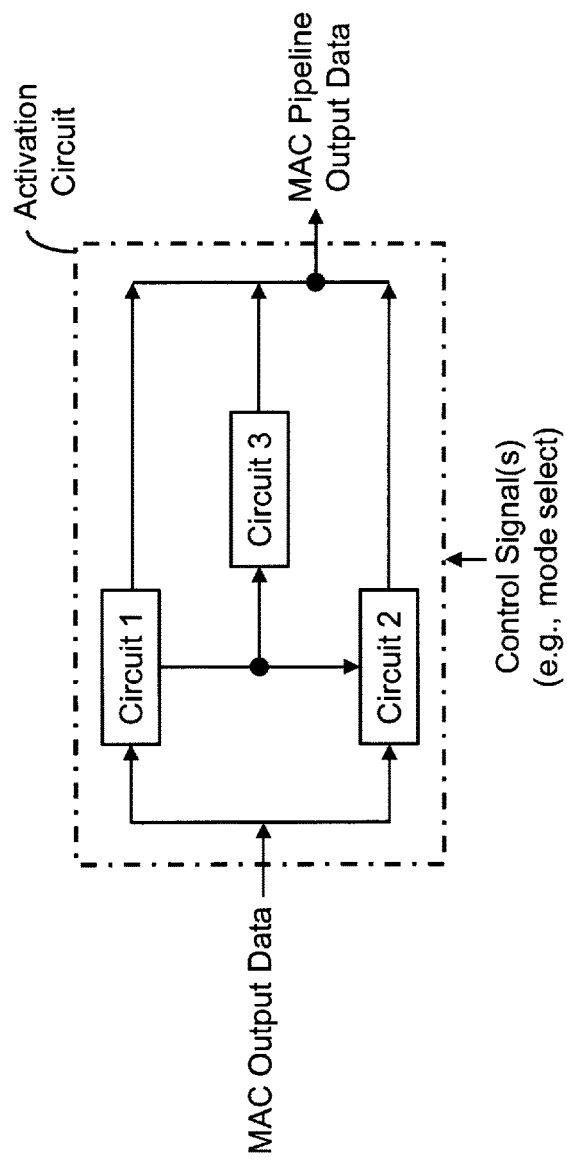
Figure 2D:
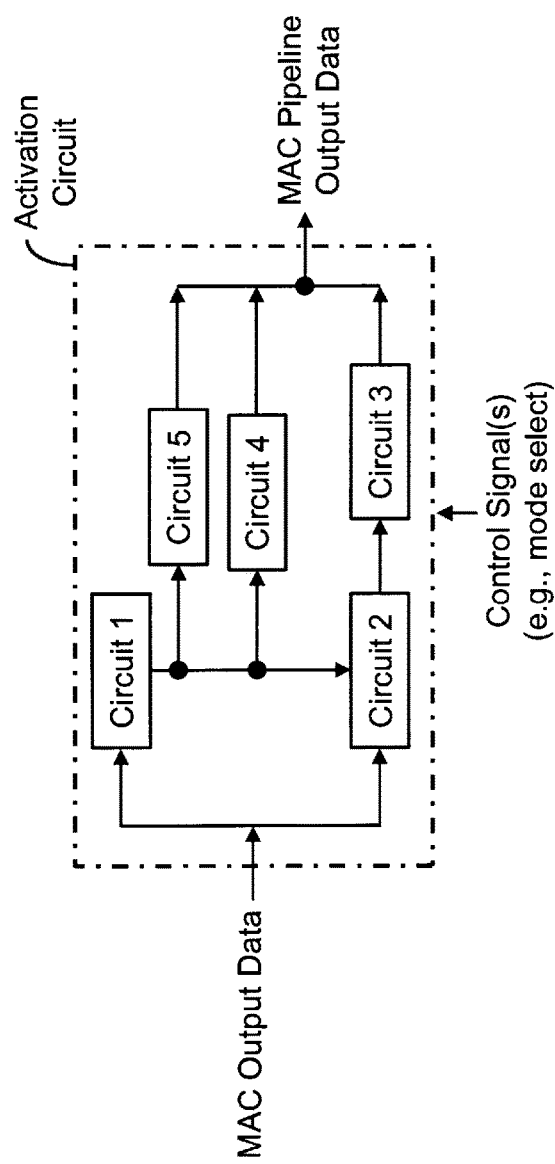
Figure 2E:
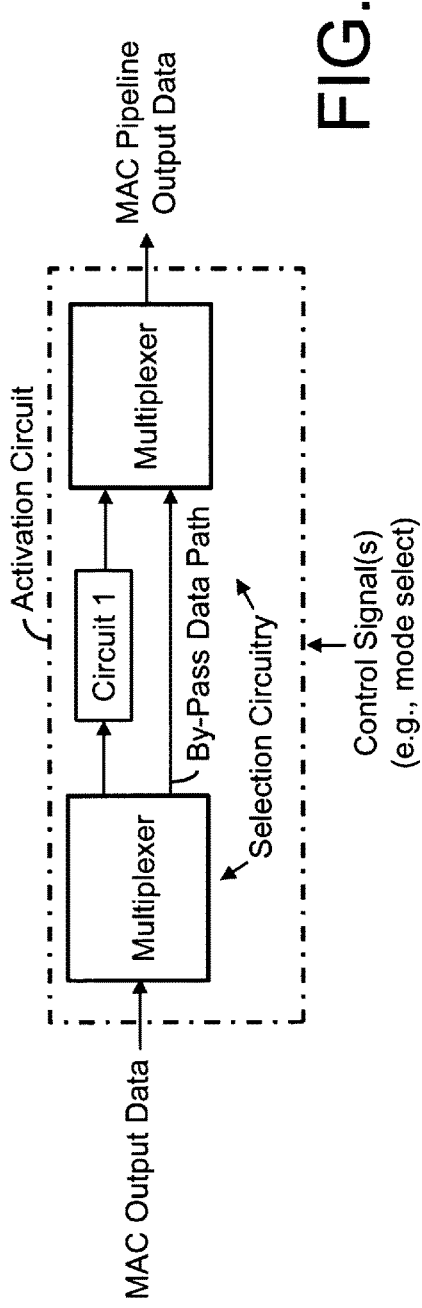
Figure 2F:
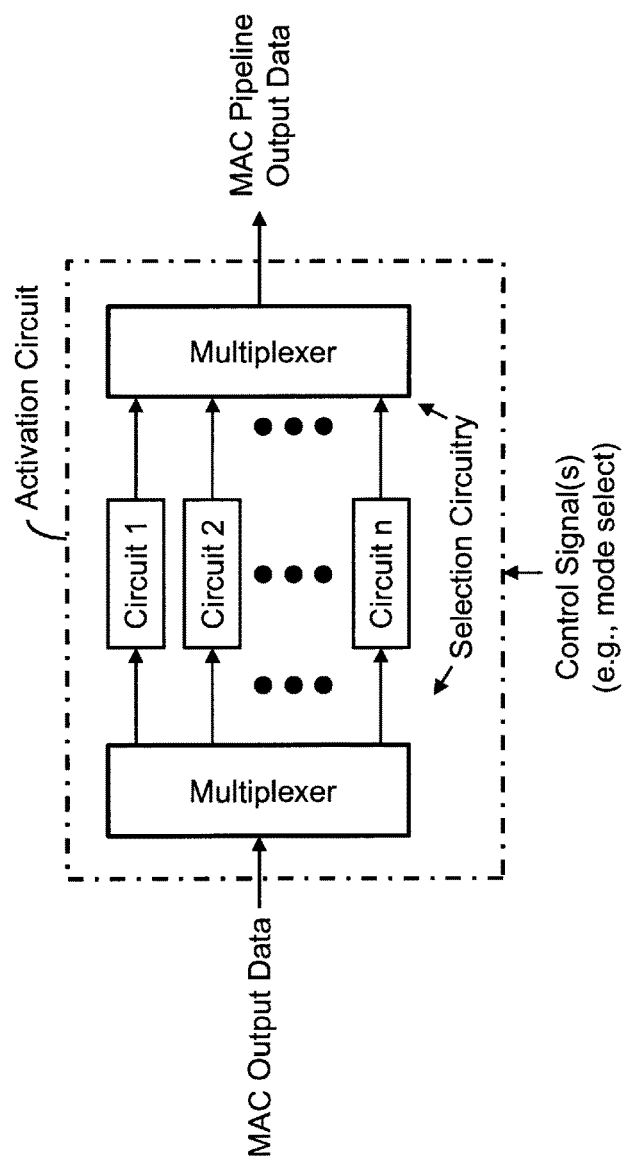
Figure 3:
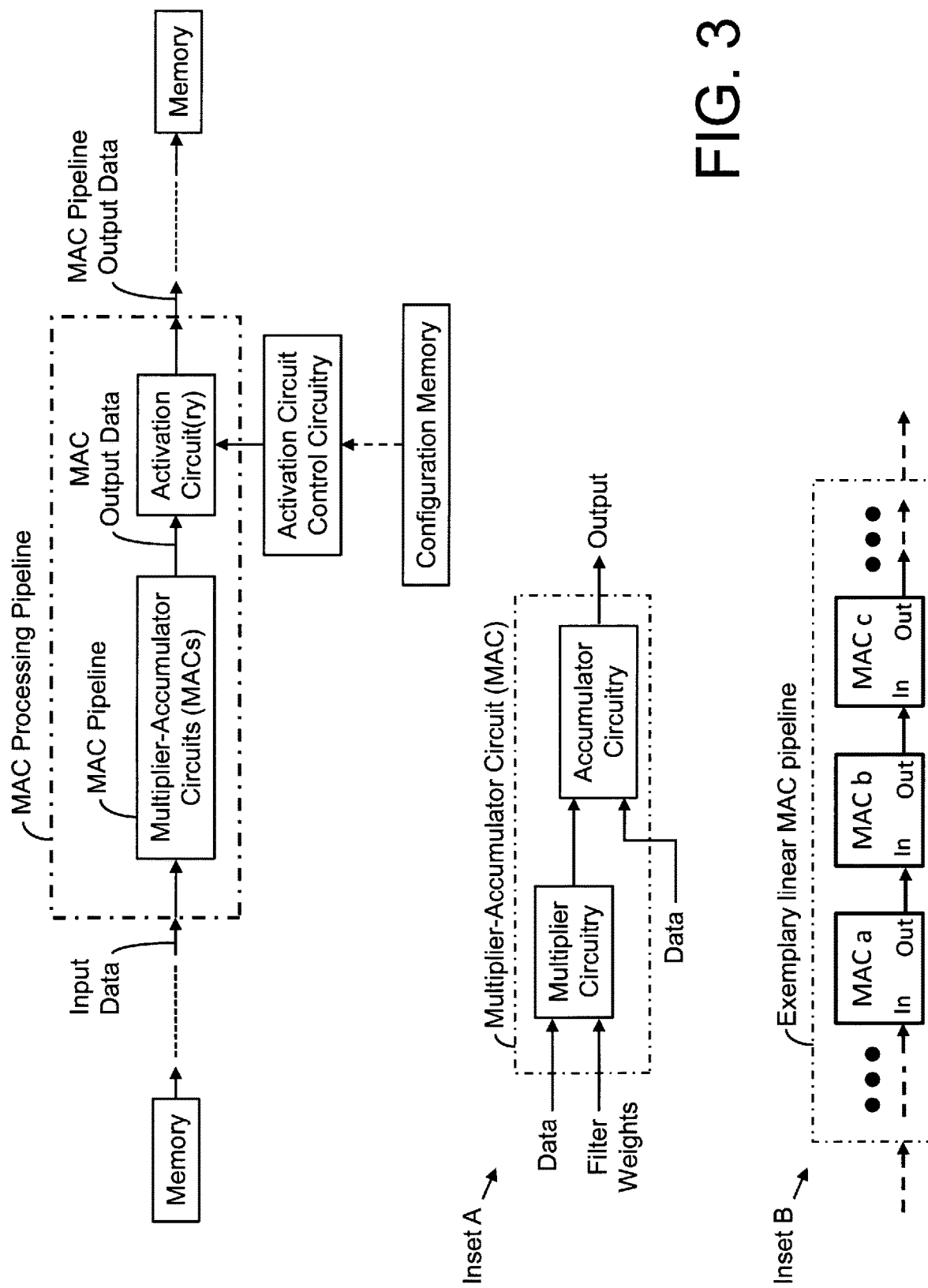
Figure 4A:
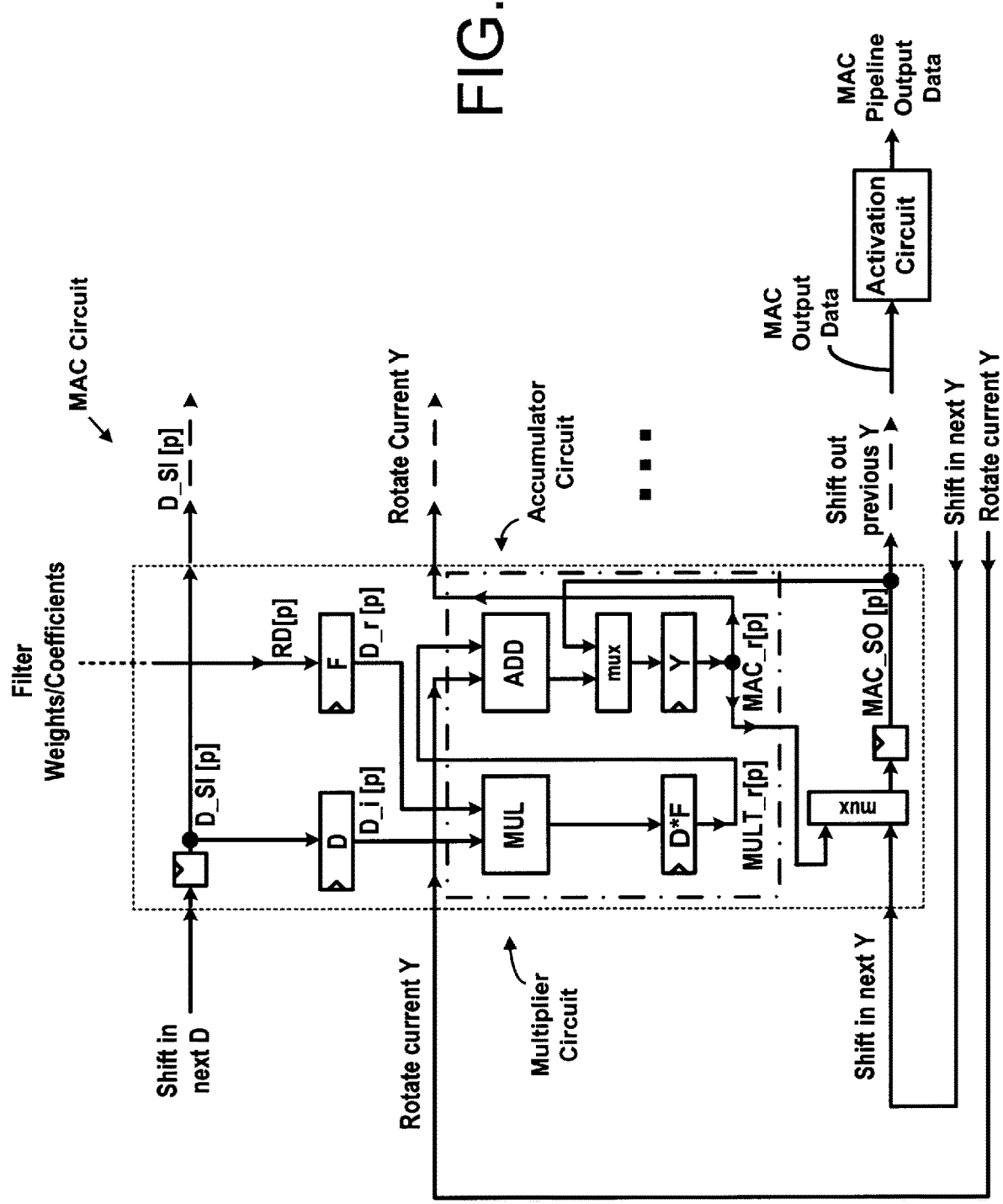
Figure 4B:
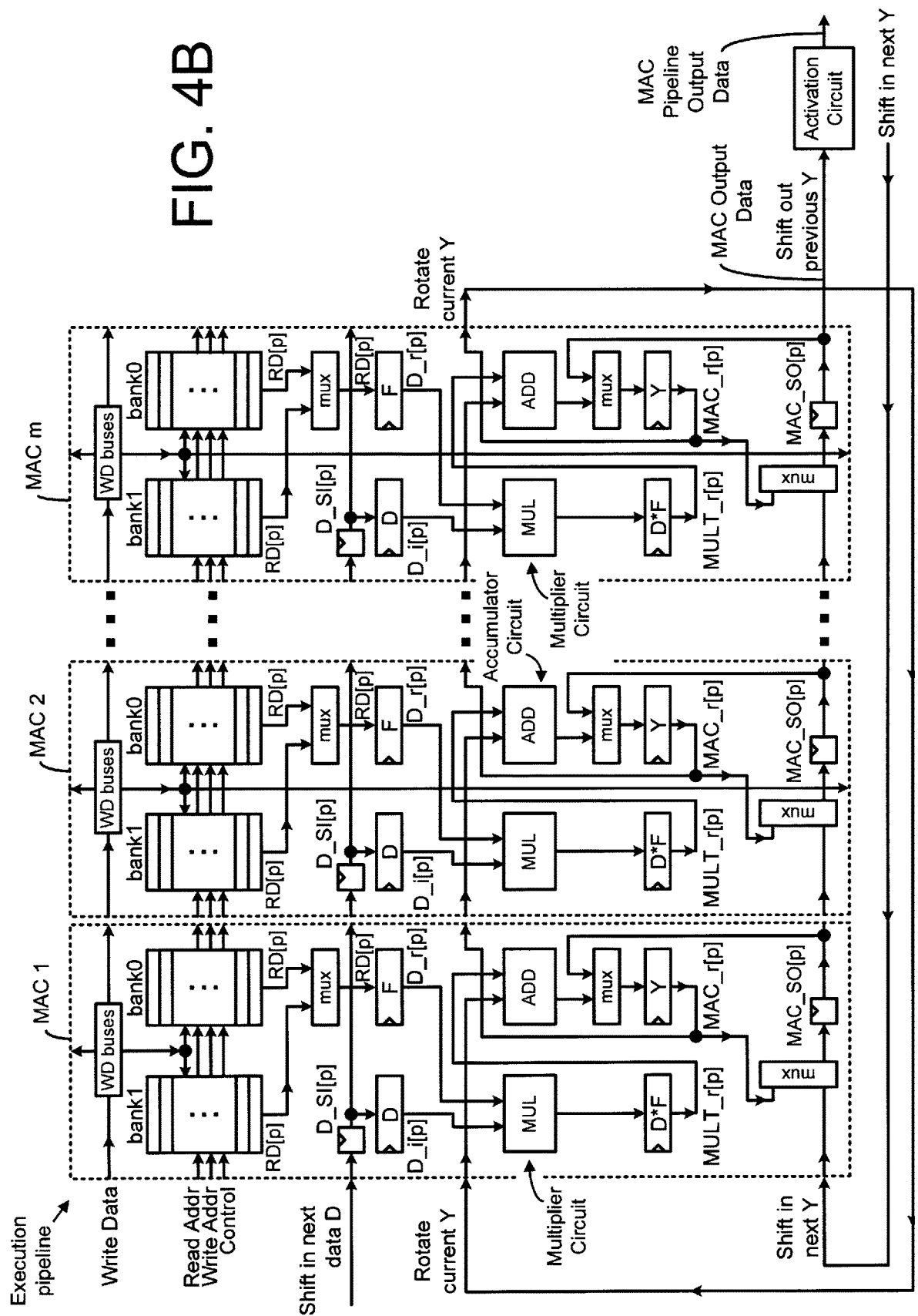
Figure 5A:
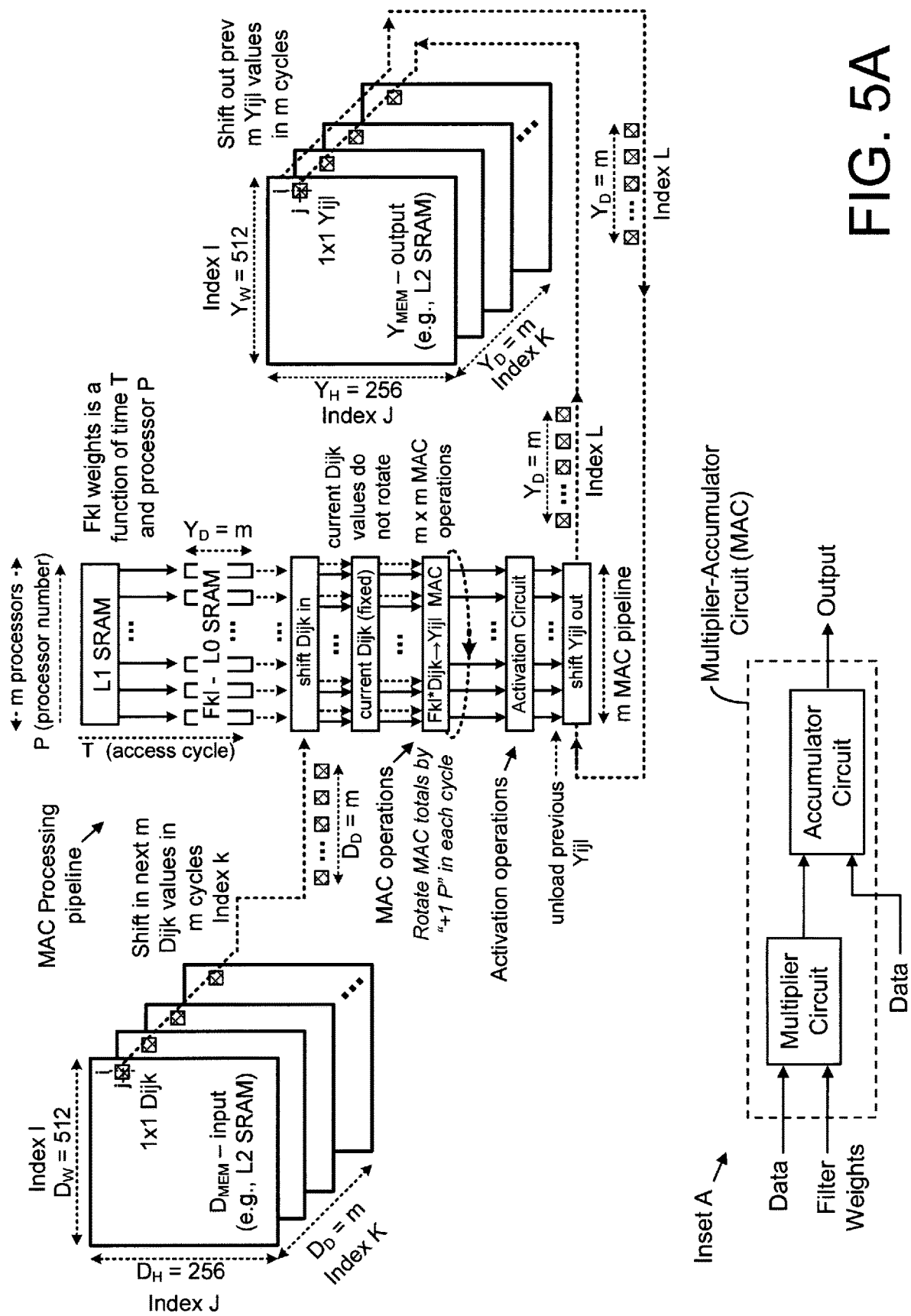
Figure 5B:
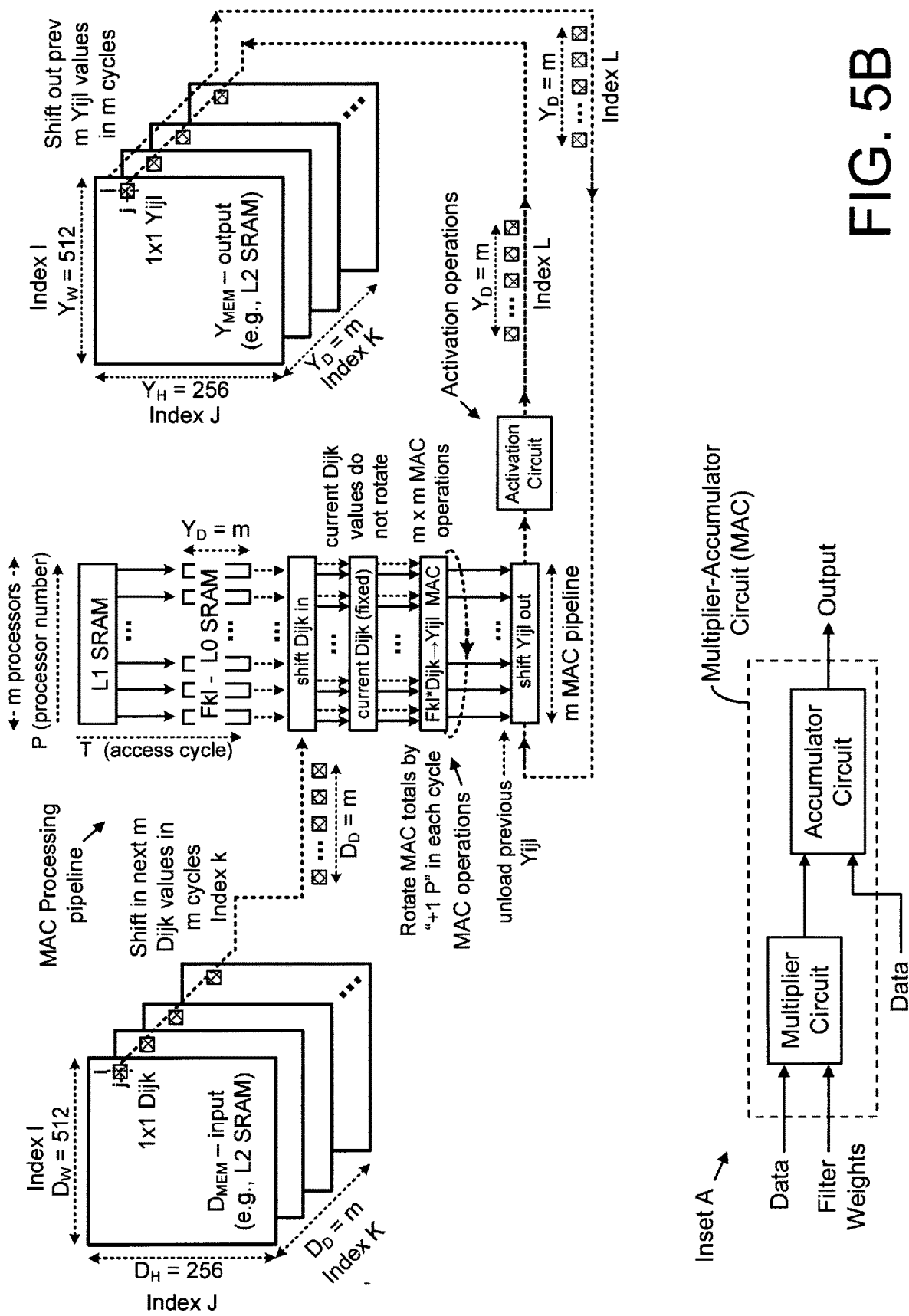
Figure 7A:
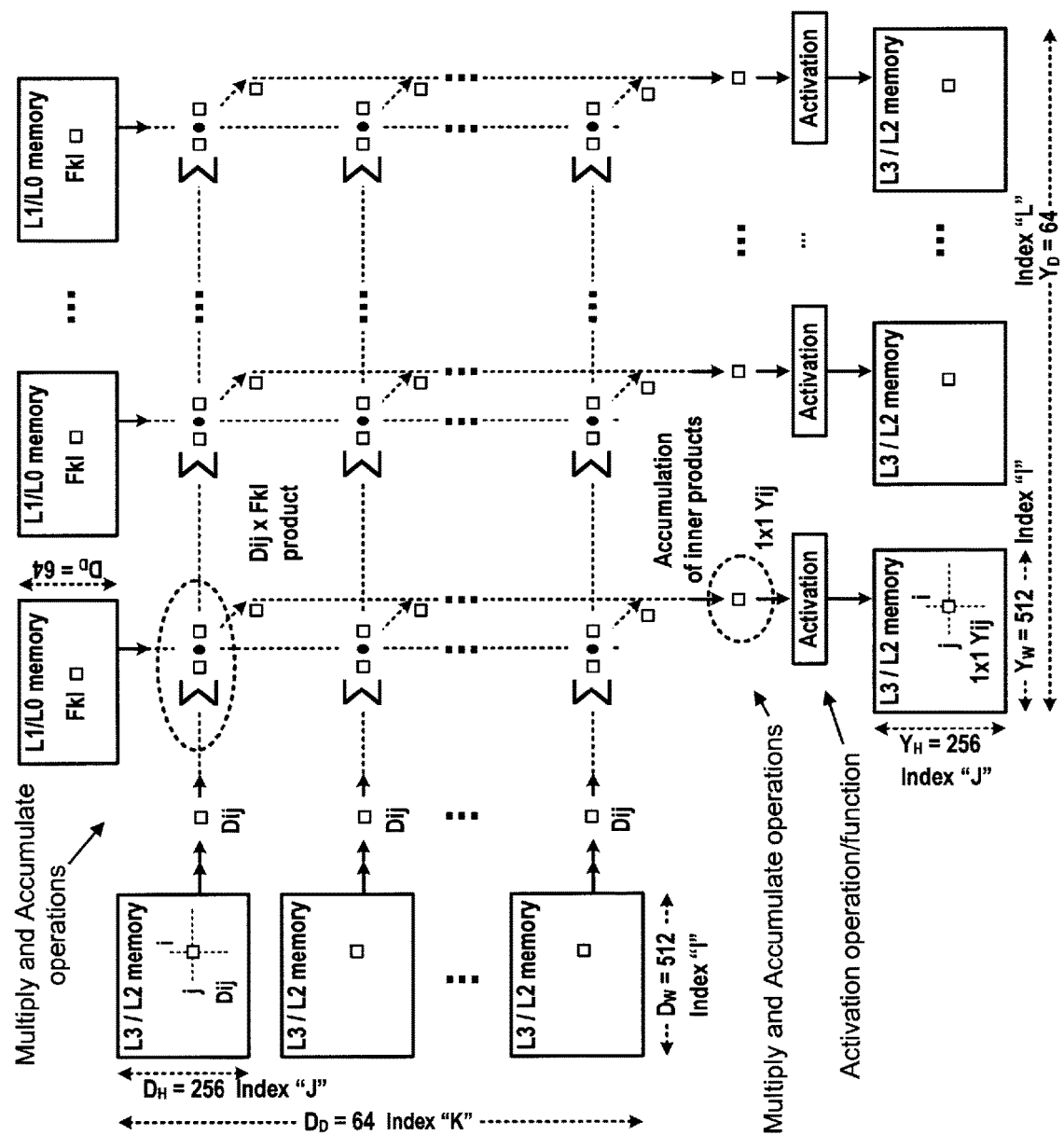
Figure 7B:
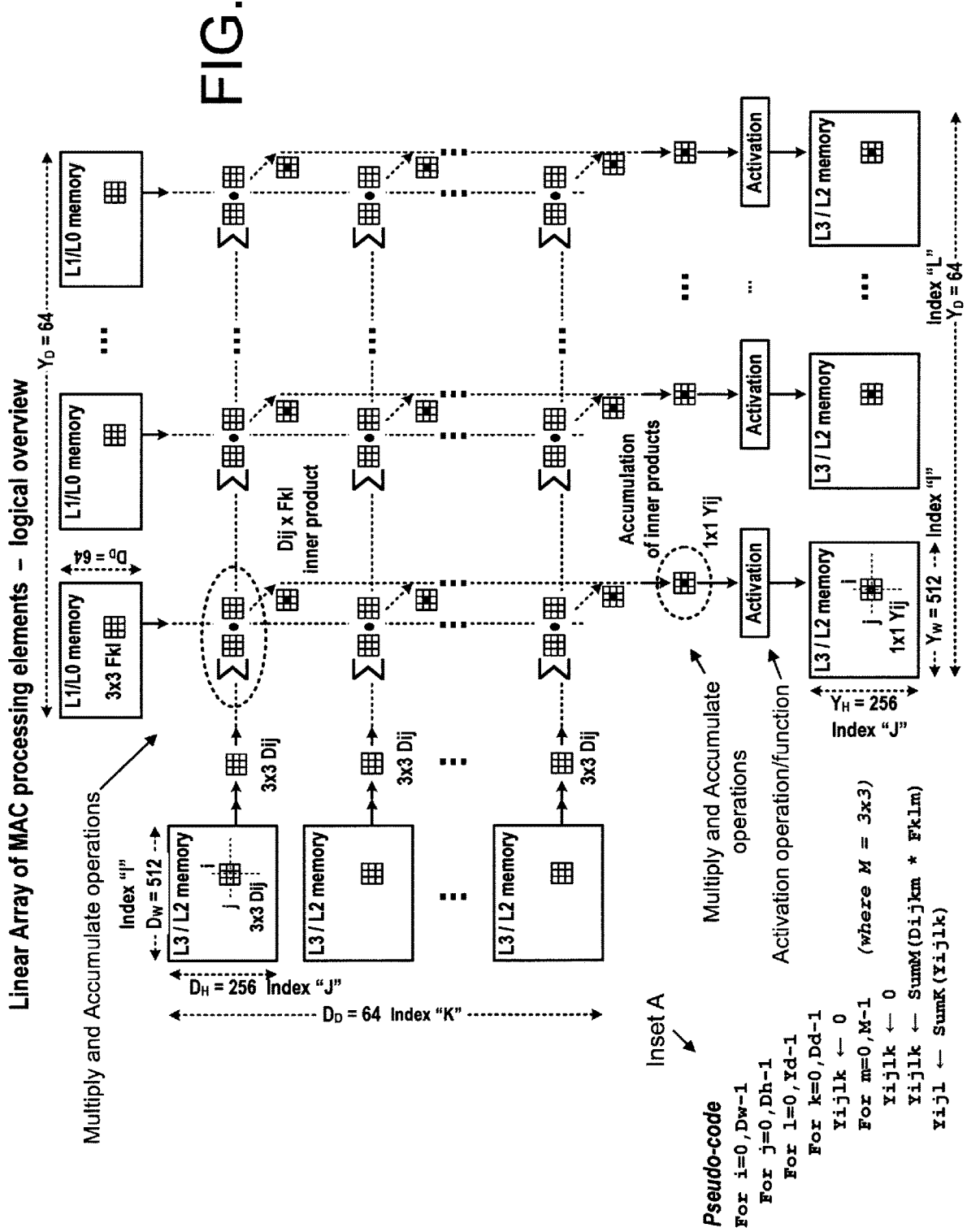
Figure 7C:
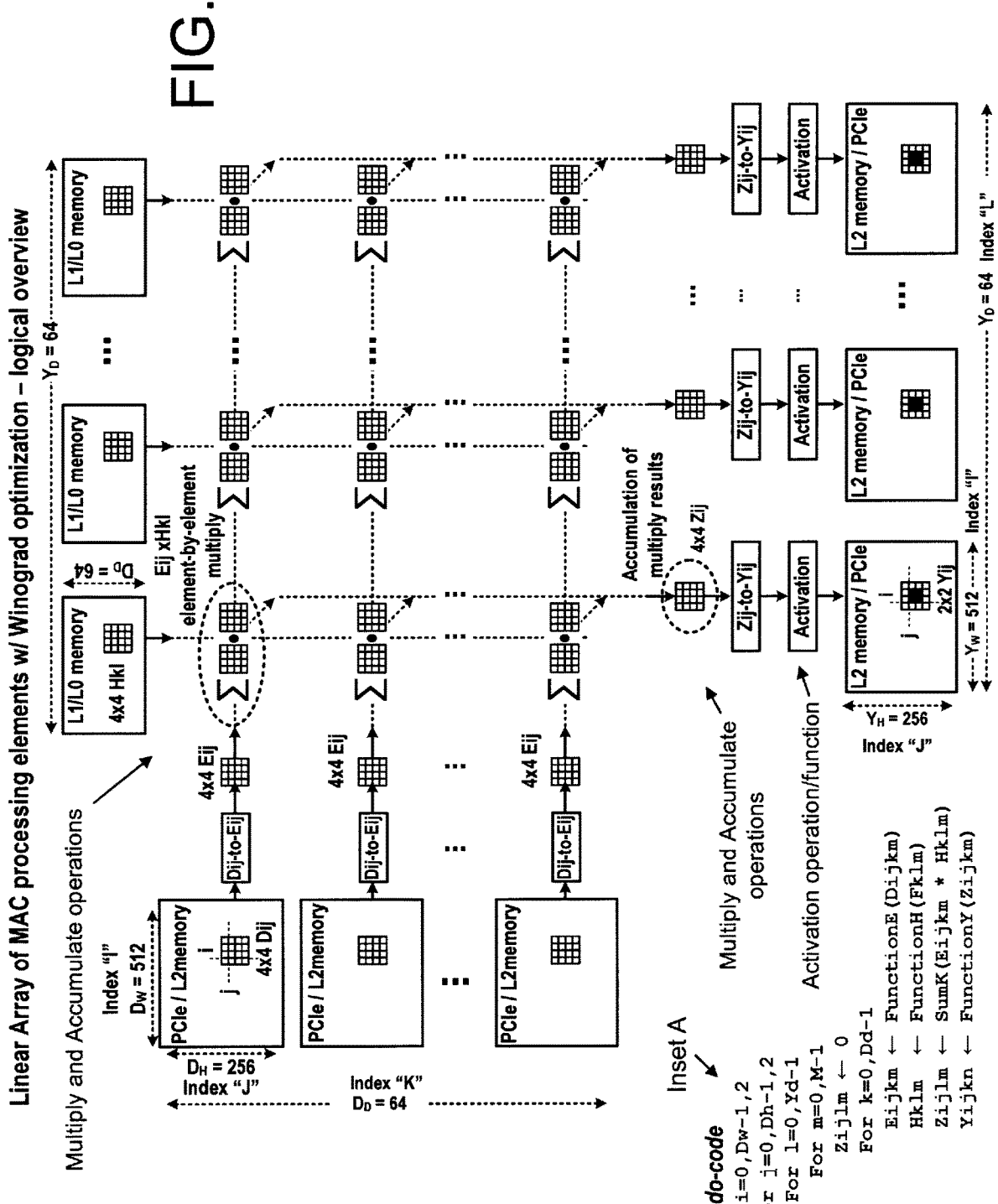
Figure 8:
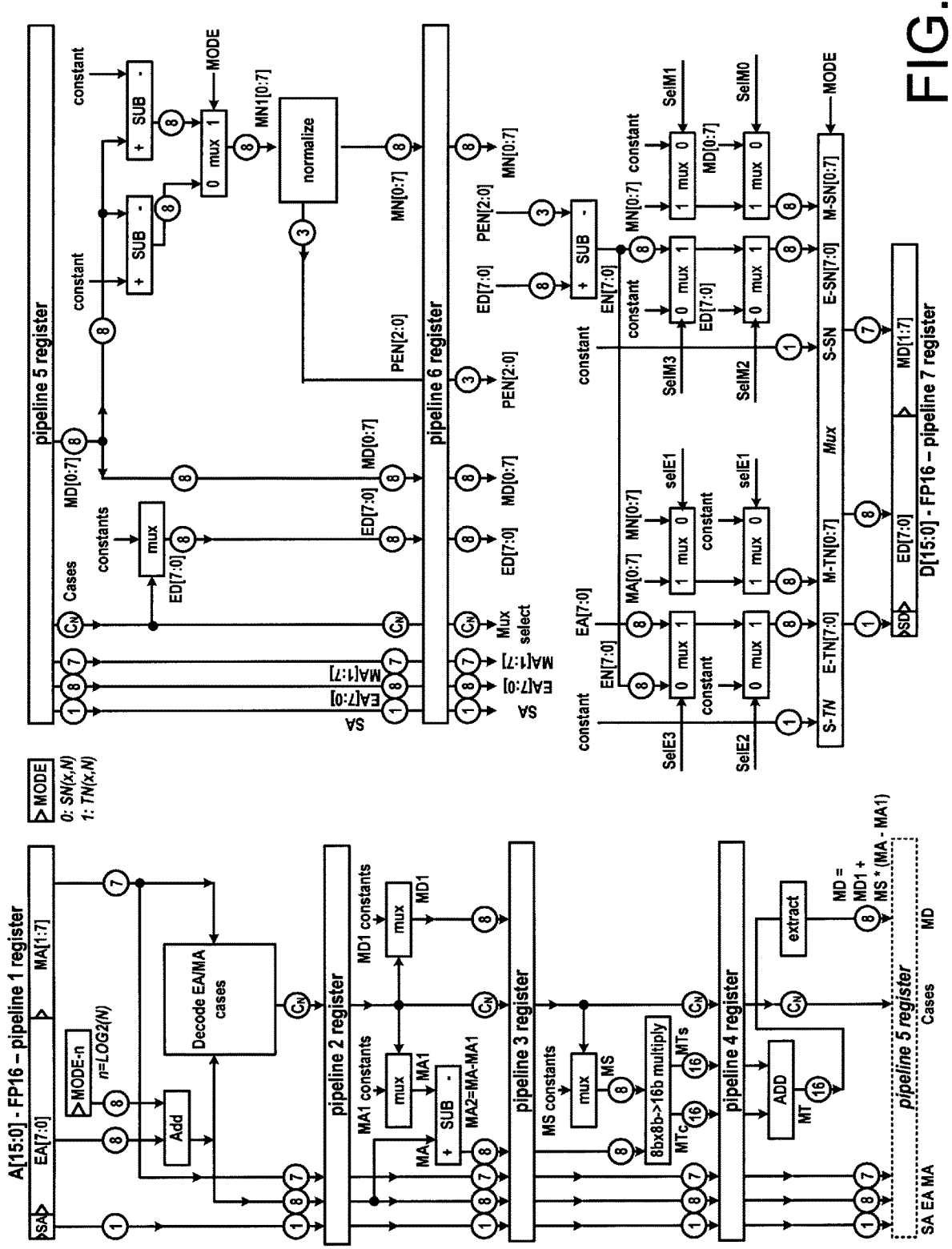
Figure 9A:
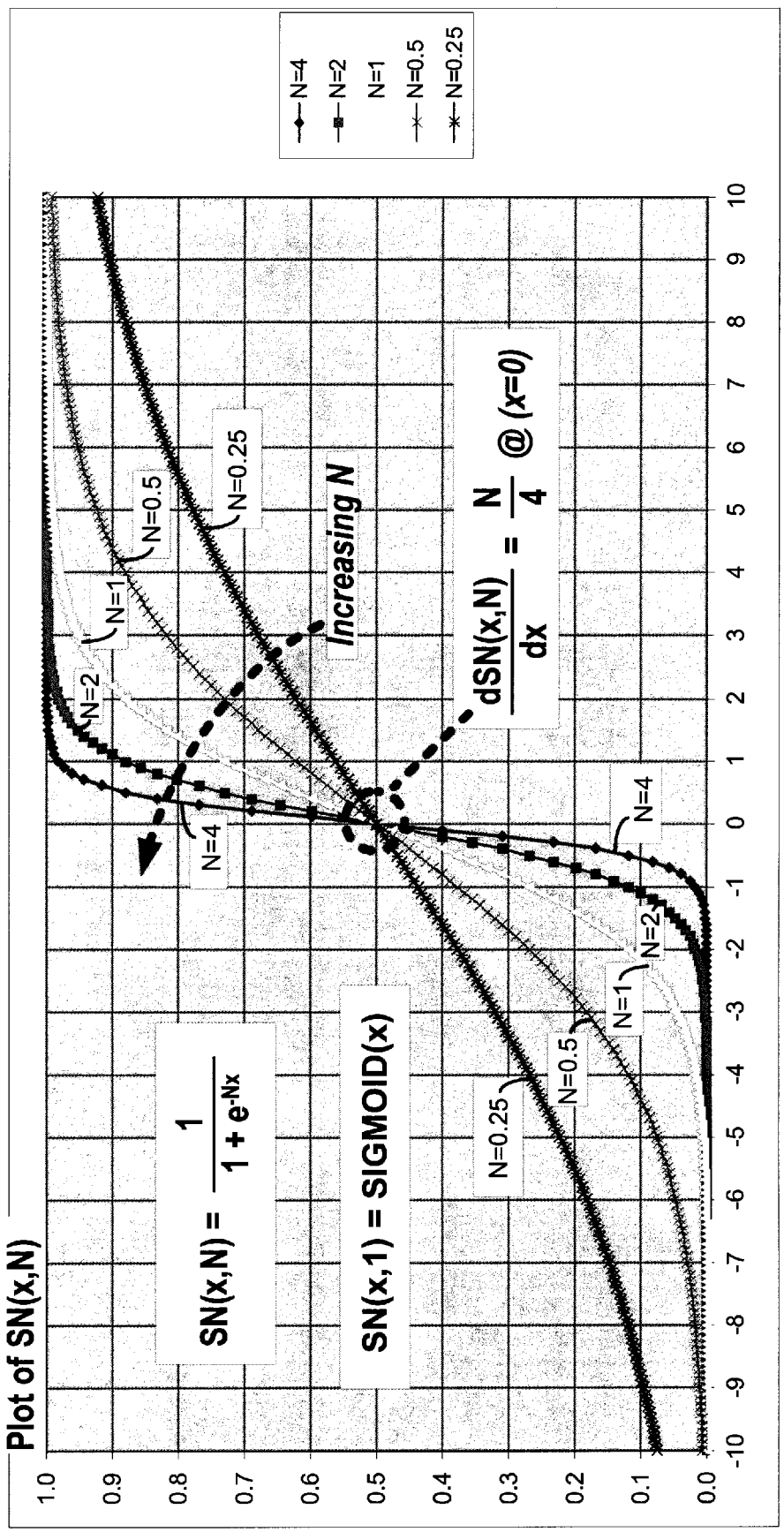
Figure 9B:
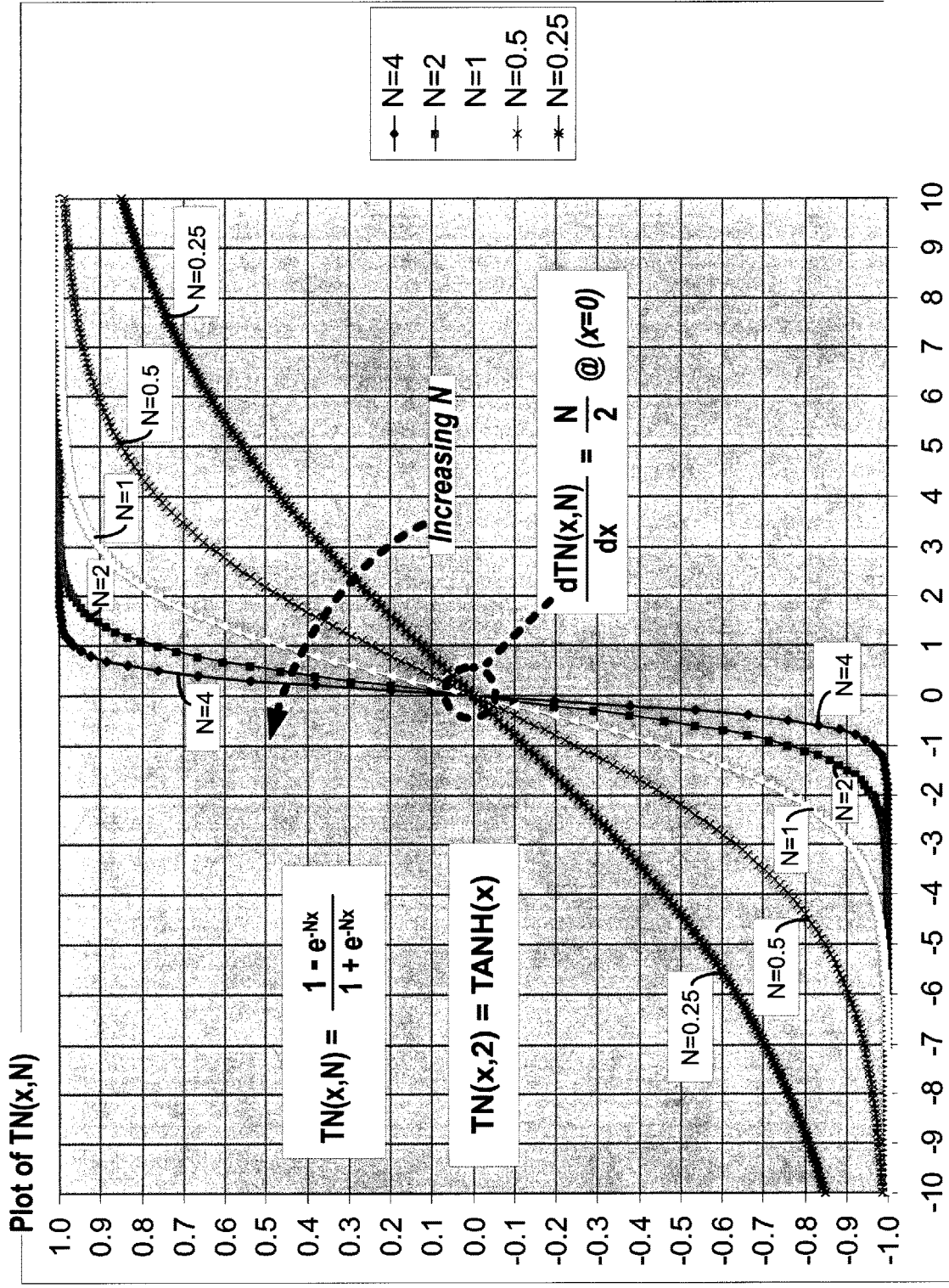
Figure 12A:
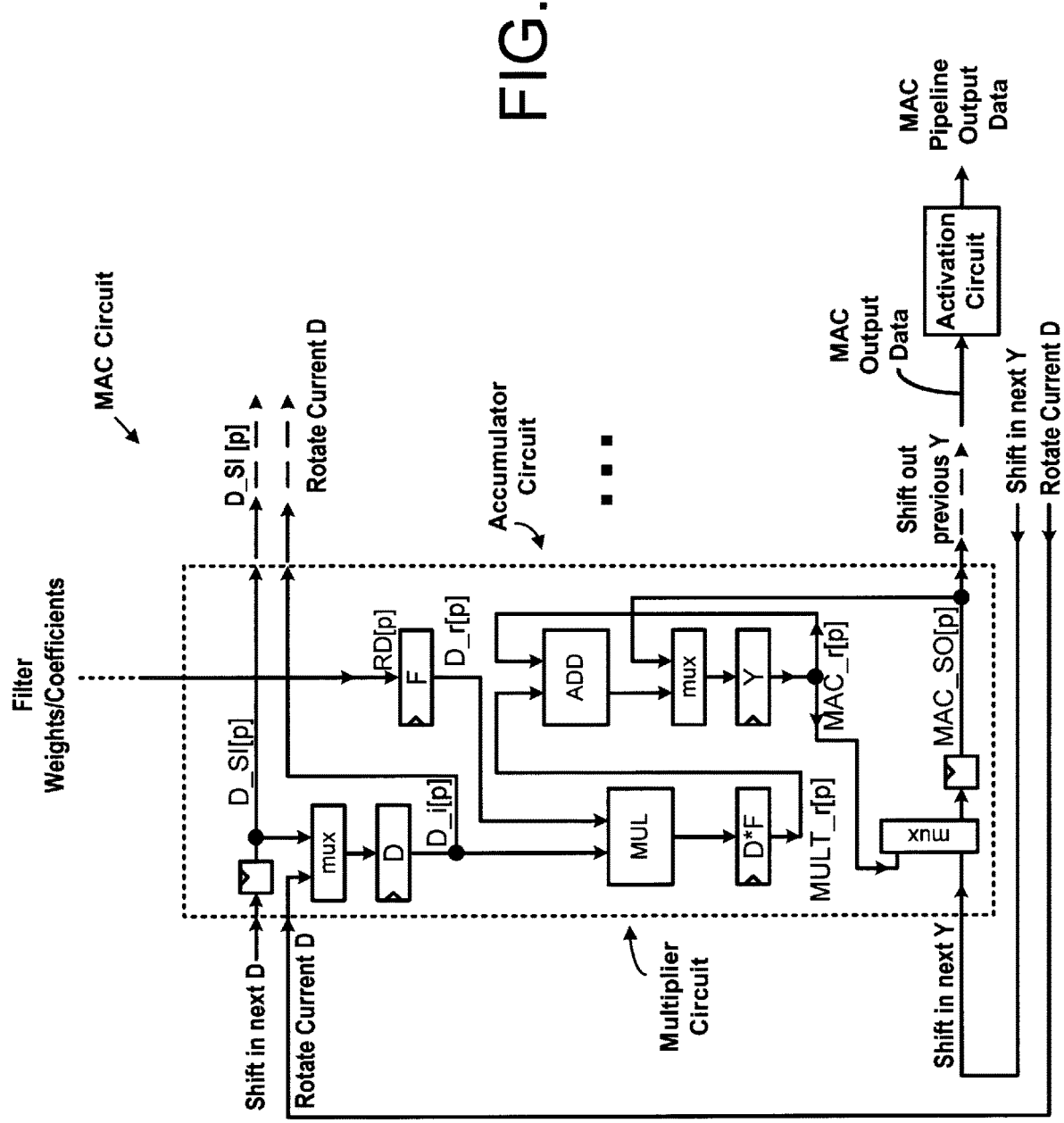
Figure 12B:
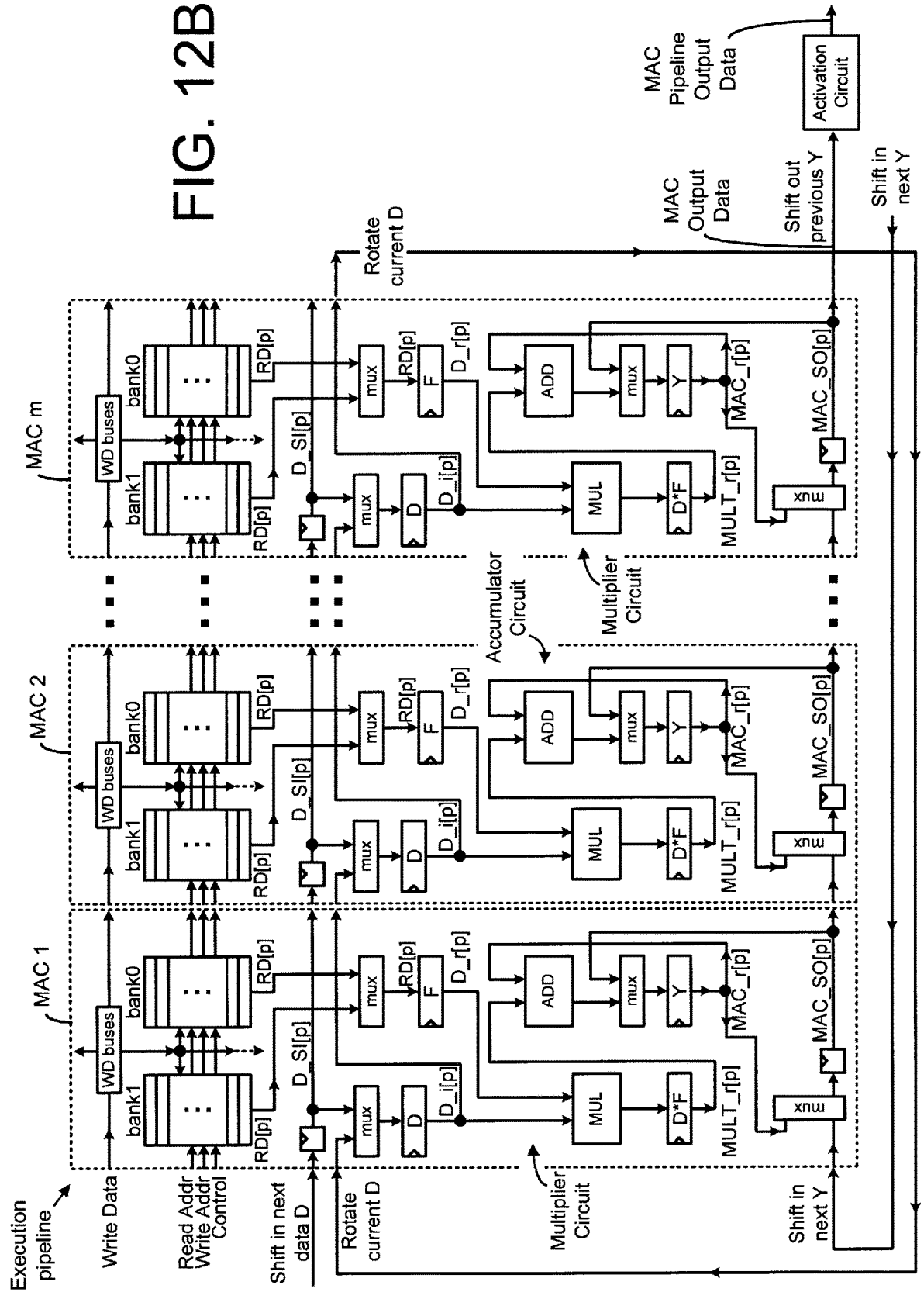
Figure 13A:
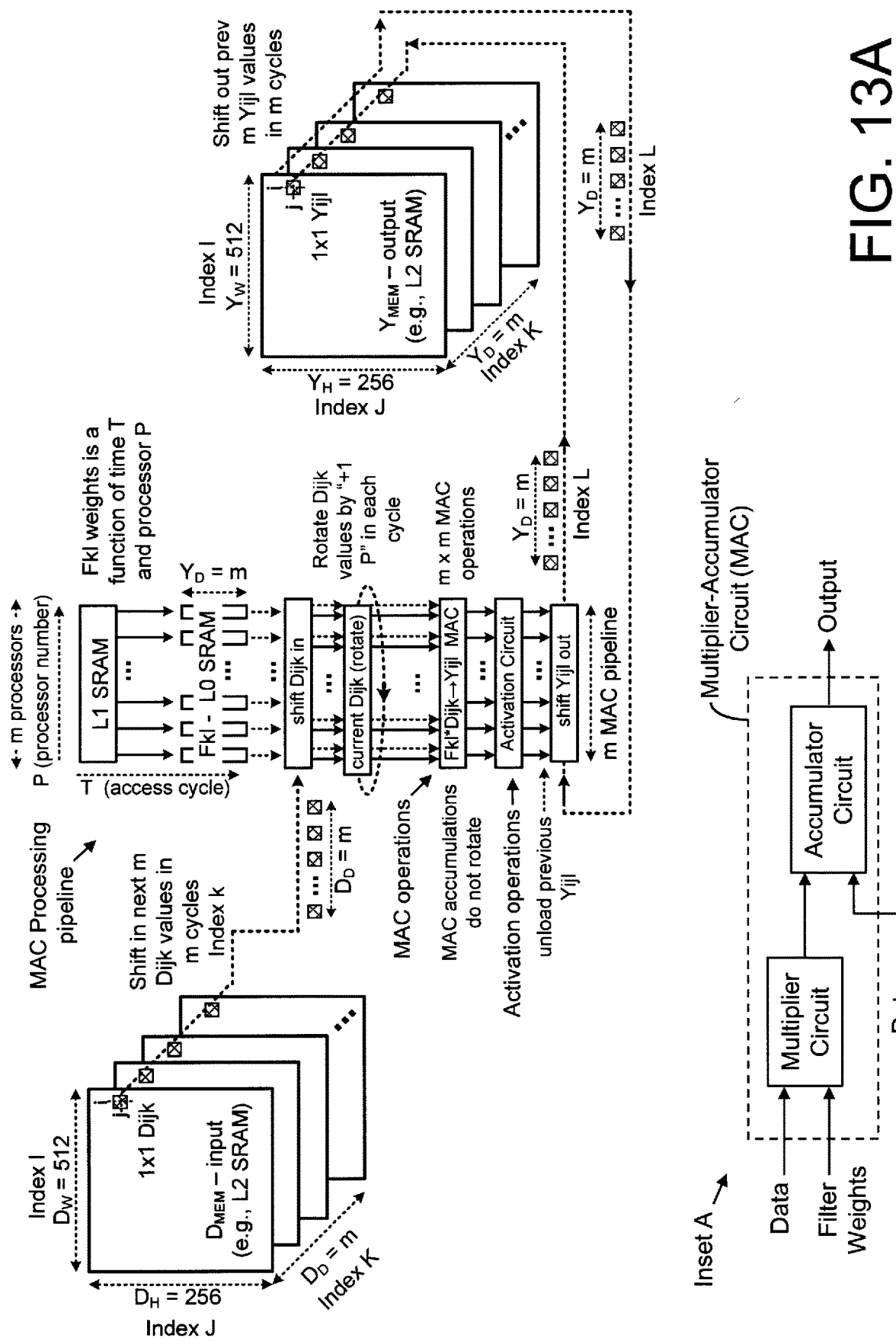
Figure 15A:
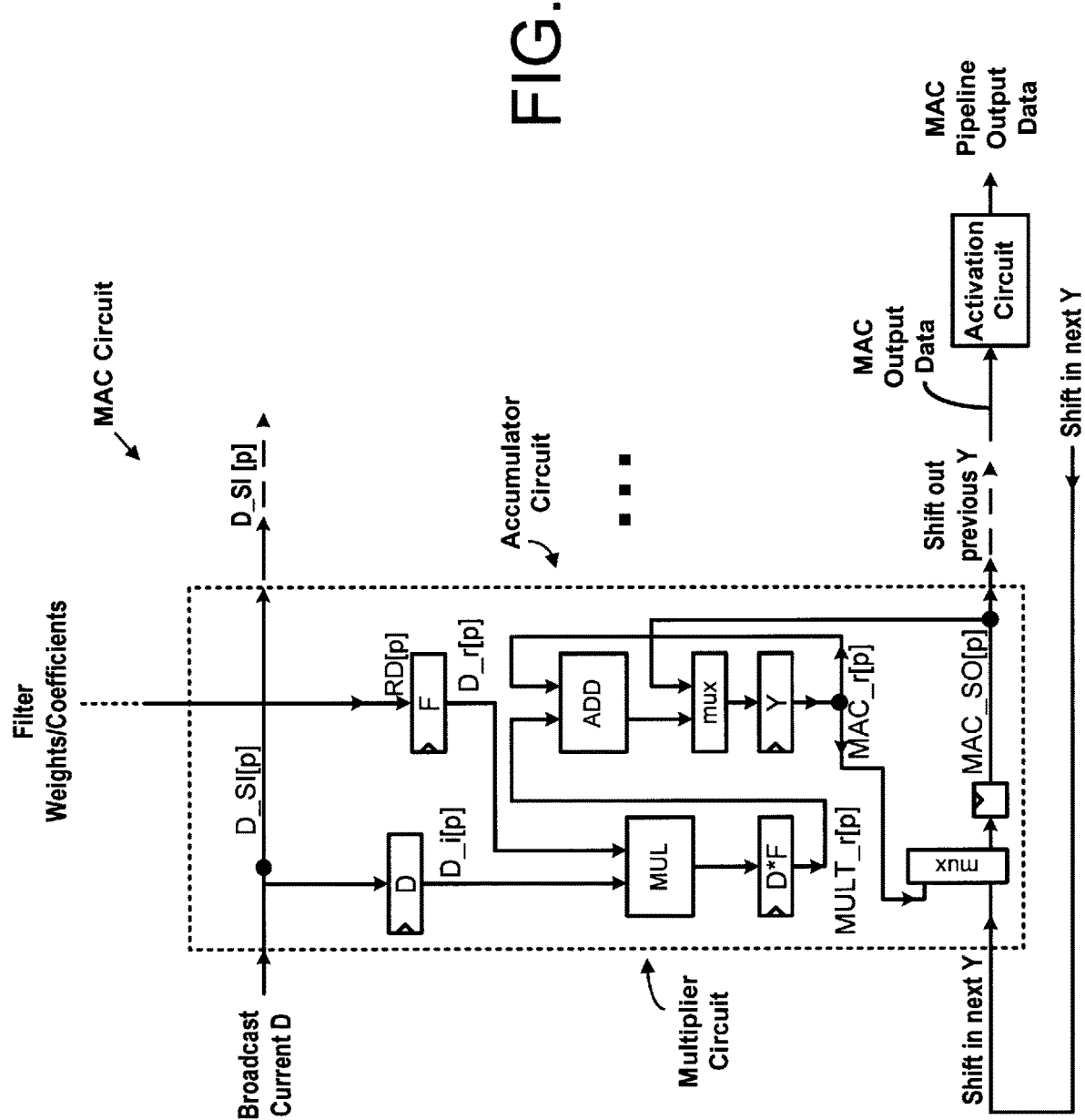
Figure 15B:
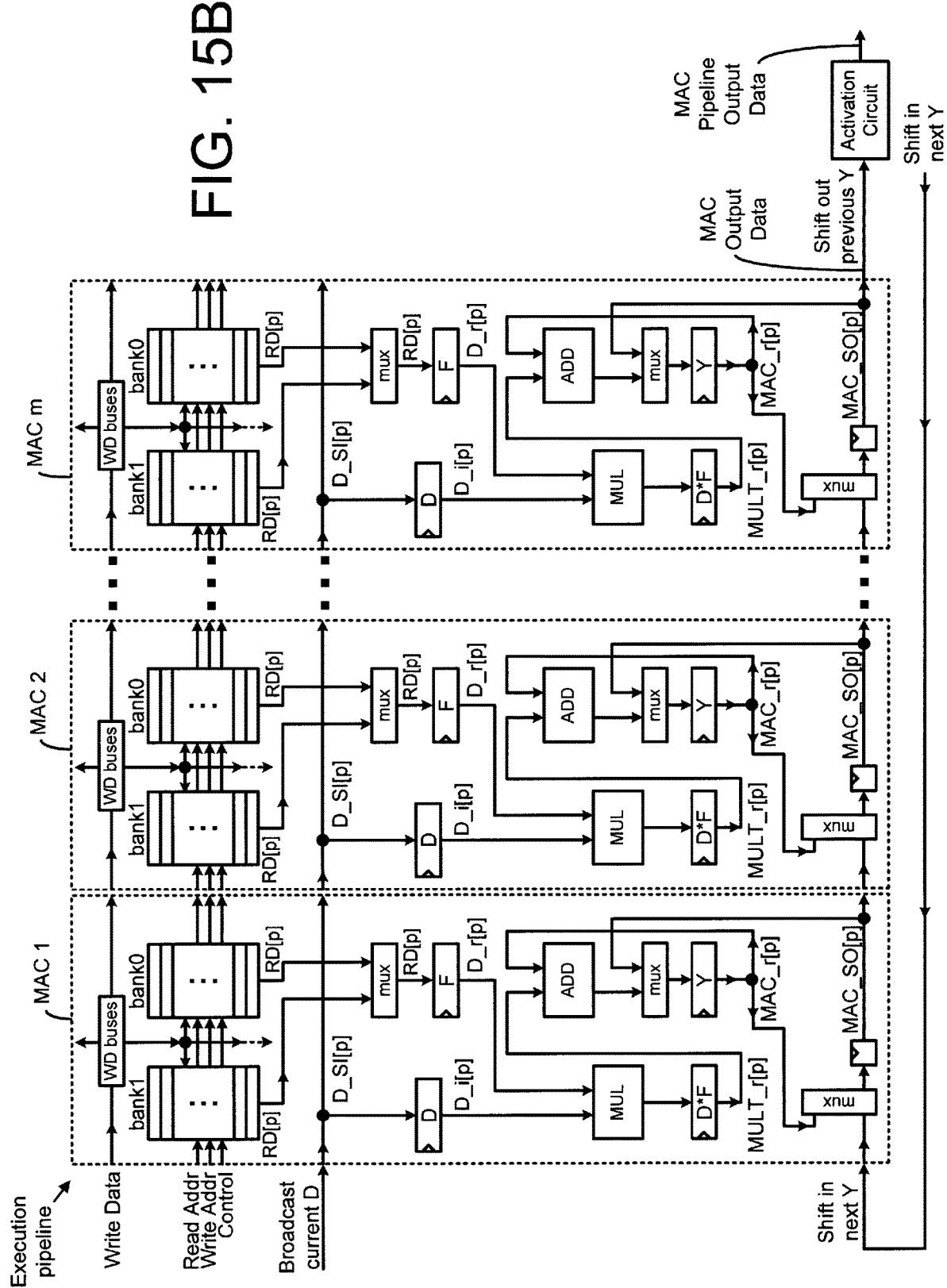

FIG. 1 illustrates a schematic block diagram of an exemplary embodiment of a multiplier-accumulator circuit (MAC) processing pipeline (e.g., a linear pipeline) including a plurality of multiplier-accumulator circuits (MACs) having an output that is coupled to activation circuitry which processes the output data of the multiplier-accumulator circuits via, for example, linear and/or non-linear activation operations and/or threshold functions, according to one or more aspects of the present inventions; the plurality of MACs may be serially connected in a linear MAC pipeline to process input data (e.g., image data) and output processed data (labeled "MAC Output Data"); the activation circuitry, in one embodiment, is configurable or programmable (e.g., one-time programmable or more than one-time programmable), via control signals (e.g., mode select) that configure, program or select the type or form of data processing implemented by the activation circuitry (e.g., a type or form of linear and/or non-linear activation operations and/or threshold functions implemented by the activation circuitry); notably, an exemplary embodiment of a multiplier-accumulator circuit is illustrated, in schematic block diagram form, in Inset A; and an exemplary embodiment of a pipeline of serially interconnected MACs configured in a linear MAC pipeline, is illustrated, in schematic block diagram form, in Inset B; the present inventions may be employed with or implemented in any MAC pipeline architecture and technique—including those described and/or illustrated herein;

FIGS. 2A-2D illustrate exemplary embodiments of activation circuits, in schematic block diagram form, having one or more circuits which, alone or in combination, are capable of performing one or more linear and/or non-linear activation operations and/or threshold functions, according to one or more aspects of the present inventions; in these exemplary embodiments the activation circuits include a plurality of circuits that may be responsively configured, in operation, via selection circuitry, which responsively configures, programs or selects the activation circuit to implement a predetermined type or form of data processing (e.g., linear and/or non-linear activation operations and/or threshold functions); the selection circuitry configures, defines, enables or establishes a data path as to which of the circuits or combinations thereof are employed to process the data output by the MAC pipeline; notably, for the purposes of clarity (e.g., elimination of clutter), details of the selection circuitry (e.g., multiplexers or switches, collectively hereinafter "multiplexers") that configure, define, enable or establish the selected or desired data path is not illustrated in the FIGS. 2A-2D; however, in one embodiment, the selection circuitry of the activation circuit may include one or more multiplexers to selectively configure, define, enable or establish the data path of the activation circuit and, as such, the predetermined linear or non-linear activation operation or threshold function employed to process the MAC output data and generate the MAC pipeline output data; where the selection circuitry includes one or more multiplexers, the control signal(s) determine(s) or control(s) the interconnection in the multiplexer—i.e., which of the plurality of multiplexer outputs is connected to the multiplexer input (and vice versa at the output of the activation circuit) and as such, determine or configure the data path from the input of the activation circuit to the output of the activation circuit—via, for example, the control or status of such multiplexers;

FIGS. 2E and 2F illustrate additional exemplary embodiments of activation circuits, in schematic block diagram form, having one or more circuits which, alone or in combination, are capable of performing one or more linear and/or non-linear activation operations and/or threshold functions, according to one or more aspects of the present inventions, wherein in these exemplary embodiments the activation circuits include one or more circuits that, in operation, are capable of processing the input data via one or more linear and/or non-linear activation operations and/or threshold functions; in one embodiment, the activation circuit includes a "by-pass" data path whereby the activation circuit is configured to by-pass all processing operation(s)/circuit(s) of the activation circuit, and as such, the data input into the activation circuit is the same as the data that is output from the activation circuit (see FIG. 2E); as noted above, the activation circuit may include one or more multiplexers to selective configure, define, enable or establish the data path of the activation circuit and, as such, the predetermined linear or non-linear activation operation or threshold function employed to process the MAC output data and generate the MAC pipeline output data; in these exemplary embodiments, the selection circuitry may include 2:1/1:2 multiplexers (see FIG. 2E) and n:1/1:n multiplexers, or combinations of multiplexers that provide an n:1/1:n selection (see FIG. 2F); similar selection circuitry may be implemented in connection with the exemplary embodiments of the activation circuits illustrated in FIGS. 2A-2D; moreover, the "by-pass" data path may also be implement in the exemplary embodiments of the activation circuits illustrated in FIGS. 2A-2D;

FIG. 3 illustrates a schematic block diagram of an exemplary embodiment of a multiplier-accumulator circuit (MAC) processing pipeline having an output that is coupled to activation circuitry which processes the output data of the multiplier-accumulator circuits via, for example, linear and/or non-linear activation operations and/or threshold functions, according to one or more aspects of the present inventions, wherein in this embodiment, activation control circuitry may be employed to program or configure (whether dynamic or otherwise) the activation circuit to implement a predetermined data processing operation (e.g., linear or non-linear activation operation or threshold function); the multiplier-accumulator circuit (MAC) processing pipeline includes a plurality of multiplier-accumulator circuits (MACs) that may be serially connected in a linear MAC pipeline to process input data (e.g., image data) and output processed data (labeled "MAC Output Data"); the activation control circuitry, via control signal(s) (e.g., mode select), control, change and/or select a predetermined linear or non-linear activation operation or threshold function performed by the activation circuit; the control signal(s) (e.g., mode select) output by the control circuitry configure or program the activation circuit—for example, via controlling the configuration of the multiplexer(s) and thereby the data path through the activation circuit and the processing performed thereby; the activation control circuitry, in one embodiment, is partially or entirely resident on the integrated circuit of the processing circuitry (i.e., the MAC processing pipeline(s)) or external thereto (e.g., in a host computer or on a different integrated circuit from the MAC circuitry and execution pipeline(s)); the activation circuit control circuitry, in operation, may read control data from a configuration memory (e.g., a configuration register) which may store data which is representative of the processing operations to be implemented by the activation circuit and thereafter program or configure the activation circuitry to perform the predetermined processing operation (e.g., the linear or non-linear activation operation or threshold function implemented by the activation circuit); in one embodiment, the configuration memory may be fixed (e.g., at manufacture or test—e.g., via one or more of fuses); in another embodiment, the configuration memory may be programmed at or during power-up, start-up, initialization, re-initialization and/or in situ (i.e., during normal operation of the integrated circuit); in one embodiment, configuration memory (e.g., a configuration register) may store configuration data, including data which is representative of the control signals necessary to implement the configurability of the activation circuit to perform the data processing of the MAC output data;

FIG. 4A illustrates a schematic block diagram of an exemplary multiplier-accumulator execution or processing pipeline including an activation circuit and a plurality of serially connected multiplier-accumulator circuits having an output connected to the input of the activation circuit, according to one or more aspects of the present inventions, wherein, in this embodiment of the pipeline architecture, an output of the accumulator circuit of a MAC is connected to an input of the accumulator circuit of the next MAC in the linear pipeline wherein, in operation, the accumulation values generated by the MACs are rotated, transferred or moved (e.g., before, during or at the completion of each execution cycle of the execution sequence (i.e., set of associated execution cycles)) through the plurality of serially connected MACs of the pipeline such that, in one embodiment, each accumulation value generated by a MAC is output before, during or at the completion of each execution cycle to the immediately following MAC of the linear pipeline and employed in the accumulation operation of the accumulator circuit of that immediately following MAC of the linear pipeline; each multiplier-accumulator circuit includes a multiplier circuit ("MUL") to perform/implement the multiply operations and accumulator circuit ("ADD") to perform/implement the accumulate operations, wherein the activation circuit processes data output from the serially connected multiplier-accumulator circuits via, for example, linear and/or non-linear activation operations and/or threshold functions, according to one or more aspects of the present inventions; in this exemplary embodiment, the multiplier-accumulator circuit may include or read from one or more of memory banks (e.g., two SRAM memory banks) that are dedicated to the multiplier-accumulator circuit to store filter weights used by the multiplier circuit of the associated multiplier-accumulator circuit; notably, the activation circuit may employ any of the exemplary embodiments described and/or illustrated herein (e.g., FIGS. 1, 2A-2F and 3);

FIG. 4B illustrates a schematic block diagram of an exemplary multiplier-accumulator execution or processing pipeline including an activation circuit and a plurality of serially connected multiplier-accumulator circuits having an output connected to the input of the activation circuit, according to one or more aspects of the present inventions, wherein, in this pipeline architecture, the output of each accumulator circuit ("ADD") of the MACs is coupled to the input of the immediately following accumulator circuit ("ADD") of the MACs of the linear processing pipeline wherein, in this way, accumulation values ("Y") generated by the MACs (see, MAC_r[p]) are rotated, transferred or moved (e.g., before, during or at the completion of each execution cycle of the execution sequence (i.e., set of associated execution cycles)) through the plurality of serially connected MACs of the pipeline such that each accumulation value (see, MAC_r[p]—"Rotate current Y") generated by a MAC is output before, during or at the completion of each execution cycle to the immediately following MAC of the linear pipeline and employed in the accumulation operation of the accumulator circuit ("ADD") of that immediately following MAC, according to one or more aspects of the present inventions; each multiplier-accumulator circuit includes a multiplier circuit ("MUL") to perform/implement the multiply operations and accumulator circuit ("ADD") to perform/implement the accumulate operations, wherein the activation circuit processes data output from the serially connected multiplier-accumulator circuits via, for example, linear and/or non-linear activation operations and/or threshold functions, according to one or more aspects of the present inventions; notably, the activation circuit may employ any of the exemplary embodiments described and/or illustrated herein (e.g., FIGS. 1, 2A-2F and 3);

FIGS. 5A and 5B illustrate schematic block diagrams of logical overviews of exemplary multiplier-accumulator execution pipelines, connected in a linear pipeline configuration wherein the output thereof is connected to an input of an activation circuit, according to one or more aspects of the present inventions, wherein the multiplier-accumulator processing or execution pipeline ("MAC pipeline") includes multiplier-accumulator circuit having a plurality of multiplier-accumulator circuits ("MACs"), and the activation circuit processes data output from the serially connected multiplier-accumulator circuits via, for example, linear and/or non-linear activation operations and/or threshold functions, according to one or more aspects of the present inventions; the activation operations (implemented by the activation circuit) may, in one embodiment, be performed between the MAC operations and the serial shift output of the processed data to, for example, memory (see FIG. 5A); in another embodiment, the activation operations (implemented by the activation circuit) are performed after the serial shift output of the processed data but before writing data into, for example, memory (see FIG. 5B); in these illustrative embodiments, the plurality of MACs is illustrated in block diagram form and are connected in a linear pipeline configuration wherein the input data are input or loaded into a plurality of MACs of the pipeline and, in operation, the accumulation values generated by the MACs are rotated, transferred or moved (e.g., before, during or at the completion of each execution cycle of the execution sequence (i.e., set of associated execution cycles)) through the plurality of serially connected MACs of the pipeline such that, in one embodiment, each accumulation value generated by a MAC is output before, during or at the completion of each execution cycle to the immediately following MAC of the linear pipeline and employed in the accumulation operation of the accumulator circuit of that immediately following MAC; an exemplary multiplier-accumulator circuit is illustrated in schematic block diagram form in Inset A; notably, in this exemplary embodiment, "m" (e.g., 64 in one illustrative embodiment) multiplier-accumulator circuits are connected in a linear execution pipeline to operate concurrently whereby the processing circuits perform m×m (e.g., 64×64) multiply-accumulate operations in each m (e.g., 64) cycle interval (here, a cycle may be nominally 1 ns); notably, each m (e.g., 64) cycle interval processes a Dd/Yd (depth) column of input and output pixels/data at a particular (i,j) location (the indexes for the width Dw/Yw and height Dh/Yh dimensions of this exemplary embodiment—Dw=512, Dh=256, and Dd=128, and the Yw=512, Yh=256, and Yd=64) wherein the m (e.g., 64) cycle execution interval is repeated for each of the Dw*Dh depth columns for this stage; in addition, in one embodiment, the filter weights or weight data are loaded into memory (e.g., L1/L0 SRAM memories) before the multiplier-accumulator circuit starts processing (see, e.g., the '345 application); in one embodiment, the L1 SRAM memory may provide data to a plurality of L0 SRAM memories, wherein each pipeline (like those illustrated in FIGS. 5A and 5B) is associated with a dedicated L0 SRAM memory of such plurality of L0 SRAM memories;

FIGS. 6A and 6B illustrate high-level block diagram layouts of an integrated circuits or portions of an integrated circuits (which may be referred to, at times, as an X1 component) including a plurality of multi-bit MAC execution pipelines, each pipeline having a plurality of multiplier-accumulator circuits—each of which implement multiply and accumulate operations, and an activation circuit connected to the output of each pipelines to process data output therefrom via, for example, linear and/or non-linear activation operations and/or threshold functions, according to one or more aspects of the present inventions; the multi-bit MAC execution pipelines and/or the plurality of multiplier-accumulator circuits may be configured to implement one or more processing architectures or techniques (singly or in combination with one or more X1 components); in one embodiment, the activation circuit is disposed at the output of the MAC pipeline before the data is shifted out to other circuitry of the integrated circuit (see FIG. 6A); in another embodiment, the activation circuit is disposed in the NLINK circuitry wherein the activation circuit processes the output of each pipelines to process data output therefrom after such data is shifted out of the pipeline; notably, in this illustrative embodiment, each pipeline includes a plurality of MACs—each of which implement multiply and accumulate operations, wherein, in operation, the accumulation values (see "Yijl" in the expanded view of a portion of the high-level block diagrams of FIGS. 4A, 4B, 5A and 5B) generated by the MACs are rotated, transferred or moved (e.g., before, during or at the completion of each execution cycle of the execution sequence (i.e., set of associated execution cycles)) through the plurality of serially connected MACs of the pipeline such that each accumulation value generated by a MAC is output before, during or at the completion of each execution cycle to the immediately following MAC of the linear pipeline and employed in the accumulation operation of the accumulator circuit of that immediately following MAC; moreover, in this illustrative embodiment, the multi-bit MAC execution pipelines are organized into clusters (in this illustrative embodiment, four clusters wherein each cluster includes a plurality of multi-bit MAC execution pipelines (in this illustrative embodiment each cluster includes 16, 64-MAC execution pipelines (which may also be individually referred to below as MAC processors)); in one embodiment, the plurality of multiplier-accumulator circuits are configurable or programmable (one-time or multiple times, e.g., at start-up and/or in situ) to implement one or more pipelining processing architectures or techniques (see, e.g., the expanded view of a portion of the high-level block diagram of FIGS. 5A and 5B in the lower right is a single MAC execution pipeline (in the illustrative embodiment, including, e.g., 64 multiplier-accumulator circuits or MAC processors) which correlates to the schematic block diagram of a logical overview of an exemplary multiplier-accumulator circuit arranged in a linear execution pipeline configuration—see FIGS. 5A and 5B); the processing component in this illustrative embodiment includes memory (e.g., L2 memory, L1 memory and L0 memory (e.g., SRAM)), a bus interfaces (e.g., a PHY and/or GPIO) to facilitate communication with circuitry external to the component and memory (e.g., SRAM and DRAM) for storage and use by the circuitry of the component, and a plurality of switches/multiplexers which are electrically interconnected to form a switch interconnect network "Network-on-Chip" ("NOC") to facilitate interconnecting the clusters of multiplier-accumulator circuits of the MAC execution pipelines; in one embodiment, the NOC includes a switch interconnect network (e.g., a mixed-mode interconnect network (i.e., a hierarchical switch matrix interconnect network and a mesh, torus or the like interconnect network (hereinafter collectively "mesh network" or "mesh interconnect network")), associated data storage elements, input pins and/or look-up tables (LUTs) that, when programmed, determine the operation of the switches/multiplexers; in one embodiment, one or more (or all) of the clusters includes one or more computing elements (e.g., a plurality of multiplier-accumulator circuits—labeled as "NMAX Rows"—see, e.g., the '345 application); notably, in one embodiment, each MAC execution pipeline (which, in one embodiment, consists of a plurality of serially interconnected multiplier-accumulator circuits) is connected to an associated L0 memory (e.g., SRAM memory) that is dedicated to that processing pipeline; the associated L0 memory stores filter weights used by the multiplier circuit of each multiplier-accumulator circuit of that particular MAC pipeline in performance of the multiply operations, wherein each MAC pipeline of a given cluster is connected to an associated L0 memory (which, in one embodiment, is dedicated to the multiplier-accumulator circuits of that MAC pipeline); a plurality (e.g., 16) MAC execution pipelines of a MAC cluster (and, in particular, the L0 memory of each MAC execution pipeline of the cluster) is coupled to an associated L1 memory (e.g., SRAM memory); here, the associated L1 memory is connected to and shared by each of the MAC execution pipelines of the cluster to receive filter weights to be stored in the L0 memory associated with each MAC execution pipeline of the cluster; in one embodiment, the associated L1 memory is assigned and dedicated to the plurality of pipelines of the MAC cluster; notably, the shift-in and shift-out paths of each 64-MAC execution pipeline is coupled to L2 memory (e.g., SRAM memory) wherein the L2 memory also couples to the L1 memory and L0 memory; the NOC couples the L2 memory to the PHY (physical interface) which may connect to L3 memory (e.g., external DRAM); the NOC also couples to a PCIe or PHY which, in turn, may provide interconnection to or communication with circuitry external to the X1 processing component (e.g., an external processor, such as a host processor); the NOC, in one embodiment, may also connect a plurality of X1 components (e.g., via GPIO input/output PHYs) which allow multiple X1 components to process related data (e.g., image data), as discussed herein, in accordance with one or more aspects of the present inventions;

FIG. 7A illustrates a schematic/flow block diagram of a logical overview of an exemplary embodiment of a plurality of MAC execution or processing pipelines and activation operations/functions, wherein an activation circuit is associated with each MAC pipeline to process data output therefrom via, for example, linear and/or non-linear activation operations and/or threshold functions, according to aspects of the present inventions; in one embodiment, each MAC pipeline is associated with a different one of the activation circuits such that the activation circuit is dedicated to the MAC pipeline (e.g., on at least an execution sequence basis); the MAC pipelines may operate or process the data concurrently or simultaneously; similarly, in one embodiment, the activation circuits operate or process the data output from the MAC pipelines (e.g., MAC Output Data—see FIGS. 1 and 3) concurrently or simultaneously; indeed, in one embodiment, each activation circuit may process (e.g., perform non-linear filtering operation) the data output from the associated MAC pipeline at the same data processing rate as the data processing rate of the associated MAC pipeline; and, in one embodiment, may implement the architectures and/or processing techniques described and/or illustrated in U.S. patent application Ser. No. 16/816,164 (filed Mar. 11, 2020) which, as stated below, is incorporated by reference herein; notably, the plurality of MAC execution or processing pipelines and techniques implemented thereby may employ any of the exemplary embodiments described and/or illustrated herein (e.g., FIGS. 4A, 4B, 5A, 5B, 12A, 12B, 13A, 13B, 15A, 15B, 16A and 16B);

FIG. 7B illustrates a schematic/flow block diagram of a logical overview of an exemplary embodiment of a plurality of MAC execution or processing pipelines wherein the input data and the filter weights or coefficients are organized into a plurality of groups (3×3 blocks of data and 3×3 blocks of filter weights) for processing via the MAC processing pipelines wherein the output data from each pipeline is processed via activation operations/functions; notably, in one embodiment, an activation circuit is dedicated to each pipeline to processes (via, for example, linear and/or non-linear activation operations and/or threshold functions) the data output from an associated MAC pipeline, according to aspects of the present inventions; in this exemplary embodiment, the multiplier-accumulator circuit may implement the processing techniques, to process the image data, described and/or illustrated in U.S. patent application Ser. No. 17/074,670, entitled "MAC Processing Pipeline using Filter Weights having Enhanced Dynamic Range, and Methods of Operating Same", filed Oct. 20, 2020 and/or U.S. Provisional Patent Application No. 62/930,601, entitled "Processing Pipeline Circuitry using Filter Coefficients having Enhanced Dynamic Range and Methods of Operating", filed Nov. 5, 2019; these two (2) patent applications are incorporated herein by reference; notably, Inset A illustrates an exemplary pseudo-code of the schematic block diagram of a logical overview of the illustrated exemplary embodiment of MAC processing pipelines; in one embodiment, each MAC pipeline is associated with a different one of the activation circuits such that the activation circuit is dedicated to the MAC pipeline (e.g., on at least an execution sequence basis); the MAC pipelines may operate or process the data concurrently or simultaneously; similarly, in one embodiment, the activation circuits also operate or process the data output from the MAC pipelines (e.g., MAC Output Data—see FIGS. 1 and 3) concurrently or simultaneously; indeed, in one embodiment, each activation circuit may process (e.g., perform non-linear filtering operation) the data output from the associated MAC pipeline at the same data processing rate as the data processing rate of the associated MAC pipeline; and, in one embodiment, may implement the architectures and/or processing techniques described and/or illustrated in U.S. patent application Ser. No. 16/816,164 (filed Mar. 11, 2020) which, as stated below, is incorporated by reference herein; further, as noted above, the plurality of MAC execution or processing pipelines and techniques implemented thereby may employ any of the exemplary embodiments described and/or illustrated herein (e.g., FIGS. 4A, 4B, 5A, 5B, 12A, 12B, 13A, 13B, 15A, 15B, 16A and 16B);

FIG. 7C illustrates a schematic/flow block diagram of a logical overview of an exemplary embodiment of a plurality of MAC execution or processing pipelines wherein the input data and the filter weights or coefficients are organized into a plurality of groups for Winograd type processing via the MAC processing pipelines wherein the output data from each pipeline is processed via activation operations/functions; notably, in one embodiment, an activation circuit is dedicated to each pipeline to processes (via, for example, linear and/or non-linear activation operations and/or threshold functions) the data output from an associated MAC pipeline, according to aspects of the present inventions; in this embodiment, the plurality of associated filter weights of each group (each filter weight thereof having the second data format) is applied to data format conversion circuitry to convert a plurality of associated filter weights to a plurality of associated filter weights (Hkl) having a data format which is the same as the second data format and an increased width, length or size (e.g., from BSF7 to BSF12) are further processed or converted, using Winograd conversion circuitry to a Winograd format (Hkl), as sixteen filter weights arranged as a matrix (e.g., a 4×4) or block; in this illustrative embodiment, a plurality of filter coefficients or weights are also associated, arranged in or employed by and/or input into the processing circuitry in groups (e.g., 16 filter coefficients in each group wherein each group may be arranged in and/or employed as a 4×4 matrix); the filter weights, in a Winograd format, are then available to or input into the plurality of multiplier-accumulator circuits of the execution pipelines which implement/perform the multiply and accumulate operations to process the input data (Dij, e.g., image data) which are also converted to a Winograd format (Eij) via Winograd conversion circuitry; in this exemplary embodiment, multiplier-accumulator circuit implements Winograd processing techniques, to process the image data, described and/or illustrated in U.S. patent application Ser. No. 16/796,111, entitled "Multiplier-Accumulator Circuitry having Processing Pipelines and Methods of Operating Same", filed Feb. 20, 2020 and/or U.S. Provisional Application No. 62/823,161, entitled "Multiplier-Accumulator Circuitry having Processing Pipeline and Methods of Operating and Using Same", filed Mar. 25, 2019; U.S. patent application Ser. No. 17/031,631, entitled "MAC Processing Pipeline having Conversion Circuitry, and Methods of Operating Same", filed Sep. 24, 2020, and/or U.S. Provisional Application No. 62/909,293, entitled "Multiplier-Accumulator Circuitry Processing Pipeline and Methods of Operating Same", filed Oct. 2, 2019; these four (4) patent applications are incorporated herein by reference; notably, the Hkl filter coefficients (which have the second data format and increased width, length or size may be stored in memory (e.g., L1 memory or L0 memory—such as SRAM) and thereafter input into the plurality of multiplier-accumulator circuits of the execution pipelines implementing Winograd processing techniques; moreover, the Winograd conversion circuitry may employ the circuitry and techniques described and/or illustrated in the '111 application, the '161 application, the '631 application and/or the '293 application; notably, Inset A illustrates an exemplary pseudo-code of the schematic block diagram of a logical overview of the illustrated exemplary embodiment of MAC processing pipelines; in one embodiment, each MAC pipeline is associated with a different one of the activation circuits such that the activation circuit is dedicated to the MAC pipeline (e.g., on at least an execution sequence basis); the MAC pipelines may operate or process the data concurrently or simultaneously; similarly, in one embodiment, the activation circuits also operate or process the data output from the MAC pipelines (e.g., MAC Output Data—see FIGS. 1 and 3) concurrently or simultaneously; indeed, in one embodiment, each activation circuit may process (e.g., perform non-linear filtering operation) the data output from the associated MAC pipeline at the same data processing rate as the data processing rate of the associated MAC pipeline; and, in one embodiment, may implement the architectures and/or processing techniques described and/or illustrated in U.S. patent application Ser. No. 16/816,164 (filed Mar. 11, 2020) which, as stated below, is incorporated by reference herein; further, as noted above, the plurality of MAC execution or processing pipelines and techniques implemented thereby may employ any of the exemplary embodiments described and/or illustrated herein (e.g., FIGS. 4A, 4B, 5A, 5B, 12A, 12B, 13A, 13B, 15A, 15B, 16A and 16B);

FIG. 8 illustrates a schematic block diagram of exemplary activation circuitry for the SN(x,N) and TN(x,N) activation functions, according to aspects of the present inventions; in this exemplary embodiment, the activation circuit includes a six-stage execution pipeline to process the output data of the MAC pipeline; moreover, this embodiment may allow a high throughput rate, even when implemented in a synthesis environment with relatively long gate delays; notably, in one alternative embodiment, the pipeline registers of the illustrated exemplary activation circuitry may be eliminated to facilitate implementation in higher performance environments;

FIG. 9A illustrates characteristics of the SN(x,N) family of activation functions (which include a form $SN(x,N)=1/(1+e^{\hat{}}(-N*x))$) that the activation circuitry of FIG. 8 may employ to process data, according to certain aspects of the present inventions; notably, this family of activation functions includes the SIGMOID function, in which the value of "N" equals 1.0 (i.e., the middle curve);

FIG. 9B illustrates characteristics of the TN(x,N) family of activation functions (which include a form $TN(x,N)=(1-e^{\hat{}}(-N*x))/(1+e^{\hat{}}(-N*x))$) that the activation circuitry of FIG. 8 may employ to process data, according to certain aspects of the present inventions; notably, this family of activation functions includes TANH (hyperbolic tangent) function, in which the value of "N" equals 2.0 (i.e., the top most curve in the negative portion of the abscissa and the bottom most curve in the position portion of the abscissa;

FIG. 10 illustrates exemplary floating point data formats and fixed point data formats, each having different widths or lengths, including respective ranges, and exemplary integer data formats having different widths or lengths, including respective ranges; the format of the floating point data illustrated herein is merely exemplary and not limiting; other formats may be employed including data having (i) smaller or larger total block/data width(s) or length(s), (ii) smaller or larger block/data width(s) or length(s) of the exponent field, and/or (iii) smaller or larger block/data width(s) or length(s) of the fraction or mantissa field; moreover, the format of the fixed point data illustrated herein is merely exemplary and not limiting; other formats may be employed including data having (i) smaller or larger total block/data width(s) or length(s), (ii) smaller or larger block/data width(s) or length (s) of the fraction field, and/or (iii) different location(s) of the binary point relative to the bits of the integer field or fraction field (which has an impact of the range of the fixed point data); notably, the three exemplary floating point data formats in this illustration utilize a signed-magnitude numeric format for the sign field and fraction or mantissa field wherein the fraction or mantissa field includes a most-significant weight of 0.5, and a hidden (implicit) bit and, in this embodiment, a weight of 1.0 is added (i.e. normalized fraction); the exponent field is a two's complement numeric format to which, in this embodiment, a bias of 127 is added; the minimum and maximum exponent values are reserved for special operands (NAN, INF, DNRM, ZERO); notably, the 16 bit floating point (FP) data format illustrated in FIG. 1C may be referred to as a BF16 (Brain Floating Point) data format;

FIG. 11 illustrates an exemplary number space for a floating point data format (in this illustrative example, 16 bit floating point (i.e., FP16—also known or referred to as "BF16")) wherein the minimum and maximum exponent E[7:0] are reserved for special operands (NAN, INF, ZRO); a NAN value is generated when an undefined operation takes place ($0*\infty$ or $\infty-\infty$); ±INF values are the saturation value for exponent overflow; ±ZRO values are the saturation value for exponent underflow; in this embodiment, the ±DNRM values provide for gradual underflow between the smallest NRM value and the ZRO value;

FIG. 12A illustrates a schematic block diagram of an exemplary multiplier-accumulator execution or processing pipeline including an activation circuit and a plurality of serially connected multiplier-accumulator circuits having an output connected to the input of the activation circuit, according to one or more aspects of the present inventions, wherein, in this embodiment of the pipeline architecture, input data values (Dijk) are rotated, transferred or moved, on a cycle-by-cycle basis, from one MAC of the linear pipeline to the immediately following MAC of the pipeline and employed in the multiply operation of the multiplier circuit of that next MAC of the processing pipeline such that, in this embodiment, before, during or after each cycle of the set of associated execution cycles, the input data are rotated, transferred or moved from a MAC of the linear pipeline to successive MAC thereof wherein the rotated, transferred or moved input data are input or applied to the multiplier circuit of associated MAC during or in connection with the multiply operation of that MAC as described and/or illustrated in U.S. Provisional Application 63/156,263 (the '263 application is hereby incorporated herein by reference in its entirety); in this embodiment, the accumulation values generated by each MAC are maintained, stored or held, during each execution cycle of the execution sequence (i.e., set of associated execution cycles), in respective MAC (compare the embodiment of FIG. 4A) and used in the accumulation operation of the associated accumulator circuit thereof; that is, the accumulation values employed in subsequent processing (i.e., the accumulation operation) in the associated MAC; each multiplier-accumulator circuit includes a multiplier circuit ("MUL") to perform/implement the multiply operations and accumulator circuit ("ADD") to perform/implement the accumulate operations, wherein the activation circuit processes data output from the serially connected multiplier-accumulator circuits via, for example, linear and/or non-linear activation operations and/or threshold functions, according to one or more aspects of the present inventions; in this exemplary embodiment, the multiplier-accumulator circuit may include or read from one or more of memory banks (e.g., two SRAM memory banks) that are dedicated to the multiplier-accumulator circuit to store filter weights used by the multiplier circuit of the associated multiplier-accumulator circuit; notably, the activation circuit may employ any of the exemplary embodiments described and/or illustrated herein (e.g., FIGS. 1, 2A-2F and 3);

FIG. 12B illustrates a schematic block diagram of an exemplary multiplier-accumulator execution or processing pipeline including an activation circuit and a plurality of serially connected multiplier-accumulator circuits having an output connected to the input of the activation circuit, according to one or more aspects of the present inventions, wherein, in this pipeline architecture, input data values ("D") are rotated, transferred or moved, on a cycle-by-cycle basis, from one MAC (e.g., MAC Processor 1) of the linear pipeline to the immediately following MAC (e.g., MAC Processor 2) of the execution pipeline (see, D_i[p]) and employed in the multiply operation of the multiplier circuit of that next MAC (e.g., MAC Processor 2) of the processing pipeline wherein, the input data values ("D") are rotated, transferred or moved (e.g., before, during or at the completion of each execution cycle of the execution sequence (i.e., set of associated execution cycles)) through the plurality of serially connected MACs of the pipeline such that, in operation, after input of the initial data input values into the MACs of the linear pipeline (see "Shift in next D"), each input data value (see "Rotate current D") that is input into a MAC is output before, during or at the completion of each execution cycle to the immediately following MAC of the linear pipeline and employed in the multiplication operation of the multiplier circuit ("MUL") of that immediately following MAC, as described and illustrated in the '263 application; each multiplier-accumulator circuit includes a multiplier circuit ("MUL") to perform/implement the multiply operations and accumulator circuit ("ADD") to perform/implement the accumulate operations, wherein the activation circuit processes data output from the serially connected multiplier-accumulator circuits via, for example, linear and/or non-linear activation operations and/or threshold functions, according to one or more aspects of the present inventions; notably, the activation circuit may employ any of the exemplary embodiments described and/or illustrated herein (e.g., FIGS. 1, 2A-2F and 3);

FIGS. 13A and 13B illustrate schematic block diagrams of logical overviews of exemplary multiplier-accumulator execution pipelines, connected in a linear pipeline configuration wherein the output thereof is connected to an input of an activation circuit, according to one or more aspects of the present inventions, wherein the multiplier-accumulator processing or execution pipeline ("MAC pipeline") includes multiplier-accumulator circuit having a plurality of multiplier-accumulator circuits ("MACs"), and the activation circuit processes data output from the serially connected multiplier-accumulator circuits via, for example, linear and/or non-linear activation operations and/or threshold functions, according to one or more aspects of the present inventions; the activation operations (implemented by the activation circuit) may, in one embodiment, be performed between the MAC operations and the serial shift output of the processed data to, for example, memory (see FIG. 13A); in another embodiment, the activation operations (implemented by the activation circuit) are performed after the serial shift output of the processed data but before writing data into, for example, memory (see FIG. 13B); in these illustrative embodiments, the plurality of MACs is illustrated in block diagram form and are connected in a linear pipeline configuration wherein input data values (Dijk) are rotated, transferred or moved, on a cycle-by-cycle basis, from one MAC of the linear pipeline to the immediately following MAC of the pipeline and employed in the multiply operation of the multiplier circuit of that next MAC of the processing pipeline, according to one or more aspects of the present inventions; in this embodiment, before, during or after each cycle of the set of associated execution cycles, the input data are rotated, transferred or moved from a MAC of the linear pipeline to successive MAC thereof wherein the rotated, transferred or moved input data are input or applied to the multiplier circuit of associated MAC during or in connection with the multiply operation of that MAC—as described and illustrated in the '263 application; an exemplary multiplier-accumulator circuit is illustrated in schematic block diagram form in Inset A; notably, in this exemplary embodiment, "m" (e.g., 64 in one illustrative embodiment) multiplier-accumulator circuits are connected in a linear execution pipeline to operate concurrently whereby the processing circuits perform m×m (e.g., 64×64) multiply-accumulate operations in each m (e.g., 64) cycle interval (here, a cycle may be nominally 1 ns); notably, each m (e.g., 64) cycle interval processes a Dd/Yd (depth) column of input and output pixels/data at a particular (i,j) location (the indexes for the width Dw/Yw and height Dh/Yh dimensions of this exemplary embodiment—Dw=512, Dh=256, and Dd=128, and the Yw=512, Yh=256, and Yd=64) wherein the m (e.g., 64) cycle execution interval is repeated for each of the Dw*Dh depth columns for this stage; in addition, in one embodiment, the filter weights or weight data are loaded into memory (e.g., L1/L0 SRAM memories)

before the multiplier-accumulator circuit starts processing (see, e.g., the '345 and '212 applications); in one embodiment, the L1 SRAM memory may provide data to a plurality of L0 SRAM memories, wherein each pipeline (like those illustrated in FIGS. 13A and 13B) is associated with a dedicated L0 SRAM memory of such plurality of L0 SRAM memories;

FIGS. 14A and 14B illustrate high-level block diagram layouts of an integrated circuits or portions of an integrated circuits (which may be referred to, at times, as an X1 component) including a plurality of multi-bit MAC execution pipelines, each pipeline having a plurality of multiplier-accumulator circuits—each of which implement multiply and accumulate operations, and an activation circuit connected to the output of each pipelines to process data output therefrom via, for example, linear and/or non-linear activation operations and/or threshold functions, according to one or more aspects of the present inventions; the multi-bit MAC execution pipelines and/or the plurality of multiplier-accumulator circuits may be configured to implement one or more processing architectures or techniques (singly or in combination with one or more X1 components); in one embodiment, the activation circuit is disposed at the output of the MAC pipeline before the data is shifted out to other circuitry of the integrated circuit (see FIG. 14A); in another embodiment, the activation circuit is disposed in the NLINK circuitry wherein the activation circuit processes the output of each pipelines to process data output therefrom after such data is shifted out of the pipeline; notably, in this illustrative embodiment, each pipeline includes a plurality of MACs—each of which implement multiply and accumulate operations—wherein input data values (Dijk) are rotated, transferred or moved, on a cycle-by-cycle basis, from one MAC of the linear pipeline to the immediately following MAC of the pipeline and employed in the multiply operation of the multiplier circuit of that next MAC of the processing pipeline; the expanded view of a portion of the high-level block diagrams of FIGS. 12A, 12B, 13A and 13B) generated by the MACs are rotated, transferred or moved (e.g., before, during or at the completion of each execution cycle of the execution sequence (i.e., set of associated execution cycles)) through the plurality of serially connected MACs of the pipeline; moreover, in this illustrative embodiment, the multi-bit MAC execution pipelines are organized into clusters (in this illustrative embodiment, four clusters wherein each cluster includes a plurality of multi-bit MAC execution pipelines (in this illustrative embodiment each cluster includes 16, 64-MAC execution pipelines (which may also be individually referred to below as MAC processors)); in one embodiment, the plurality of multiplier-accumulator circuit are configurable or programmable (one-time or multiple times, e.g., at start-up and/or in situ) to implement one or more pipelining processing architectures or techniques (see, e.g., the expanded view of a portion of the high-level block diagram of FIGS. 13A and 13B in the lower right is a single MAC execution pipeline (in the illustrative embodiment, including, e.g., 64 multiplier-accumulator circuits or MAC processors) which correlates to the schematic block diagram of a logical overview of an exemplary multiplier-accumulator circuit arranged in a linear execution pipeline configuration—see FIGS. 13A and 13B); the processing component in this illustrative embodiment includes memory (e.g., L2 memory, L1 memory and L0 memory (e.g., SRAM)), a bus interfaces (e.g., a PHY and/or GPIO) to facilitate communication with circuitry external to the component and memory (e.g., SRAM and DRAM) for storage and use by the circuitry of the component, and a plurality of switches/multiplexers which are electrically interconnected to form a switch interconnect network "Network-on-Chip" ("NOC") to facilitate interconnecting the clusters of multiplier-accumulator circuits of the MAC execution pipelines; in one embodiment, the NOC includes a switch interconnect network (e.g., a mixed-mode interconnect network (i.e., a hierarchical switch matrix interconnect network and a mesh, torus or the like interconnect network (hereinafter collectively "mesh network" or "mesh interconnect network")), associated data storage elements, input pins and/or look-up tables (LUTs) that, when programmed, determine the operation of the switches/multiplexers; in one embodiment, one or more (or all) of the clusters includes one or more computing elements (e.g., a plurality of multiplier-accumulator circuits—labeled as "NMAX Rows"—see, e.g., the '345 and '212 applications); notably, in one embodiment, each MAC execution pipeline (which, in one embodiment, consists of a plurality of serially interconnected multiplier-accumulator circuits) is connected to an associated L0 memory (e.g., SRAM memory) that is dedicated to that processing pipeline; the associated L0 memory stores filter weights used by the multiplier circuit of each multiplier-accumulator circuit of that particular MAC pipeline in performance of the multiply operations, wherein each MAC pipeline of a given cluster is connected to an associated L0 memory (which, in one embodiment, is dedicated to the multiplier-accumulator circuits of that MAC pipeline); a plurality (e.g., 16) MAC execution pipelines of a MAC cluster (and, in particular, the L0 memory of each MAC execution pipeline of the cluster) is coupled to an associated L1 memory (e.g., SRAM memory); here, the associated L1 memory is connected to and shared by each of the MAC execution pipelines of the cluster to receive filter weights to be stored in the L0 memory associated with each MAC execution pipeline of the cluster; in one embodiment, the associated L1 memory is assigned and dedicated to the plurality of pipelines of the MAC cluster; notably, the shift-in and shift-out paths of each 64-MAC execution pipeline is coupled to L2 memory (e.g., SRAM memory) wherein the L2 memory also couples to the L1 memory and L0 memory; the NOC couples the L2 memory to the PHY (physical interface) which may connect to L3 memory (e.g., external DRAM); the NOC also couples to a PCIe or PHY which, in turn, may provide interconnection to or communication with circuitry external to the X1 processing component (e.g., an external processor, such as a host processor); the NOC, in one embodiment, may also connect a plurality of X1 components (e.g., via GPIO input/output PHYs) which allow multiple X1 components to process related data (e.g., image data), as discussed herein, in accordance with one or more aspects of the present inventions;

FIGS. 15A and 15B illustrate schematic block diagrams of exemplary multiplier-accumulator execution or processing pipelines including an activation circuit and a plurality of serially connected multiplier-accumulator circuits having an output connected to the input of the activation circuit, according to one or more aspects of the present inventions, wherein, in this embodiment of the pipeline architecture, the input data values (Dijk) are broadcast to the plurality of MACs of the pipeline and thereafter input or loaded into a plurality of MACs of the pipeline, concurrently, and, as such, each MAC of the linear MAC pipeline receives and loads the same input data value (Dijk), and the multiplier circuit in each MAC of the pipeline multiplies (for example, concurrently—e.g., on the same or a common execution cycle of an execution sequence) the same data value (Dijk) and a filter weight (Fkl) that is different from the filter weights employed by the other MACs of the pipeline a plurality of execution cycles of the execution sequence; in one embodiment, each MAC of the MAC pipeline generates a product value, each execution cycle of the sequence, using the same data value (Dijk) and a different filter weight (Fkl)—as described and/or illustrated in U.S. Provisional Application 63/289,835 (the '835 application is hereby incorporated herein by reference in its entirety); the product value generated in each MAC of the serially interconnected MAC pipeline may be added via the accumulation circuit of each MAC, to the initial accumulation value (if this operation correlates to the first execution cycle of the execution sequence) or added to the partial accumulation value (if the operation correlates to an execution cycle that is not the first cycle of the execution sequence); in this embodiment, neither the input data values nor the accumulation data values are rotated, transferred or moved (e.g., before, during or at the completion of each execution cycle of the execution sequence) through the plurality of serially interconnected MACs of the pipeline; each multiplier-accumulator circuit includes a multiplier circuit ("MUL") to perform/implement the multiply operations and accumulator circuit ("ADD") to perform/implement the accumulate operations, wherein the activation circuit processes data output from the serially connected multiplier-accumulator circuits via, for example, linear and/or non-linear activation operations and/or threshold functions, according to one or more aspects of the present inventions; in this exemplary embodiment, the multiplier-accumulator circuit may include or read from one or more of memory banks (e.g., two SRAM memory banks) that are dedicated to a multiplier-accumulator circuit to store filter weights used by the multiplier circuit of the associated multiplier-accumulator circuit; notably, the activation circuit may employ any of the exemplary embodiments described and/or illustrated herein (e.g., FIGS. 1, 2A-2F and 3);

FIGS. 16A and 16B illustrate schematic block diagrams of logical overviews of exemplary multiplier-accumulator execution pipelines, connected in a linear pipeline configuration wherein the output thereof is connected to an input of an activation circuit, according to one or more aspects of the present inventions, wherein the multiplier-accumulator processing or execution pipeline ("MAC pipeline") includes multiplier-accumulator circuitry having a plurality of multiplier-accumulator circuits ("MACs"), and the activation circuit processes data output from the serially connected multiplier-accumulator circuits via, for example, linear and/or non-linear activation operations and/or threshold functions, according to one or more aspects of the present inventions; the activation operations (implemented by the activation circuit) may, in one embodiment, be performed between the MAC operations and the serial shift output of the processed data to, for example, memory (see FIG. 16A); in another embodiment, the activation operations (implemented by the activation circuit) are performed after the serial shift output of the processed data but before writing data into, for example, memory (see FIG. 16B); in these illustrative embodiments, the plurality of MACs is illustrated in block diagram form and are connected in a linear pipeline configuration wherein the input data values (Dijk) are broadcast to the plurality of MACs of the pipeline and thereafter input or loaded into a plurality of MACs of the pipeline, concurrently, and, as such, each MAC of the linear MAC pipeline receives and loads the same input data value (Dijk), and the multiplier circuit in each MAC of the pipeline multiplies (for example, concurrently—e.g., on the same or a common execution cycle of an execution sequence) the same data value (Dijk) and a filter weight (Fkl) that is different from the filter weights employed by the other MACs of the pipeline a plurality of execution cycles of the execution sequence—as described and/or illustrated in the '835 application; an exemplary multiplier-accumulator circuit is illustrated in schematic block diagram form in Inset A; notably, in this exemplary embodiment, "m" (e.g., 64 in one illustrative embodiment) multiplier-accumulator circuits are connected in a linear execution pipeline to operate concurrently whereby the processing circuits perform m×m (e.g., 64×64) multiply-accumulate operations in each m (e.g., 64) cycle interval (here, a cycle may be nominally 1 ns); notably, each m (e.g., 64) cycle interval processes a Dd/Yd (depth) column of input and output pixels/data at a particular (i,j) location (the indexes for the width Dw/Yw and height Dh/Yh dimensions of this exemplary embodiment—Dw=512, Dh=256, and Dd=128, and the Yw=512, Yh=256, and Yd=64) wherein the m (e.g., 64) cycle execution interval is repeated for each of the Dw*Dh depth columns for this stage; in addition, in one embodiment, the filter weights or weight data are loaded into memory (e.g., L1/L0 SRAM memories) before the multiplier-accumulator circuitry starts processing (see, e.g., the '345 and '212 applications); in one embodiment, the L1 SRAM memory may provide data to a plurality of L0 SRAM memories, wherein each pipeline (like those illustrated in FIGS. 16A and 16B) is associated with a dedicated L0 SRAM memory of such plurality of L0 SRAM memories; notably, the activation circuit may employ any of the exemplary embodiments described and/or illustrated herein (e.g., FIGS. 1, 2A-2F and 3);

FIGS. 17A and 17B illustrate high-level block diagram layouts of an integrated circuits or portions of an integrated circuits (which may be referred to, at times, as an X1 component) including a plurality of multi-bit MAC execution pipelines, each pipeline having a plurality of multiplier-accumulator circuits—each of which implement multiply and accumulate operations, and an activation circuit connected to the output of each pipelines to process data output therefrom via, for example, linear and/or non-linear activation operations and/or threshold functions, according to one or more aspects of the present inventions; the multi-bit MAC execution pipelines and/or the plurality of multiplier-accumulator circuits may be configured to implement one or more processing architectures or techniques (singly or in combination with one or more X1 components); in one embodiment, the activation circuit is disposed at the output of the MAC pipeline before the data is shifted out to other circuitry of the integrated circuit (see FIG. 17A); in another embodiment, the activation circuit is disposed in the NLINK circuitry wherein the activation circuit processes the output of each pipelines to process data output therefrom after such data is shifted out of the pipeline; in this illustrative embodiment, each pipeline includes a plurality of MACs—each of which implement multiply and accumulate operations—to form a linear pipeline and each of which implement multiply and accumulate operations, wherein, in this embodiment, the same input data value (Dijk) is broadcast to the plurality of MACs of the linear pipeline and, input or loaded, concurrently, into each MAC thereof; and, in operation, the plurality of MACs of the linear pipeline, via the multiplier circuit of each MAC of the pipeline, concurrently (e.g., on the same or a common execution cycle of an execution sequence) multiply the same data value with a different filter weight for each execution cycle of the execution sequence; the expanded view of a portion of the high-level block diagrams of FIGS. 15A, 15B, 16A and 16B; moreover, in this illustrative embodiment, the multi-bit MAC execution pipelines are organized into clusters (in this illustrative embodiment, four clusters wherein each cluster includes a plurality of multi-bit MAC execution pipelines (in this illustrative embodiment each cluster includes 16, 64-MAC execution pipelines (which may also be individually referred to below as MAC processors)); in one embodiment, the plurality of multiplier-accumulator circuitry are configurable or programmable (one-time or multiple times, e.g., at start-up and/or in situ) to implement one or more pipelining processing architectures or techniques (see, e.g., the expanded view of a portion of the high-level block diagram of FIGS. 16A and 16B in the lower right is a single MAC execution pipeline (in the illustrative embodiment, including, e.g., 64 multiplier-accumulator circuits or MAC processors) which correlates to the schematic block diagram of a logical overview of an exemplary multiplier-accumulator circuitry arranged in a linear execution pipeline configuration—see FIGS. 16A and 16B); the processing component in this illustrative embodiment includes memory (e.g., L2 memory, L1 memory and L0 memory (e.g., SRAM)), a bus interfaces (e.g., a PHY and/or GPIO) to facilitate communication with circuitry external to the component and memory (e.g., SRAM and DRAM) for storage and use by the circuitry of the component, and a plurality of switches/multiplexers which are electrically interconnected to form a switch interconnect network "Network-on-Chip" ("NOC") to facilitate interconnecting the clusters of multiplier-accumulator circuits of the MAC execution pipelines; in one embodiment, the NOC includes a switch interconnect network (e.g., a mixed-mode interconnect network (i.e., a hierarchical switch matrix interconnect network and a mesh, torus or the like interconnect network (hereinafter collectively "mesh network" or "mesh interconnect network")), associated data storage elements, input pins and/or look-up tables (LUTs) that, when programmed, determine the operation of the switches/multiplexers; in one embodiment, one or more (or all) of the clusters includes one or more computing elements (e.g., a plurality of multiplier-accumulator circuitry—labeled as "NMAX Rows"—see, e.g., the '345 and '212 applications); notably, in one embodiment, each MAC execution pipeline (which, in one embodiment, consists of a plurality of serially interconnected multiplier-accumulator circuits) is connected to an associated L0 memory (e.g., SRAM memory) that is dedicated to that processing pipeline; the associated L0 memory stores filter weights used by the multiplier circuit of each multiplier-accumulator circuit of that particular MAC pipeline in performance of the multiply operations, wherein each MAC pipeline of a given cluster is connected to an associated L0 memory (which, in one embodiment, one or more banks of L0 memory are dedicated to each multiplier-accumulator circuit of that MAC pipeline); a plurality (e.g., 16) MAC execution pipelines of a MAC cluster (and, in particular, the L0 memory of each MAC execution pipeline of the cluster) is coupled to an associated L1 memory (e.g., SRAM memory); here, the associated L1 memory is connected to and shared by each of the MAC execution pipelines of the cluster to receive filter weights to be stored in the L0 memory associated with each MAC execution pipeline of the cluster; in one embodiment, the associated L1 memory is assigned and dedicated to the plurality of pipelines of the MAC cluster; notably, the shift-in and shift-out paths of each 64-MAC execution pipeline is coupled to L2 memory (e.g., SRAM memory) wherein the L2 memory also couples to the L1 memory and L0 memory; the NOC couples the L2 memory to the PHY (physical interface) which may connect to L3 memory (e.g., external DRAM); the NOC also couples to a PCIe or PHY which, in turn, may provide interconnection to or communication with circuitry external to the X1 processing component (e.g., an external processor, such as a host processor); the NOC, in one embodiment, may also connect a plurality of X1 components (e.g., via GPIO input/output PHYs) which allow multiple X1 components to process related data (e.g., image data), as discussed herein, in accordance with one or more aspects of the present inventions.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed or illustrated separately herein.

DETAILED DESCRIPTION

In a first aspect, the present inventions are directed to one or more integrated circuits having data processing circuitry, for example, a plurality of MACs (e.g., connected in a linear pipeline), to process data (e.g., filter image data) wherein the processing circuitry includes activation circuitry, for example, disposed on the output of the MAC pipeline, to process the data initially processed by the MAC pipeline. The activation circuitry may include one or more circuits to process such data via one or more operations, including, for example, linear and/or non-linear activation operations and/or threshold functions. The one or more circuits, alone or in combination, may perform a particular operation, including, for example, a particular linear or non-linear activation operation or threshold function. Notably, the additional data processing implemented by the activation circuitry may be programmable (e.g., one-time or more than one-time) or fixed (e.g., at manufacture or after test or packaging).

Where the data processing circuitry includes a plurality of MAC processing pipelines, in one embodiment, the activation circuitry includes a plurality of activation circuits wherein each activation circuit is connected to an associated MAC pipeline and dedicated to processing the output data of/from the plurality of MACs of the associated MAC pipeline (e.g., linear MAC pipeline). Here, each activation circuit includes the aforementioned one or more circuits to process the data initially processed by the MACs (e.g., serially connected MACs) of the associated MAC pipeline. The one or more circuits, alone or in combination(s), of each activation circuit may perform a predetermined data processing operation (e.g., a particular linear or non-linear activation operation or threshold function) in connection with the data output by the associated MAC pipeline. The data processing operation implemented by an activation circuit may be the same as or different from data processing operation implemented by activation circuit(s) associated with one or more other MAC pipeline(s). As such, the activation circuit(s) associated with one or more MAC pipelines (i.e., a first group of MAC pipelines) may process data output from associated MAC pipeline(s) via a first linear or non-linear activation operation or threshold function, and one or more other MAC pipelines (i.e., another group or other groups of MAC pipelines) may process data output from one or more associated MAC pipelines via another or other linear or non-linear activation operation(s) or threshold function(s) that is/are different from the operation(s)/function(s) employed in connection with the first group of MAC pipelines. Indeed, in one embodiment, the particular data processing operation (e.g., linear or non-linear threshold function) performed by each activation circuit which is associated with one of the plurality of MAC pipelines, at any one particular time of operation of such pipelines, is the same.

With reference to FIG. 1, in one embodiment, the activation circuitry is connected to the output of a MAC pipeline having a plurality of serially connected multiplier-accumulator circuits (which form a linear pipeline), wherein each multiplier-accumulator circuit of the MAC pipeline includes a multiplier circuit and an accumulator circuit (see Inset A in FIG. 1). The activation circuitry processes the data which are initially processed by the serially connected multiplier-accumulator circuits of the MAC pipeline (i.e., the "MAC Output Data") via one or more circuits, configurable to perform one or more linear or non-linear activation operation(s) or threshold function(s). The linear or non-linear activation operation(s) or threshold function(s) implemented by the activation circuitry, in one embodiment, is/are selected or controlled via, for example, a mode select signal. After processing, the output of the activation circuitry (i.e., "MAC Pipeline Output Data") may, in one embodiment, be directly written to and stored in memory for subsequent analysis. In addition thereto, or in lieu thereof, the MAC Pipeline Output Data may be immediately provided to analysis circuitry to analyze the processed data (e.g., in connection with inferencing).

With reference to FIGS. 2A-2D, in one embodiment, the activation circuit includes a plurality of circuits to perform one or more linear and/or non-linear activation operation(s) or threshold function(s). Each circuit of the activation circuit may perform a particular linear or non-linear activation operation or threshold function. For example, with reference to FIGS. 2A-2C, circuit 1 may perform or process data according to a first non-linear activation operation or threshold function and circuit 2 may perform or process data according to a second non-linear activation operation or threshold function. Moreover, circuit 1 in combination with circuit 3 may perform or process data according to a third non-linear activation operation or threshold function (see FIG. 2C) and circuit 1 in combination with circuit 4 or circuit 5 may perform or process data according to a fourth non-linear activation operation or threshold function (See FIG. 2D). Indeed, each data path through the activation circuit may perform or process data according to a non-linear activation operation or threshold function different from other data path(s) of the activation circuit.

The data path through the activation circuit may be defined, programmed and/or configured by one or more control signals (e.g., a mode select) that configures the activation circuit and, as such, the linear or non-linear activation operation or threshold function implemented or performed by the activation circuit. As intimated above, the data path through the activation circuitry may include one circuit or a plurality of circuits wherein, in combination, such plurality of circuits process the data output from the MAC pipeline according to a predetermined linear or non-linear activation operation or threshold function. In one embodiment, the activation circuit further includes a "by-pass" data path whereby the activation circuit is configured to by-pass the processing circuitry of the activation circuit, and as such, not process the data that are output from the MAC pipeline. (See, FIG. 2E). In that way, the "MAC Output Data" is the same (or largely the same) as the "MAC Pipeline Output Data." The "by-pass" data path may be implemented in any of the embodiments of the activation circuit described and/or illustrated herein (see, e.g., FIGS. 2A-2D and 2F).

Notably, for the purposes of clarity (e.g., elimination of clutter), selection circuitry (e.g., multiplexers or switches) to configure, define, enable or establish the selected or desired data path is not illustrated in the FIGS. 2A-2D. However, in one embodiment, the activation circuit may include one or more multiplexers and/or switches to selective configure, define, enable or establish the data path of the activation circuit and, as such, the predetermined linear or non-linear activation operation or threshold function employed to process the MAC output data and generate the MAC pipeline output data. (See, e.g., FIG. 2F; and compare FIG. 2F to FIG. 2B). In this regard, the control signal(s) may determine or control which output of the plurality of multiplexer outputs is connected to the multiplexer input and as such, determine or configure the data path from the input of the activation circuit to the output of the activation circuit—via, for example, control of such multiplexers or switches.

With reference to FIGS. 2A-2F, it may be advantageous to configure the activation over a range of activation behaviors. In one embodiment, this may be implemented by scheduling extra (floating point) addition and multiplication operations to bias and scale the data values of the MAC output data before a fixed activation function is applied via the activation circuit. In this embodiment, the activation circuit may also include circuit(s) to bias and/or scale the values of the MAC output data. In one embodiment, the range of activation operations that may be configured extends across a range of non-linear threshold functions which may be enabled or selected to avoid extra addition and multiplication operations. Indeed, in one embodiment, the activation circuit may be configured to implement an activation operation across multiple function families, with additional configuration options within each family. In this way, the configurable activation option may avoid additional addition and/or multiplication operations for biasing and/or scaling to the output of the execution pipeline.

With reference to FIG. 3, in one embodiment, activation control circuitry may be employed to program or configure (whether dynamic or otherwise) the activation circuit to program or configure the data processing (e.g., linear or non-linear activation operation or threshold function) implemented thereby. The activation control circuitry may be partially or entirely resident/disposed on the integrated circuit of the processing circuitry (i.e., the MAC processing pipeline(s)) or external thereto (e.g., in a host computer or on a different integrated circuit from the MAC circuitry and execution pipeline(s)). Here, activation control circuitry may control, change or select the predetermined linear or non-linear activation operation or threshold function performed by the activation circuit. The control signal(s) (e.g., mode select) output by the control circuitry may be applied to the activation circuit to configure or program the activation circuit—for example, via controlling the configuration of the multiplexer(s) and/or switch(es) and thereby the data path through the activation circuit.

With continued reference to FIG. 3, in one embodiment, configuration memory (e.g., a configuration register which may be partially or entirely resident/disposed on the integrated circuit of the processing circuitry) may store data which is representative of the processing operations to be performed by the activation circuit (e.g., the linear or non-linear activation operation or threshold function implemented by the activation circuit). The configuration memory may be programmed at or during power-up, start-up, initialization, re-initialization and/or in situ (i.e., during normal operation of the integrated circuit). In one embodiment, configuration memory (e.g., a configuration register) may store configuration data, including data which is representative of the control signals necessary to implement the configurability of the activation circuit to perform the data processing of the MAC output data. The configuration memory may be read at power-up, start-up, initialization, re-initialization and/or in situ by control circuitry in order to program or configure the activation circuit (and/or data path therethrough), and processing operations to be performed thereby the activation (e.g., the linear or non-linear activation operation or threshold function implemented by the activation circuit).

The data processing performed by the activation circuit may be fixed (e.g., at manufacture) or programmable/configurable (e.g., one-time or more than one-time). For example, in one embodiment, the activation circuit(ry) is more than one-time programmable/configurable (e.g., via control or multiplexer(s) or switch(es)—see FIGS. 2A-2F and 3)) such that the operation(s) or process(es) implemented thereby may be configured or selected between a plurality of linear and/or non-linear activation operations or threshold functions. Indeed, in one embodiment, where the activation circuit is connected to a first MAC pipeline (having a first plurality of MACs and/or a first pipeline architecture), the activation circuit may be programmed or configured, for example, in situ (i.e., during normal operation of the integrated circuit) to perform a first non-linear activation operation or threshold function. Thereafter, that activation circuit may be connected to a second MAC pipeline (having a second plurality of MACs and/or a second pipeline architecture), that activation circuit may be re-programmed or re-configured, for example, in situ (i.e., during normal operation of the integrated circuit), to perform a second/different non-linear activation operation or threshold function and thereby process the data output from the second MAC pipeline according to a second/different non-linear activation operation or threshold function. In this way, the activation circuit may perform a selected predetermined non-linear operation on, for example, linear data that are output from the MAC circuit(s) of the MAC pipeline(s).

With reference to FIGS. 4A, 4B, 5A and 5B, in one embodiment, a plurality of multiplier-accumulator circuits (e.g., 64) are configured in a linear multiplier-accumulator execution or processing pipeline. Each multiplier-accumulator circuit (labeled "MAC x") may include one or more "local" memory/register banks (which are associated with and dedicated to a particular multiplier-accumulator circuit—e.g., L0 SRAM), to store a plurality of different sets of filter weights, to be employed in connection with the multiply operations associated with the processing a given set of input data.

The linear MACs of the processing pipeline may employ the single memory/register bank embodiment, the two memory/register bank embodiment, or the more than two memory/register bank embodiment. (See, for example, U.S. Provisional Application No. 63/012,111, filed Apr. 18, 2020, which is hereby incorporated by reference). In one embodiment, multiplier-accumulator circuit includes two memory/register banks (e.g., L0 such as SRAM) wherein the two memory/register banks are independent banks such that in each execution cycle, one of the banks for each MAC may be read (using the shared read address bus), placing the read data on an associated RD[p] signal line that is input into the multiplexer ("mux"). The read data is moved/written into the F register (D_r[p]) to be used in the execution cycle. The F register (D_r[p]) is written with a new filter weights (Fkl value) for each execution cycle.

During the execution cycle, the other memory/register bank (i.e., the bank that is not being read from) is available to store filter weights via write operations (using a WA address bus that, in one embodiment, is shared/common between the memory/register banks). Here, write data (i.e., filter weight values) may be written into the memory bank not being accessed by the multiplier-accumulator circuit during the current processing operations. In one embodiment, filter weight data (e.g., the next set of filter weights to be used in processing) may be read from a larger memory (e.g., an L1 SRAM which is external to the multiplier-accumulator circuit) and subsequently stored in the memory/register bank (L0 SRAM) without interfering with the current/on-going set of execution cycles of the current processing operations.

Regarding the execution cycle, with reference to FIGS. 4A and 4B, each multiplier-accumulator circuit (which may also be referred to as "processing element") includes the shifting chain (D_SI[p]) for the data input (Dijk data). In one embodiment, the next Dijk data is shifted in while the current Dijk data is used in the current set of execution cycles. The current Dijk data is stored in the D_i[p] register during the current set of execution cycles without changing.

Further, each multiplier-accumulator circuit includes a shifting chain (MAC_SO[p]) for preloading the Yijl sum. The next set of Yijl sums are shifted in while the current set of Yijl sums are calculated/generated during the current set of execution cycles. In this embodiment, each multiplier-accumulator circuit also uses the shifting chain (MAC_SO[p]) for unloading or outputting the Yijl sum. The previous Yijl sums are shifted out while the current Yijl sums are generated in the current set of execution cycles. Notably, the concurrent use of the Yijl shifting chain (MAC_SO[p]) may include both preloading and unloading.

In each execution cycle, the filter weight value (Fkl value) in the D_r[p] register is multiplied by the Dijk value in the D_i[p] register, via multiplier circuit, and the result is output to the MULT_r[p] register. In the next pipeline cycle this product (i.e., D*F value) is added to the Yijl accumulation value in the MAC_r[p−1] register (in the previous multiplier-accumulator circuit) and the result is stored in the MAC_r[p] register. This execution process is repeated for the current set of execution cycles. Notably, the Yijl accumulation values move (rotate) during the current set of execution cycles.

Briefly, with reference to FIGS. 5A and 5B, in one embodiment, the multiplier-accumulator circuits of the execution pipeline are configured in a linearly connected pipeline architecture. In this embodiment, Dijk data is "fixed" in place during execution and Yijl data "rotates" during execution of the multiply and accumulate operations. The "m×m" Fkl filter weights are distributed across L0 memory (in one exemplary embodiment, m=64 such that 64 L0 SRAMs are employed—wherein one L0 SRAM in each MAC processing circuit of the 64 MAC processing circuit of the pipeline). In each execution cycle, m Fkl values will be read from memory and provided/output to the MAC elements or circuits. The multiplier-accumulator circuit is illustrated in schematic block diagram form in Inset A.

The Dijk data values may be stored in the processing element during the m execution cycles after being loaded from the Dijk shifting chain/path which is connected to DMEM memory (here, L2 memory—such as SRAM). Further, during multiply and accumulate processing, via the m MACs, the Yijlk MAC values are rotated through all m MAC processing elements/circuits during the m execution cycles after being loaded from the Yijk shifting chain/path (see $Y_{MEM}$ memory), and will be unloaded with the same shifting chain/path. Again, in one exemplary embodiment, m=64.

Further, in this exemplary embodiment, "m" (e.g., 64 in one embodiment) MAC processing circuits in the execution pipeline operate concurrently whereby the multiplier-accumulator processing circuits perform m×m (e.g., 64×64) multiply-accumulate operations in each m (e.g., 64) cycle interval (here, a cycle may be nominally 1 ns). Thereafter, a next set of input pixels/data (e.g., 64) is shifted-in and the previous output pixels/data is shifted-out during the same m cycle interval (e.g., 64). Notably, each m cycle interval (e.g., 64) processes a Dd/Yd (depth) column of input and output pixels/data at a particular (i,j) location (the indexes for the width Dw/Yw and height Dh/Yh dimensions). The m cycle execution interval (e.g., 64) is repeated for each of the Dw*Dh depth columns for this stage. In this exemplary embodiment, the filter weights or weight data are loaded into memory (e.g., the L1/L0 SRAM memories) from, for example, an external memory or processor before the stage processing started (see, e.g., the '345 application). In this particular embodiment, the input stage has Dw=512, Dh=256, and Dd=128, and the output stage has Yw=512, Yh=256, and Yd=64. Note that only 64 of the 128 Dd input are processed in each 64×64 MAC execution operation.

With continued reference to FIGS. 5A and 5B, the method implemented by the configuration illustrated may accommodate arbitrary image/data plane dimensions (Dw/Yw and Dh/Yh) by simply adjusting the number of iterations of the basic m×m MAC accumulation operation that are performed. The loop indices "I" and "j" are adjusted by control and sequencing logic circuitry to implement the dimensions of the image/data plane. Moreover, the method may also be adjusted and/or extended to handle a Yd column depth larger than the number of MAC processing elements (e.g., 64 in this illustrative example) in the execution pipeline. In one embodiment, this may be implemented by dividing the depth column of output pixels into blocks (e.g., 64), and repeating the MAC accumulation of FIGS. 5A and 5B for each of these blocks.

Indeed, the method intimated in FIGS. 5A and 5B may be further extended to handle a Dd column depth smaller or larger than the number of MAC processing elements/circuits (64 in one exemplary embodiment) in the execution pipeline. In the context of larger than the number of MAC circuits, this may be implemented, in one embodiment, by initially performing a partial accumulation of a first block of 64 data of the input pixels Dijk into each output pixel Yijl. Thereafter, the partial accumulation values Yijl are read (from the memory $Y_{mem}$) back into the execution pipeline as initial values for a continuing accumulation of the next block of 64 input pixels Dijk into each output pixel Yijl. The memory which stores or holds the continuing accumulation values (e.g., L2 memory) may be organized, partitioned and/or sized to accommodate any extra read/write bandwidth to support the processing operation.

In one embodiment, the data processed by the MAC pipeline is output via Yijl shifting chain (MAC_SO[p]) and input to the activation circuit. The activation circuit receives the data and implements a predetermined data processing operation (e.g., linear or non-linear activation operation or threshold function), as discussed above (see FIGS. 1 and 2A-2F). In one embodiment, the activation control circuitry programs and/or configures the activation circuit (see FIG. 3) to implement the particular data processing operation in connection with the output of the MAC pipeline (i.e., MAC output data). Thus, as the Yijl output values (e.g., output pixel values) are unloaded from the execution pipeline (e.g., for storage in memory, e.g., L2/L3 memory), the data may undergo additional processing via the activation circuit in order to, for example, apply a non-linear threshold function to the linear output of the MACs. In one embodiment, the activation circuit may process the data at the same pipeline rate as the MACs.

With reference to FIGS. 6A, 6B and 7A-7C, in one embodiment, the activation circuitry includes a plurality of activation circuits wherein each activation circuit is incorporated or connected into an associated MAC pipeline to process the output of the MAC circuit(s) of the associated MAC pipeline (e.g., performing non-linear activation operation(s) or threshold function(s) on the data output from the MAC circuit(s) of the associated MAC pipeline). Each activation circuit of the circuitry may be connected to an associated output of the accumulator circuit of the MAC(s) of the associated MAC pipeline to implement the selected operation or function (e.g., non-linear threshold function—which may or may not be the same operation or function) in connection with the data output of the accumulator circuit from the last MAC of the plurality of MACs of the associated MAC pipeline. The activation circuit may process (e.g., perform non-linear filtering operation) the data output from the last MAC of the plurality of serially interconnected MACs of the associated MAC pipeline at the same data processing rate as the data processing rate of the pipeline.

With reference to FIGS. 6A and 6B, an integrated circuit may include a plurality of multi-bit MAC execution pipelines which are organized as one or more clusters of a processing component. Here, the component may include "resources" such as a bus interfaces (e.g., a PHY and/or GPIO) to facilitate communication with circuitry external to the component and memory (e.g., SRAM and DRAM) for storage and use by the circuitry of the component. For example, in one embodiment, four clusters are included in the component (labeled "X1") wherein each cluster includes a plurality of multi-bit MAC execution pipelines (for example, in this illustrative embodiment 16 64-MAC execution pipelines). Notably, one MAC execution pipeline (which in this illustrative embodiment includes m MAC processing circuits) of FIGS. 6A and 6B is illustrated at the lower right for reference purposes.

With continued reference to FIGS. 6A and 6B, the memory hierarchy in this exemplary embodiment includes an L0 memory (e.g., SRAM) that stored filter weights or coefficients to be employed by multiplier-accumulator circuits in connection with the multiplication operations implemented thereby. In one embodiment, each MAC execution pipeline includes an L0 memory to store the filter weights or coefficients associated with the data under processing by the circuitry of the MAC execution pipeline. An L1 memory (a larger SRAM resource) is associated with each cluster of MAC execution pipelines. These two memories may store, retain and/or hold the filter weight values Fkl employed in the multiply and accumulation operations.

Notably, the embodiments of FIGS. 6A and 6B may employ an L2 memory (e.g., an SRAM memory that is larger than the SRAM of L1 or L0 memory). A network-on-chip (NOC) couples the L2 memory to the PHY (physical interface) to provide connection to an external memory (e.g., L3 memory—such as, external DRAM component(s)). The NOC also couples to a PCIe PHY which, in turn, couples to an external host. The NOC also couples to GPIO input/output PHYs, which allow multiple X1 components to be operated concurrently. The control/configure circuit (referred to, at times, as "NLINK" or "NLINK circuit") connect to multiplier-accumulator circuitry (which includes a plurality (in one exemplary embodiment, 64) MACs or MAC processors) to, among other things, configure the overall execution pipeline by providing or "steering" data between one or more MAC pipeline(s), via programmable or configurable interconnect paths. In addition, the control/configure circuit may configure the interconnection between the multiplier-accumulator circuitry and one or more memories—including external memories (e.g., L3 memory, such as external DRAM)—that may be shared by one or more (or all) of the clusters of MAC execution pipelines. These memories may store, for example, the input image pixels Dijk, output image pixels Yijl (i.e., image data processed via the circuitry of the MAC pipeline(s), as well as filter weight values Fkl employed in connection with such data processing.

Notably, although the illustrative or exemplary embodiments described and/or illustrated a plurality of different memories (e.g., L3 memory, L2 memory, L1 memory, L0 memory) which are assigned, allocated and/or used to store certain data and/or in certain organizations, one or more of other memories may be added, and/or one or more memories may be omitted and/or combined/consolidated—for example, the L3 memory or L2 memory, and/or the organizations may be changed. All combinations are intended to fall within the scope of the present inventions.

Moreover, in the illustrative embodiments set forth herein (text and drawings), the multiplier-accumulator circuitry and/or multiplier-accumulator pipeline is, at times, labeled in the drawings as "NMAX", "NMAX pipeline", "MAC", or "MAC pipeline".

With continued reference to FIGS. 6A and 6B, the integrated circuit(s) include a plurality of clusters (e.g., two, four or eight) wherein each cluster includes a plurality of MAC execution pipelines (e.g., 16). Each MAC execution pipeline may include a plurality of separate multiplier-accumulator circuits (e.g., 64) to implement multiply and accumulate operations. In one embodiment, a plurality of clusters are interconnected to form a processing component (such component is often identified in the figures as "X1" or "X1 component") that may include memory (e.g., SRAM, MRAM and/or Flash), a switch interconnect network to interconnect circuitry of the component (e.g., the multiplier-accumulator circuits and/or MAC execution pipeline(s) of the X1 component) and/or circuitry of the component with circuitry of one or more other X1 components. Here, the multiplier-accumulator circuits of the one or more MAC execution pipelines of a plurality of clusters of a X1 component may be configured to concurrently process related data (e.g., image data). That is, the plurality of separate multiplier-accumulator circuits of a plurality of MAC pipelines may concurrently process related data to, for example, increase the data throughput of the X1 component.

Notably, the X1 component may also include interface circuitry (e.g., PHY and/or GPIO circuitry) to interface with, for example, external memory (e.g., DRAM, MRAM, SRAM and/or Flash memory). Indeed, the NLINK circuitry and X1 component are discussed in detail in U.S. patent application Ser. No. 17/019,212 (filed Sep. 12, 2020) and U.S. Provisional Application No. 62/012,111 (filed Apr. 18, 2020), which, as noted above, are incorporated by reference herein.

With reference to FIGS. 2A-2F, 3, 6A and 6B, in one embodiment, activation circuit control circuitry programs, configures and/or controls the activation circuitry (e.g., a plurality of separate activation circuits) of the MAC processing pipeline(s). The activation circuit control circuitry may program and/or re-program the activation circuitry to enable and/or select the data processing employed according to one or more non-linear threshold functions or operations. In one embodiment, the activation circuit control circuitry may enable and/or select a first data processing path of the activation circuitry to implement a first non-linear threshold function or operation and disable one or more other data processing paths of the activation circuitry that correspond to other non-linear threshold function(s) or operation(s). Indeed, in one embodiment, the activation circuit control circuitry may enable and/or select a data processing path in one or more (or all) of the activation circuit(s) to implement a particular processing operation or function that processes the data output from the last MAC of the plurality of MACs of the associated MAC processing pipeline. The activation circuit control circuitry may enable and/or select a data processing path which performs the same processing operation or function in each of the activation circuits or different processing operations or functions in one or more (or all) of the activation circuits. As noted above, in one embodiment, each activation circuit of the activation circuitry is associated with a particular, given and/or different MAC processing pipeline.

The activation circuit control circuitry may program and/or re-program the activation circuitry (e.g., one or more (or all) of the activation circuits) to process the data according to one or more of a range of activation behaviors—which, as mentioned above, is often implemented by scheduling extra (floating point) addition and/or multiplication operations to bias and/or scale the output of the MAC execution pipeline(s) before implementing a fixed activation operation or function. In one embodiment, however, the activation circuit control circuitry programs and/or re-programs the activation circuitry to process the data according to one of a range of non-linear threshold functions or operations whereby the selected or programmed function or operation implemented by the activation circuitry is performed without additional or extra addition and/or multiplication operations. In this embodiment, the MAC processing pipeline, having the configurable/programmable activation circuitry, may omit addition and/or multiplication operations to bias and/or scale the output of the MAC execution pipeline.

With reference to FIGS. 6A, 6B and 7A-7C, the activation circuitry may include a plurality of activation circuits wherein each activation circuit is incorporated with or connected to an associated MAC processing pipeline to process the output of the MAC circuit(s) of the associated MAC processing pipeline (e.g., performing non-linear activation operation(s) or threshold function(s) on the data output from the MAC circuit(s) of the associated MAC processing pipeline). For example, with reference to FIG. 7A in particular, each activation circuit of the activation circuitry may be connected to an associated output of the accumulator circuit of the MAC(s) of the associated MAC processing pipeline to implement the selected operation or function (e.g., non-linear threshold function) in connection with the data output of the accumulator circuit from the last MAC of the plurality of MACs of the associated MAC processing pipeline. The activation circuit may process (e.g., perform non-linear filtering operation) the data output from the last MAC of the plurality of serially interconnected MACs of the associated MAC processing pipeline at the same data processing rate as the data processing rate of the pipeline.

With reference to FIG. 7B, the filter weights are organized as M×M blocks of associated filter weights (e.g., a 3×3 block of filter weights). The M×M blocks of associated filter weights are associated with 3×3 blocks of input data (e.g., image data) and initially stored in memory (e.g., L3 memory and/or L2 memory). In operation, a 3×3 block of filter weights is applied to a 3×3 block of image pixels at each (i,j) image pixel position in an input image layer. The sum of the nine multiplications (the inner product) generates a single value. This operation is repeated across a plurality of image layers (in the illustrative embodiment, 64 input image layers), and the 64 inner product values are summed into a single output pixel value at (i,j). The output pixel value is applied to the activation circuit which implements an activation operation thereon. Here, activation circuit processes the output data (e.g., output pixel value) according to a predetermined data processing operation wherein (e.g., one or more non-linear threshold functions or operations. Thereafter, the processed data may be output to memory wherein it is available to analysis by circuitry external to the MAC processing pipeline. In one embodiment, this operation is repeated across the data of a plurality of input image layers (e.g., 512×256 pixels/data) of a plurality of input image layers to produce one image layer (e.g., one 512×256 layer) of the output image (index K)—and, may be repeated a plurality of times (e.g., an additional 64 times) to form a plurality of output layers (e.g., 64 output layers (index L)). Notably, the multiplier-accumulator circuits, MAC execution pipelines and architectures, and the techniques employed and operations implemented thereby, in one embodiment, are described and/or illustrated in: (1) U.S. patent application Ser. No. 16/545,345, (2) U.S. patent application Ser. No. 16/816,164, (3) U.S. Provisional Application No. 62/831,413; (4) U.S. patent application Ser. No. 16/900,319, (5) U.S. Provisional Application No. 62/865,113, (6) U.S. patent application Ser. No. 17/019,212, (7) U.S. Provisional Application No. 62/900,044, (8) U.S. patent application Ser. No. 17/031,631, and (9) U.S. Provisional Application No. 62/909,293; these nine (9) patent applications are incorporated herein by reference in their entirety.

With reference to FIG. 7C, a plurality of MAC execution or processing pipelines may process the input data via Winograd type processing the output data from each pipeline is processed via activation wherein the input data and the filter weights or coefficients are organized into a plurality of groups and the output data may be further processed, as discussed above, via activation operation(s)/function(s)—for example, linear and/or non-linear activation operations and/or threshold functions. In this embodiment, a plurality of associated filter weights of each group (each filter weight thereof having the second data format) is applied to data format conversion circuitry to convert a plurality of associated filter weights to a plurality of associated filter weights (Hkl) having a data format which is the same as the second data format and an increased width, length or size (e.g., from BSF7 to BSF12) are further processed or converted, using Winograd conversion circuitry to a Winograd format (Hkl), as sixteen filter weights arranged as a matrix (e.g., a 4×4) or block. A plurality of filter coefficients or weights are also associated, arranged in or employed by and/or input into the processing circuitry in groups (e.g., 16 filter coefficients in each group wherein each group may be arranged in and/or employed as a 4×4 matrix). The filter weights, in a Winograd format, are then available to or input into the plurality of multiplier-accumulator circuits of the execution pipelines which implement/perform the multiply and accumulate operations to process the input data (Dij, e.g., image data) which are also converted to a Winograd format (Eij) via Winograd conversion circuitry (see, also, the '111 application, the '161 application, the '631 application and/or the '293 application).

With reference to FIG. 8, the generation logic of the activation circuit to implement SN(x,N and TN(x,N) activation functions, in one embodiment, includes a six-stage execution pipeline to facilitate a high throughput rate, even when implemented in a synthesis environment with relatively long gate delays. In an alternative embodiment, one or more (or all) of the pipeline registers may be eliminated/removed to provide a reduced operational latency that may, for example, facilitate implementation into other environments.

With continued reference to FIG. 8, the Pipeline 1 of the exemplary activation circuit receives the output of the MAC—which, in one embodiment, is a value having a floating point data format (16 bit—i.e., FP16) which is labeled A operand. The MODE and MODE-n configuration registers may be previously loaded (the values stored therein may remain static over many operations). Here, the MODE-n value is a two-complement logarithmic scaling factor that is added to the EA[7:0] exponent (i.e. n=LOG 2(N)). This modified exponent and the mantissa/fraction MA[1:7] of the A operand are decoded into $C_N$ different cases.

The Pipeline 2 of the exemplary activation circuit generates a pair of constant values {MD1, MA1} for the $C_N$ cases for performing a linear interpolation. The mantissa/fraction MA1 value is modified to: MA2=MA−MA1, for the next stage.

With continued reference to FIG. 8, the Pipeline 3 of the exemplary activation circuit generates a third constant value {MS} for the $C_N$ cases for performing a linear interpolation. The interpolated value is generated as the value:

$$MD = MD1 + MS^*(MA - MA1) = MD1 + MS^*M2.$$

This requires a 8b×8b=>16b multiply. The 16 bit product is (in carry-save format) MTc and MTs.

The Pipeline 4 of the exemplary activation circuit adds MTc and MTs to give the 16 bit MT product. An 8 bit mantissa/fraction value MD[0:7] is extracted from MT, and is passed to the next pipeline stage.

With continued reference to FIG. 8, the Pipeline 5 of the exemplary activation circuit selects a constant value for ED[7:0]. This ED[7:0] value and the MD[0:7] value from Pipeline 4 are passed to Pipeline 6. The MD[0:7] value is also used to create two values: (constant1-MD[0:7]) and (MD[0:7]-constant2). The first is for the SN(x,N) generation, and the second is for the TN(x,N) generation. One of these is selected by the MODE signal as MN1[0:7]. The Pipeline 5 of the exemplary activation circuit also includes an 8 bit normalization block. This logic locates the first bit position with a "1" in MN1[0:7] (counting from the MN1[0] bit position) and generates a PEN[2:0] shift value. This shift value is used to normalize the MN1[0:7] value to MN[0:7]; i.e. bit MN[0] will be a one. The MN[0:7] and PEN[2:0] values are passed to Pipeline 6 of the exemplary activation circuit.

With continued reference to FIG. 8, the Pipeline 6 of the exemplary activation circuit receives the {SA, EA[7:0], MA[0:7]} fields of operand A, the {ED[7:0], MD[0:7]} fields of result D, and the {MN[0:7], PEN[2:0]} fields. A set of multiplexer select controls are driven from the $C_N$ cases.

The multiplexers select from the input values and from a number of constant values to create the SN(x,N) and TN(x,N) results. The MODE signal selects between the results of the activation functions SN(x,N) and TN(x,N).

With reference to FIG. 9A, the characteristics of the SN(x,N) family of activation functions have a form: SN(x,N)=1/(1+e^(-N*x)). This family includes the SIGMOID function, in which the value of "N" is 1.0—i.e., the center curve.

The five curves that are plotted include the values of N={0.25, 0.5, 1.0, 2.0, 4.0}. All five curves have the domain of real numbers {-INF to +INF} and a range of ZERO to +1.0. Moreover, all have the limit behavior in which:

$$\text{LIMIT}_{(x \to +INF)} SN(x, N) = 1.0; \text{ and}$$

$$\text{LIMIT}_{(x \to -INF)} SN(x, N) = ZERO.$$

In addition, all five curves include the value of SN(x=ZERO, N)=0.5.

Notably, a significant difference between the five curves is the slope at x=ZERO; this can be shown to be dSN(x,N)/dx=N/4. The steepness the slope at the threshold point directly impacts the activation behavior.

The synthesizable Verilog code allows this "N" scaling value to be provided in a configuration register. This makes it convenient to easily sweep through the available scaling values without modifying the input data or inserting additional scaling operations (a floating point multiply operation) into the execution pipeline.

With reference to FIG. 9B, the characteristics of the TN(x,N) family of activation functions have a form: TN(x,N)=(1-e^(-N*x))/(1+e^(-N*x)). This family includes the TANH (hyperbolic tangent) function, in which the value of "N" is 2.0.

The five curves that are plotted include the values of N={0.25, 0.5, 1.0, 2.0, 4.0}. All five curves have the domain of real numbers {-INF to +INF} and a range of -1.0 to +1.0. Moreover, all have the limit behavior in which, $$\text{LIMIT}_{(x \to +INF)} SN(x, N) = 1.0; \text{ and}$$

$$\text{LIMIT}_{(x \to -INF)} SN(x, N) = -1.0.$$

In addition, all five include the value of SN(x=ZERO,N)=ZERO.

Notably, the TN(x,N) and SN(x,N) families of activation functions are related to one another.

A key significant between the five curves is the slope at x=ZERO. This difference may be characterized as: dTN(x,N)/dx=N/2. Indeed, the steepness the slope at the threshold point directly impacts the activation behavior.

The synthesizable Verilog code allows this "N" scaling value to be provided in a configuration register. This makes it convenient to easily sweep through the available scaling values without modifying the input data or inserting additional scaling operations (a floating point multiply operation) into the execution pipeline.

Note that the TN(x,N) slope at x=ZERO is twice that of SN(x,N). This characteristic is because the range of TN(x,N) has been stretched to be twice as large.

With reference to FIG. 10, the present inventions may be employed in connection with (i) floating point data formats having different widths or lengths, including respective ranges, and different precisions, and (ii) fixed point data formats such as integer data formats having different widths or lengths, including respective ranges, and different precisions. The floating point data formats illustrated utilize a signed-magnitude numeric format for the sign field and fraction field. The fraction field has a most-significant weight of 0.5, and a hidden (implicit) bit with a weight of 1.0 is added (i.e. normalized fraction). The exponent field is a two's complement numeric format to which a bias of 127 is added. The three fixed point values utilize a two's complement numeric format. The minimum and maximum exponent values are reserved for special values/operands (NAN, INF, DNRM, ZERO). In one embodiment, the largest magnitude negative and positive values are reserved as saturation values to avoid overflow errors of the numeric format.

The three examples of fixed point data formats {INT32, INT16, INT8} include a single sign bit, but have different sizes for the integer and the fraction fields. Based on a notation {sign/integer/fraction} for the field sizes, the three formats are {1/31/0, 1/15/0, 1/7/0}, respectively. Other fixed point formats are also possible.

These examples use a two's complement numeric format for representing positive and negative numbers. The sign bit has a weight of $(-2^S)$, and each succeeding integer/fraction bit position has a weight of $(+2^I)$, where I={S-1, S-2, ... T}. Here (S-T) is the total number of integer/fraction bit positions. The value of S/T for the four formats is {31/0, 15/0, 7/0}.

The three fixed point values utilize a two's complement numeric format. The largest magnitude negative and positive values are frequently reserved as saturation values to avoid overflow errors of the numeric format.

The three examples of floating point data formats include {FP32, FP24, FP16}. These have the same size fields for sign S and exponent E[7:0]. The three formats have different sizes for the fraction/mantissa field, with {23, 15, 7} bits, respectively. Other floating point formats are also possible.

The three floating point formats utilize a signed-magnitude numeric format for the sign field and fraction field. The fraction field has a most-significant weight of 0.5, and a hidden (implicit) bit with a weight of 1.0 is added (i.e. normalized fraction). A denormalized fraction option is not generally used in high-performance applications. The exponent field is a two's complement numeric format to which a bias of 127 is added. The minimum and maximum exponent values are reserved for special operands (NAN, INF, DNRM, ZERO).

Briefly, with reference to FIG. 11, the number space of the floating point data format (here, FP16) includes minimum and maximum exponent E[7:0], which are reserved for special operands (NAN, INF, DNRM, ZERO). A NAN value is generated when an undefined operation takes place (0*∞ or ∞-∞). The ±INF values are the saturation value for exponent overflow. The ±ZRO values are the saturation value for exponent underflow. The ±DNRM values provide for gradual underflow between the smallest NRM value and the ZRO value.

The floating point data format may utilize an exponent field E[7:0] with a bias of 127. A signed-magnitude numeric format is used for the sign field S and fraction field F[1:7]. Here, the fraction field F[1:7] has a most-significant weight of 0.5, and a hidden (implicit) bit F[0] with a weight of 1.0 is added (i.e. normalized fraction). A denormalized fraction option DNRM is used with the minimum E[7:0] exponent value of 8'h00 and with no hidden (implicit) bit F[0].

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

For example, although the present inventions have been largely described and illustrated in the context of MAC pipeline architectures wherein the partial accumulation values are rotated from MAC to MAC during the multiply and accumulate operations of an execution cycle (e.g., FIGS. 4A, 4B, 5A, 5B, 6A and 6B), the present inventions may be employed with any MAC pipeline architecture and technique now known or later developed. That is, in one embodiment, with reference to FIGS. 12A, 12B, 13A, 13B, 14A and 14B, the MAC pipeline (e.g., linear pipeline) architecture may rotate, transfer and/or move input data values (Dijk), on a cycle-by-cycle basis, from one MAC of the linear pipeline to the immediately following MAC of the pipeline and employed in the multiply operation of the multiplier circuit of that next MAC of the processing pipeline such that before, during or after each cycle of the set of associated execution cycles, the input data are rotated, transferred or moved from a MAC of the linear pipeline to successive MAC thereof wherein the rotated, transferred or moved input data are input or applied to the multiplier circuit of associated MAC during or in connection with the multiply operation of that MAC as described and/or illustrated in U.S. Provisional Application 63/156,263 (filed Mar. 3, 2021). In short, in this embodiment, the accumulation values generated by each MAC are maintained, stored or held, during each execution cycle of the execution sequence (i.e., set of associated execution cycles), in respective MAC (compare the embodiment of FIG. 4A) and used in the accumulation operation of the associated accumulator circuit thereof. As noted above, the '263 application is incorporated herein by reference in its entirety. Moreover, any of the exemplary embodiments of the activation circuit/circuitry described and/or illustrated herein (e.g., FIGS. 1, 2A-2F and 3) may be employed in connection with the aforementioned MAC pipeline architecture.

Further, the present inventions may be employed in conjunction with MAC pipeline architectures and techniques described and/or illustrated U.S. Provisional Application 63/289,835 (filed Dec. 15, 2021), which, as stated above, is incorporated herein by reference. Briefly, with reference to FIGS. 15A, 15B, 16A, 16B, 17A and 17B, in this embodiment of the pipeline architectures and techniques, the input data values (Dijk) are broadcast to the plurality of MACs of the pipeline and thereafter input or loaded into a plurality of MACs of the pipeline, concurrently, and, as such, each MAC of the linear MAC pipeline receives and loads the same input data value (Dijk), and the multiplier circuit in each MAC of the pipeline multiplies (for example, concurrently—e.g., on the same or a common execution cycle of an execution sequence) the same data value (Dijk) and a filter weight (Fkl) that is different from the filter weights employed by the other MACs of the pipeline a plurality of execution cycles of the execution sequence. Here, each MAC of the MAC pipeline generates a product value, each execution cycle of the sequence, using the same data value (Dijk) and a different filter weight (Fkl).

The product value generated in each MAC of the serially interconnected MAC pipeline may be added via the accumulation circuit of each MAC, to the initial accumulation value (if this operation correlates to the first execution cycle of the execution sequence) or added to the partial accumulation value (if the operation correlates to an execution cycle that is not the first cycle of the execution sequence). Notably, in this embodiment, neither the input data values nor the accumulation data values are rotated, transferred or moved (e.g., before, during or at the completion of each execution cycle of the execution sequence) through the plurality of serially interconnected MACs of the pipeline. Moreover, any of the exemplary embodiments of the activation circuit/ circuitry described and/or illustrated herein (e.g., FIGS. 1, 2A-2F and 3) may be employed in connection with the aforementioned MAC pipeline architecture.

In addition, the interconnection of the MAC pipeline or MAC pipelines are configurable or programmable to provide different forms of pipelining. (See, e.g., U.S. Provisional Application No. 63/012,111). Here, the pipelining architecture provided by the interconnection of the plurality of multiplier-accumulator circuits may be controllable or programmable. In this way, a plurality of multiplier-accumulator circuits may be configured and/or re-configured to form or provide the desired processing pipeline(s) to process data (e.g., image data) and the activation circuitry may be configured and/or re-configured to implement one or more operations or processes, including, for example, linear and/ or non-linear activation operations and/or threshold functions. For example, with reference to the '111 application, in one embodiment, control/configure circuitry may configure or determine the multiplier-accumulator circuits, or rows/ banks of interconnected multiplier-accumulator circuits are connected (in series) to perform the multiply and accumulate operations and/or the linear pipelining architecture or configuration implemented via connection of multiplier-accumulator circuits (or rows/banks of interconnected multiplier-accumulator circuits). Thus, in one embodiment, the control/ configure circuitry configures or implements an architecture of the execution or processing pipeline by controlling or providing connection(s) between multiplier-accumulator circuits and/or rows of interconnected multiplier-accumulator circuits. Moreover, the control/configure circuitry may also connect the activation circuitry (which may reside in the NLINK circuitry) to the pipeline in any of the configurations described and/or illustrated herein (e.g., connected to the last multiplier-accumulator circuit of the associated MAC pipeline to receive and process the data output from the pipeline). Indeed, the activation circuitry, connected to such pipeline(s), may also be controlled to implement one or more operations or processes, including, for example, linear and/or non-linear activation operations and/or threshold functions also as described and/or illustrated herein.

In one embodiment, all of the MAC pipelines of a given cluster are incorporated in the circular-shifting-path or ring architecture via configuration of the associated NLINK circuits and the activation circuitry may also be disposed in the NLINK circuits and connected to the output of the pipelines. In one embodiment, the rows of multiplier-accumulator circuits may be connected or disconnected to adjust the extent or length of the concatenation (i.e., increase or decrease the number of multiplier-accumulator circuits interconnected to perform the multiply and accumulate operations in, e.g., the execution or processing pipeline) via control of circuitry (e.g., multiplexers) in NLINK circuits associated with rows of multiplier-accumulator circuits.

(See, e.g., the '345 application, FIGS. 7A-7C and 6A-6C, respectively, and text associated therewith).

Further, although the present inventions are described and illustrated in the context of multiplier-accumulator circuitry, the circuitry and operation of the present inventions may, in lieu of the multiplication circuitry, or in addition thereto, substitute/implement logarithmic addition circuitry and conversion circuitry to facilitate concatenating the logarithmic addition and accumulate operations consistent with the present inventions. For example, the present inventions may be employed in conjunction with U.S. patent application Ser. No. 17/092,175 (filed Nov. 6, 2020) and U.S. Provisional Application No. 62/943,336 (filed Dec. 4, 2019), which are incorporated herein in their entirety. In this regard, pipelines implementing logarithmic addition-accumulator circuitry (and methods of operating such circuitry) wherein data (e.g., image data) is processed based a logarithmic format, for example, in connection with inferencing operations, may be employed in the conjunction with the activation circuitry of the present inventions. For the avoidance of doubt, all of the embodiments described and/or illustrated herein may be employed in connection with the logarithmic addition-accumulator circuits, and pipelines including such circuits, that are described and/or illustrated in the '175 and '336 applications.

Importantly, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

Further, although the memory cells in certain embodiments are illustrated as static memory cells or storage elements, the present inventions may employ dynamic or static memory cells or storage elements. Indeed, as stated above, such memory cells may be latches, flip/flops or any other static/dynamic memory cell or memory cell circuit or storage element now known or later developed.

Notably, various circuits, circuitry and techniques disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, circuitry, layout and routing expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other formats and/or languages now known or later developed. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits, circuitry and techniques disclosed herein may be represented via simulations using computer aided design and/or testing tools. The simulation of the circuits, circuitry, layout and routing, and/or techniques implemented thereby, may be implemented by a computer system wherein characteristics and operations of such circuits, circuitry, layout and techniques implemented thereby, are imitated, replicated and/or predicted via a computer system. The present inventions are also directed to such simulations of the inventive circuits, circuitry and/or techniques implemented thereby, and, as such, are intended to fall within the scope of the present inventions. The computer-readable media corresponding to such simulations and/or testing tools are also intended to fall within the scope of the present inventions.

Notably, reference herein to "one embodiment" or "an embodiment" (or the like) means that a particular feature, structure, or characteristic described in connection with the embodiment may be included, employed and/or incorporated in one, some or all of the embodiments of the present inventions. The usages or appearances of the phrase "in one embodiment" or "in another embodiment" (or the like) in the specification are not referring to the same embodiment, nor are separate or alternative embodiments necessarily mutually exclusive of one or more other embodiments, nor limited to a single exclusive embodiment. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, an embodiment or implementation described herein as "exemplary" is not to be construed as ideal, preferred or advantageous, for example, over other embodiments or implementations; rather, it is intended convey or indicate the embodiment or embodiments are example embodiment(s).

Although the present inventions have been described in certain specific aspects, many additional modifications and variations would be apparent to those skilled in the art. It is therefore to be understood that the present inventions may be practiced otherwise than specifically described without departing from the scope and spirit of the present inventions. Thus, embodiments of the present inventions should be considered in all respects as illustrative/exemplary and not restrictive.

The terms "comprises," "comprising," "includes," "including," "have," and "having" or any other variation thereof, are intended to cover a non-exclusive inclusion, such that a process, method, circuit, article, or apparatus that comprises a list of parts or elements does not include only those parts or elements but may include other parts or elements not expressly listed or inherent to such process, method, article, or apparatus. Further, use of the terms "connect", "connected", "connecting" or "connection" herein should be broadly interpreted to include direct or indirect (e.g., via one or more conductors and/or intermediate devices/elements (active or passive) and/or via inductive or capacitive coupling)) unless intended otherwise (e.g., use of the terms "directly connect" or "directly connected").

The terms "a" and "an" herein do not denote a limitation of quantity, but rather denote the presence of at least one of the referenced item. Further, the terms "first," "second," and the like, herein do not denote any order, quantity, or importance, but rather are used to distinguish one element/circuit/feature from another.

In addition, the term "integrated circuit" means, among other things, any integrated circuit including, for example, a generic or non-specific integrated circuit, processor, controller, state machine, gate array, SoC, PGA and/or FPGA. The term "integrated circuit" also means, for example, a processor, controller, state machine and SoC—including an embedded FPGA.

Further, the term "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

Notably, the term "MAC circuit" or "MAC") means a multiplier-accumulator circuit of, for example, the MAC pipeline. For example, a multiplier-accumulator circuit is described and illustrated in the exemplary embodiment of FIGS. 1A-1C of U.S. patent application Ser. No. 16/545,345, and the text associated therewith. Notably, however, the term "MAC circuit" or "MAC" (or the like) is not limited to the particular circuit, logical, block, functional and/or physical diagrams, block/data width, data path width, bandwidths, and processes illustrated and/or described in accordance with, for example, the exemplary embodiment of FIGS. 1A-1C of the '345 application, which, as indicated above, is incorporated by reference.

In the claims, "activation function" means linear and/or non-linear activation operations and/or threshold functions.

Again, there are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations.

What is claimed is:

1. An integrated circuit comprising:
   a plurality of multiplier-accumulator circuits connected in series to form a linear pipeline to process first data, via performing a plurality of concatenated multiply and accumulate operations, and generate MAC output data, wherein each multiplier-accumulator circuit of the plurality of multiplier-accumulator circuits includes:
      a multiplier to multiply first data by a multiplier weight data and generate a product data, and
      an accumulator, coupled to the multiplier of the associated multiplier-accumulator circuit, to add second data and the product data of the associated multiplier to generate sum data; and
   an activation circuit, connected to the output of the linear pipeline of the plurality of multiplier-accumulator circuits, to receive the MAC output data and process the MAC output data, via a non-linear activation function, to generate MAC pipeline output data.

2. The integrated circuit of claim 1 wherein:
   the MAC output data is linear, and
   the MAC pipeline output data is non-linear.

3. The integrated circuit of claim 1 wherein:
   the activation circuit is more than one-time configurable to process the MAC output data via one of a plurality of predetermined non-linear activation functions.

4. The integrated circuit of claim 1 wherein the MAC output data includes first MAC output data and second MAC output data and the integrated circuit further includes activation circuit control circuitry to configure the activation circuit wherein:
   the activation circuit is configurable to:
      process the first MAC output data from the linear pipeline of the plurality of multiplier-accumulator circuits, via a first non-linear activation function, during a first operation of the activation circuit to generate first MAC pipeline output data, and
      process the second MAC output data from the linear pipeline of the plurality of multiplier-accumulator circuits, via a second non-linear activation function, during a second operation of the activation circuit to generate second MAC pipeline output data.

5. The integrated circuit of claim 4 wherein:
   the first non-linear activation function and the second non-linear activation function include different slopes at a midpoint of an output range of the respective non-linear activation function.

6. The integrated circuit of claim 4 wherein:
   the first non-linear activation function and the second non-linear activation function include different output ranges of an activation function.

7. The integrated circuit of claim 4 wherein:
   the MAC output data, the first MAC pipeline output and second MAC pipeline output data include a floating point data format.

8. The integrated circuit of claim 1 wherein:
   the activation circuit further includes circuitry, connected to the output of the linear pipeline of the plurality of multiplier-accumulator circuits, to bias the MAC output data before processing the MAC output data, via the non-linear activation function, to generate MAC pipeline output data.

9. The integrated circuit of claim 1 wherein:
   the activation circuit further includes circuitry, connected to the output of the linear pipeline of the plurality of multiplier-accumulator circuits, to scale the MAC output data before processing the MAC output data, via the non-linear activation function, to generate MAC pipeline output data.

10. The integrated circuit of claim 1 wherein:
    the activation circuit does not include circuitry, connected to the output of the linear pipeline of the plurality of multiplier-accumulator circuits, to scale or bias the MAC output data before processing the MAC output data, via the non-linear activation function, to generate MAC pipeline output data.

11. An integrated circuit comprising:
a plurality MAC pipelines wherein:
   each MAC pipeline includes a plurality of multiplier-accumulator circuits connected in series to form a linear pipeline to process first data input to the pipeline, via performing a plurality of concatenated multiply and accumulate operations, and to generate MAC output data based thereon, wherein:
      each multiplier-accumulator circuit of the plurality of multiplier-accumulator circuits includes:
         a multiplier to multiply first data by a multiplier weight data and generate a product data, and
         an accumulator, coupled to the multiplier of the associated multiplier-accumulator circuit, to add second data and the product data of the associated multiplier to generate sum data; and
activation circuitry, connected to the outputs of the plurality of MAC pipelines, wherein the activation circuitry includes a plurality of activation circuits wherein each activation circuit is associated with one of the MAC pipelines and is connected to the output of the associated MAC pipeline to receive and process the MAC output data therefrom, via an activation function, to generate MAC pipeline output data using the MAC output data from the associated MAC pipeline.

12. The integrated circuit of claim 11 wherein:
a plurality of the activation circuits of the activation circuitry process the MAC output data from the associated MAC pipeline, via a non-linear activation function.

13. The integrated circuit of claim 11 wherein:
a plurality of the activation circuits of the activation circuitry process the MAC output data from the associated MAC pipeline, via a non-linear activation function, and wherein at least two of the activation circuits of the activation circuitry process the MAC output data from the associated MAC pipeline, via different non-linear activation functions.

14. The integrated circuit of claim 11 wherein the MAC output data includes first MAC output data and second MAC output data and the integrated circuit further includes activation circuit control circuitry to configure each activation circuit of the activation circuitry wherein:
each activation circuit is configurable to:
   process the first MAC output data from the associated linear pipeline of the plurality of multiplier-accumulator circuits, via a first non-linear activation function, during a first operation of the activation circuit to generate first MAC pipeline output data, and
   process the second MAC output data from the associated linear pipeline of the plurality of multiplier-accumulator circuits, via a second non-linear activation function, during a second operation of the activation circuit to generate second MAC pipeline output data.

15. The integrated circuit of claim 14 wherein:
the first non-linear activation function and the second non-linear activation function include different slopes at a midpoint of an output range of the respective non-linear activation function.

16. The integrated circuit of claim 14 wherein:
the first non-linear activation function and the second non-linear activation function include different output ranges of an activation function.

17. The integrated circuit of claim 11 wherein:
each activation circuit of the activation circuitry further includes circuitry, connected to the output of the associated MAC pipeline, to bias and/or scale the MAC output data, generated by the associated MAC pipeline, before processing the MAC output data generated by the associated MAC pipeline, via the non-linear activation function.

18. The integrated circuit of claim 11 wherein:
each activation circuit of the activation circuitry does not include circuitry, connected to the output of the associated MAC pipeline, to scale or bias the MAC output data, generated by the associated MAC pipeline, before processing the MAC output data generated by the associated MAC pipeline, via the non-linear activation function.

19. An integrated circuit comprising:
a plurality MAC pipelines including:
   a first MAC pipeline including a plurality of multiplier-accumulator circuits connected in series to form a first linear pipeline to process first data input to the first MAC pipeline, via performing a plurality of concatenated multiply and accumulate operations, and to generate first MAC output data based thereon, wherein:
      each multiplier-accumulator circuit of the plurality of multiplier-accumulator circuits of the first MAC pipeline includes:
         a multiplier to multiply first data by a multiplier weight data and generate a first product data, and
         an accumulator, coupled to the multiplier of the associated multiplier-accumulator circuit, to generate first sum data using the first product data of the associated multiplier; and
   a second MAC pipeline including a plurality of multiplier-accumulator circuits connected in series to form a second linear pipeline to process second data input to the second MAC pipeline, via performing a plurality of concatenated multiply and accumulate operations, and to generate second MAC output data based thereon, wherein:
      each multiplier-accumulator circuit of the plurality of multiplier-accumulator circuits of the second MAC pipeline includes:
         a multiplier to multiply second data by a multiplier weight data and generate a second product data, and
         an accumulator, coupled to the multiplier of the associated multiplier-accumulator circuit, to generate second sum data using the second product data of the associated multiplier; and
a first activation circuit, connected to the output of the first MAC pipeline, wherein the first activation circuit is dedicated to and associated with first MAC pipeline and is connected to the output of the first MAC pipeline to receive and process the first MAC output data therefrom, via a first activation function, to generate first MAC pipeline output data using the first MAC output data from the first MAC pipeline;
a second activation circuit, connected to the output of the second MAC pipeline, wherein the second activation circuit is dedicated to and associated with second MAC pipeline and is connected to the output of the second MAC pipeline to receive and process the second MAC output data therefrom, via a second activation function, to generate second MAC pipeline output data using the second MAC output data from the second MAC pipeline; and wherein:

the first and second MAC pipelines concurrently process the first and second data, respectively; and the first and second activation circuits concurrently process the first and second MAC output data, respectively.

20. The integrated circuit of claim 19 further including activation circuit control circuitry to configure the first and second activation circuits, wherein:

each of the first and second activation circuits is configurable to:

process MAC output data from the associated MAC pipeline, via a first non-linear activation function, and process MAC output data from the associated MAC pipeline, via a second non-linear activation function.

21. The integrated circuit of claim 20 wherein:

the first non-linear activation function and the second non-linear activation function include different slopes at a midpoint of an output range of the respective non-linear activation function.

22. The integrated circuit of claim 20 wherein:

the first non-linear activation function and the second non-linear activation function include different output ranges of an activation function.

* * * * *